(12) United States Patent
Inoue et al.

(10) Patent No.: US 9,290,170 B2
(45) Date of Patent: Mar. 22, 2016

(54) VEHICLE-BODY ATTACHMENT STRUCTURE FOR ELECTRIC BRAKE ACTUATOR

(75) Inventors: Arata Inoue, Saitama (JP); Kunimichi Hatano, Saitama (JP); Takaaki Ohnishi, Saitama (JP); Kazuyoshi Akutsu, Saitama (JP); Kazuaki Murayama, Saitama (JP); Kaoru Akahane, Saitama (JP); Makoto Sawai, Saitama (JP); Kenji Hattori, Saitama (JP); Takehiro Horiuchi, Saitama (JP); Toru Mabuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 13/988,077

(22) PCT Filed: Nov. 17, 2011

(86) PCT No.: PCT/JP2011/076582
§ 371 (c)(1),
(2), (4) Date: Sep. 9, 2013

(87) PCT Pub. No.: WO2012/067206
PCT Pub. Date: May 24, 2012

(65) Prior Publication Data
US 2013/0340422 A1    Dec. 26, 2013

(30) Foreign Application Priority Data

Nov. 17, 2010 (JP) ................. 2010-256618
Nov. 17, 2010 (JP) ................. 2010-257206
Nov. 17, 2010 (JP) ................. 2010-257214
Nov. 17, 2010 (JP) ................. 2010-257215
Nov. 17, 2010 (JP) ................. 2010-257217
Nov. 17, 2010 (JP) ................. 2010-257357
Nov. 17, 2010 (JP) ................. 2010-257367

(51) Int. Cl.
*B60T 13/74* (2006.01)
*B60T 13/66* (2006.01)
(Continued)

(52) U.S. Cl.
CPC ............ *B60T 13/66* (2013.01); *B60T 7/042* (2013.01); *B60T 8/3685* (2013.01); *B60T 8/4081* (2013.01); *B60T 13/662* (2013.01); *B60T 13/745* (2013.01)

(58) Field of Classification Search
CPC ..... B60T 13/74; B60T 13/741; B60T 13/745; B60T 17/04; B60T 17/046
USPC ........... 188/151 R, 152, 355, 358; 303/115.1, 303/119.3, DIG. 10; 248/635, 638, 659, 660
See application file for complete search history.

(56) References Cited

U.S. PATENT DOCUMENTS 4,653,815 A * 3/1987 Agarwal et al. ............ 303/115.2
4,756,391 A    7/1988 Agarwal et al.
(Continued)

FOREIGN PATENT DOCUMENTS

CN    2938192 Y    8/2007
CN    101058309 A   10/2007
(Continued)

OTHER PUBLICATIONS

Chinese Office Action sent Sep. 19, 2014 issued for corresponding CN Patent Application No. 2014091601114150.

Primary Examiner — Thomas J Williams
(74) *Attorney, Agent, or Firm* — Carrier Blackman & Associates, P.C.; Joseph P. Carrier; William D. Blackman

(57) ABSTRACT

A structure for attaching a motor cylinder device to the body of the vehicle, said vehicle brake system including: an input device via which an operator inputs brake operations; and a motor cylinder device that generates hydraulic brake pressure on the basis of electrical signals based on said brake operations. Said motor cylinder device has: an electric motor that operates on the basis of electrical signals; a driving-force transmission unit that transmits driving force from the electric motor; and a cylinder mechanism that applies pressure to a brake fluid by moving a piston axially by means of the driving force transmitted by the driving-force transmission unit. A mount for attaching the motor cylinder device to the body of the vehicle is provided near the center of gravity of the motor cylinder device. This makes it possible to minimize displacement of the electric brake actuator when subjected to vibration.

13 Claims, 49 Drawing Sheets

(51) Int. Cl.
   *B60T 7/04*   (2006.01)
   *B60T 8/36*   (2006.01)
   *B60T 8/40*   (2006.01)

(56) References Cited

U.S. PATENT DOCUMENTS

| | | | | |
|---|---|---|---|---|
| 4,850,650 | A * | 7/1989 | Eckert et al. | 303/155 |
| 5,236,257 | A * | 8/1993 | Monzaki et al. | 303/115.2 |
| 5,464,187 | A * | 11/1995 | Linkner, Jr. | 303/113.1 |
| 5,667,284 | A * | 9/1997 | Drennen et al. | 303/115.2 |
| 6,047,546 | A | 4/2000 | Takeyama | |
| 6,058,705 | A | 5/2000 | Schunck | |
| 6,230,492 | B1 | 5/2001 | Kingston et al. | |
| 6,296,236 | B1 | 10/2001 | Ott | |
| 7,458,649 | B2 | 12/2008 | Jeon | |
| 7,874,626 | B2 * | 1/2011 | Nishikawa et al. | 303/115.2 |
| 8,555,634 | B2 | 10/2013 | Ohno et al. | |
| 2002/0190572 | A1 * | 12/2002 | Nakazawa | 303/116.4 |
| 2003/0038541 | A1 | 2/2003 | Suzuki et al. | |
| 2003/0061812 | A1 | 4/2003 | Enomoto et al. | |
| 2008/0272646 | A1 * | 11/2008 | Nakazawa et al. | 303/155 |
| 2011/0259005 | A1 | 10/2011 | Kikuchi et al. | |
| 2013/0291533 | A1 * | 11/2013 | Inoue et al. | 60/545 |

FOREIGN PATENT DOCUMENTS

| | | |
|---|---|---|
| CN | 101092136 A | 12/2007 |
| CN | 201212535 Y | 3/2009 |
| EP | 1 970 271 A1 | 9/2008 |
| JP | 55-106163 U | 7/1980 |
| JP | H04-100764 A | 4/1992 |
| JP | 4-166463 A | 6/1992 |
| JP | H04-166463 A | 6/1992 |
| JP | 05-22241 U | 3/1993 |
| JP | H06-183330 A | 7/1994 |
| JP | 07-047941 | 2/1995 |
| JP | 07-050184 A | 2/1995 |
| JP | 08-054081 A | 2/1996 |
| JP | H08-85433 A | 4/1996 |
| JP | H08-282457 A | 10/1996 |
| JP | 2001-500087 A | 1/2001 |
| JP | 2002-515106 A | 5/2002 |
| JP | 2003065373 A | 3/2003 |
| JP | 2004-231080 A | 8/2004 |
| JP | 2006-117076 A | 5/2006 |
| JP | 2006-199272 A | 8/2006 |
| JP | 2007-055422 A | 3/2007 |
| JP | 2007-326395 A | 12/2007 |
| JP | 2009202867 A | 9/2009 |
| JP | 2010-023594 A | 2/2010 |
| WO | 95/09752 A1 | 4/1995 |
| WO | 2010064593 A1 | 6/2010 |

* cited by examiner (Disposition on one side)

(Disposition on other side)

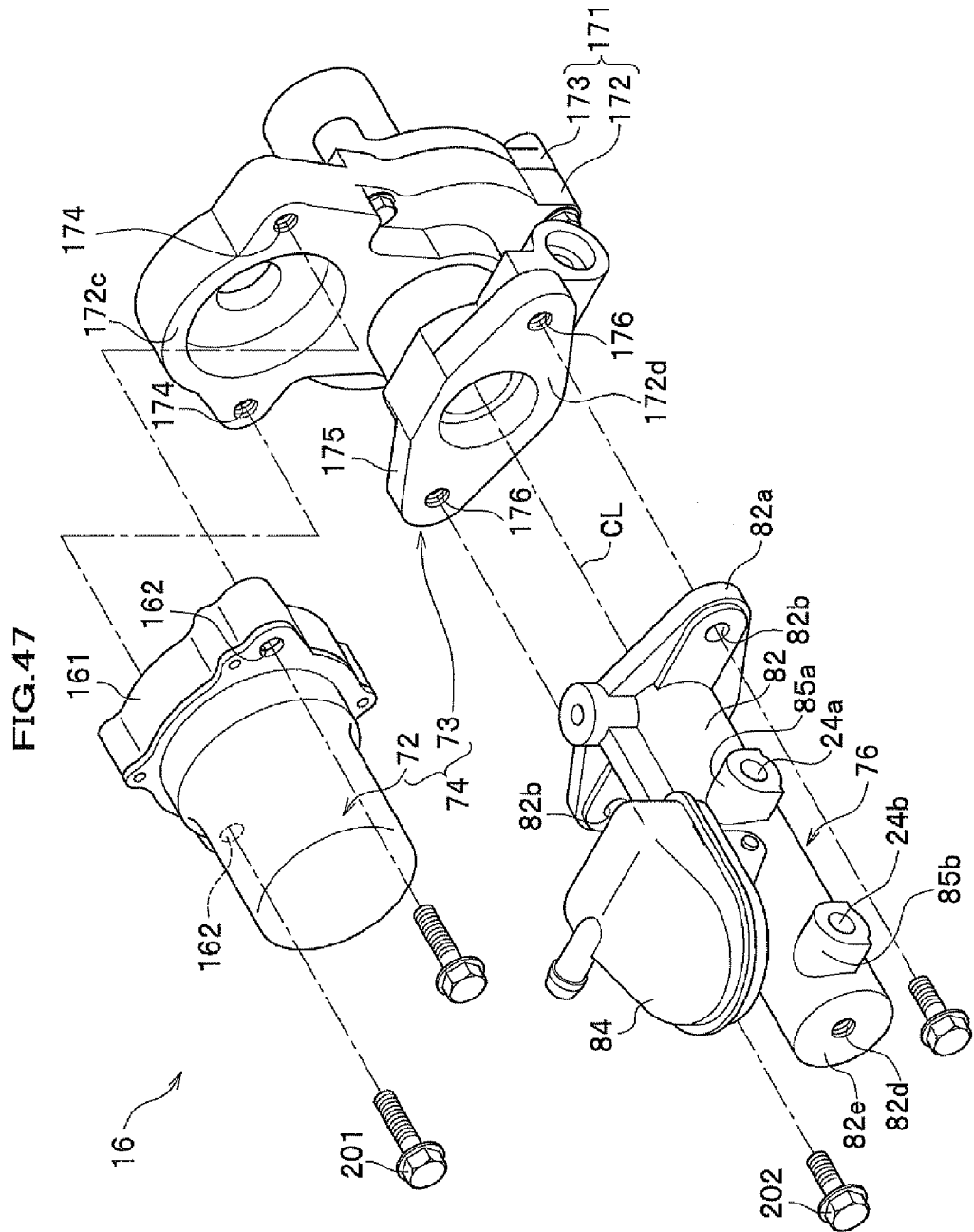

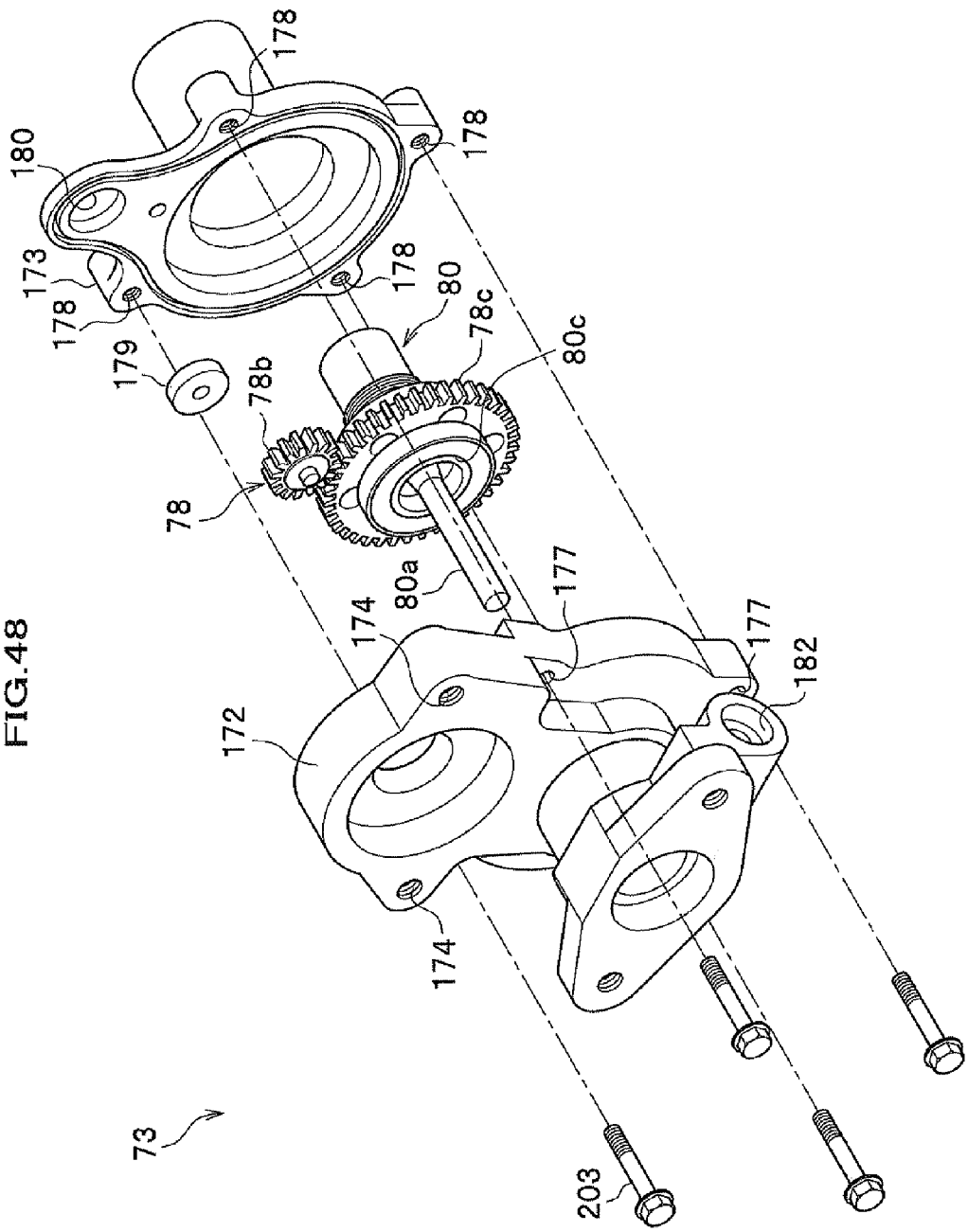

VEHICLE-BODY ATTACHMENT STRUCTURE FOR ELECTRIC BRAKE ACTUATOR

TECHNICAL FIELD

The present invention relates to a vehicle body attachment structure for an electric brake actuator of a vehicle brake system.

BACKGROUND ART

Conventionally, as brake systems for a vehicle (automobile), systems provided with a servo unit, such as a negative pressure booster or a hydraulic booster, are known. Further, in recent years, electric servo units using an electric motor as a booster source are known (for example, see Patent Document 1).

The electric servo unit disclosed by Patent Document 1 includes a main piston that is moved forward and backward by operation of a brake pedal, a cylindrical booster piston that is fitted outside the main piston such as to be movable relative to the main piston, and an electric motor for moving this booster piston forward and backward.

By this electric servo unit, the main piston and the booster piston serve as pistons for a master cylinder, and the respective front ends are located in the pressure chamber of the master cylinder. Thus, an input thrust force applied to the main piston from a brake pedal by an operator and a booster thrust force applied from an electric motor to the booster piston can generate a hydraulic brake pressure in the master cylinder.

BACKGROUND ART DOCUMENT

Patent Document

Patent Document 1: JP2010-23594 A

DISCLOSURE OF THE INVENTION

Problems to be Solved by the Invention

However, the electric servo unit disclosed by Patent Document 1 tends to be large in the size of the entire unit because a hydraulic pressure generation mechanism, which receives an input from a brake pedal, and a hydraulic pressure generation mechanism, which receives an input from an electric motor, are integrally structured. Accordingly, displacement of the unit may become large when a force such as vibration is applied to the unit.

Further, there is a problem of lacking versatility caused by mass-production. Still further, solution for reinforcing the strength of the attachment portion on the vehicle body side is necessary more than ordinary cases, and the total weight of the unit increases with reinforcement, and besides, the attachability may worsen. Further, when the a force such as vibration is applied, it may occur that displacement of the unit becomes large, and a load is applied to the connection parts of pipes in which brake fluid flows, which causes a high stress. Still further, in case that an electric brake actuator with a heavy weight is housed in a power plant housing room for housing a power plant, when the electric brake actuator is attached to a portion with a low strength, a problem such as vibration or the like is caused by the weight.

The present invention has been developed in order to solve at least one of the above-described problems, and an object of the invention is to provide a vehicle body attachment structure for an electric brake actuator of a vehicle brake system wherein the vehicle body attachment structure is capable of reducing the displacement of the electric brake actuator in case of receiving a force such as vibration.

Means for Solving the Problems

In order to attain the object, in an aspect of the present invention, provided is a vehicle body attachment structure for an electric brake actuator for a vehicle brake system including an input device to which braking operation by an operator is input and an electric brake actuator for generating a hydraulic brake pressure, based on at least an electric signal according to the braking operation, wherein the electric brake actuator includes: an electric motor that drives, based on the electric signal; a driving force transmission section for transmitting a driving force of the electric motor; and a cylinder mechanism for applying a pressure to brake fluid by moving a piston along an axial direction by the driving force transmitted from the driving force transmission section, and wherein a mount portion for attaching the electric brake actuator to a vehicle body is provided in a vicinity of a center of gravity of the electric brake actuator.

According to this aspect of the invention, as the vicinity of the center of gravity of the electric brake actuator can be supported, swinging can be reduced even in a case of receiving a force such as vibration, and it is thereby possible to effectively reduce displacement of the electric brake actuator.

Further, as the mount portion can be concentrated in the vicinity of gravity, the space dedicated to attachment can be small, and it is thereby possible to increase the degree of freedom of attaching the electric brake actuator to the vehicle body even in a narrow disposition space.

Further, in another aspect of the invention, the mount portion is provided at a portion that is arranged separable from the cylinder mechanism of the electric brake actuator.

According to this aspect of the invention, as the portion where the mount portion is provided and the cylinder mechanism are arranged in separate structures, these two can be produced independently from each other. In case it is necessary to change the position and the shape of a mount portion, for example, in a case of mounting on vehicles in plural types, it is possible to make an arrangement by changing only the portion where the mount portion is provided while commonly using a cylinder mechanism as it is.

In still another aspect of the invention, the driving force transmission section includes a housing provided with a motor attachment portion for attaching the electric motor to the driving force transmission section, and the mount portion is provided in the housing.

According to this aspect of the invention, in case it is necessary to change the position and the shape of a mount portion and/or the attaching position of an electric motor with respect to the rotational direction corresponding to the connecting direction of harness, for example, in a case of mounting on vehicles in plural types, it is possible to make an arrangement by changing only the housing, of the driving force transmission section, provided with the mount portion and the motor attachment portion.

Further, in still another aspect of the invention, the mount portion has a penetration hole, and the mount portion can be fastened to the vehicle body by one male screw member inserted through the penetration hole.

According to this aspect of the invention, by only fastening once by one male screw member, screw fastening is possible at the both opening end sides of the penetration hole, which makes attaching work easy.

Further, in yet another aspect of the invention, the electric motor is located higher than the cylinder mechanism.

According to this aspect of the invention, it is possible to prevent occurrence of an event that an oil component such as grease in the driving force transmission section enters the electric motor by the action of gravity and reaches an electrical component or the like.

In yet another aspect of the invention, the electric motor is disposed lower than the cylinder mechanism, and the mount portion is disposed at an upper portion of the electric brake actuator.

According to this aspect of the invention, as it is possible to dispose the electric motor lower and support the electric brake actuator by bridging, anti-vibration performance improves.

In another aspect of the invention, the vehicle body attachment structure for an electric brake actuator includes: a load transmission section that is formed between the electric brake actuator and the vehicle body to transmit a load from the electric brake actuator to the vehicle body, wherein the load transmission section is provided independently from the mount portion.

According to this aspect of the invention, it is possible to reduce displacement of the electric brake actuator in a case of a force such as vibration is received. Herein, in case that the electric brake actuator receives a force such as vibration with an ordinary magnitude, the sound or vibration of the electric brake actuator is reduced by supporting the electric brake actuator at the mount portion, and in case that the electric brake actuator receives a force such as vibration with a magnitude greater than the ordinary magnitude, the displacement of the electric brake actuator can be reduced by that the load transmission section receives a load from the electric brake actuator.

As the displacement of the electric brake actuator can be reduced in such a manner, it is possible to reduce a stress generated in a pipe connected, for example, to the electric brake actuator.

In another aspect of the invention, the load transmission section is arranged to be able to contact with a vicinity of the tip end of the cylinder mechanism.

According to this aspect of the invention, it is possible to more effectively reduce the displacement in the vicinity of the tip end of the cylinder mechanism, particularly displacement that is possibly caused around the mount portion.

In still another aspect of the invention, the load transmission section is arranged to be able to contact with the driving force transmission section.

According to this aspect of the invention, the load transmission section can receive a load from the driving force transmission section, which normally has a heavy weight and a high rigidity, and the displacement of the entire electric brake actuator can be effectively reduced.

In yet another aspect of the invention, the load transmission section is provided with an elastic body contactable with the electric brake actuator and a support member for supporting the elastic body.

According to this aspect of the invention, it is possible to damp a force such as vibration by the elastic body, and displacement caused on the electric brake actuator can be more effectively reduced. Further, the electric brake actuator itself can be protected.

In another aspect of the invention, a gap is provided between the electric brake actuator and at least a part of the load transmission section so that a load from the electric brake actuator is transmitted to the vehicle body in a case that the electric brake actuator is displaced.

According to this aspect of the invention, in case that a force such as vibration with a relatively small magnitude is received, as this force such as vibration is not transmitted to the load transmission section, it is possible to prevent propagation of vibration via the load transmission section and generation of sound.

In still another aspect of the invention, the driving force transmission section includes an actuator housing provided with a motor attachment portion for attaching the electric motor to the driving force transmission section, and a connector is disposed on a side surface side of the actuator housing and is electrically connected with the electric motor.

According to this aspect of the invention, by disposing a connector on the side surface side of the actuator housing, an attachment/detachment space for the connector is ensured and access to the connector becomes simple and easy, thus the accessibility being improved. As a result, the easiness of using (easiness of attaching) the electric brake actuator increases, which improves the versatility.

In yet another aspect of the invention, the connector is provided such as to extend along a direction substantially perpendicular to an axial line of a motor shaft of the electric motor.

According to this aspect of the invention, the connector is provided such as to extend along the direction substantially perpendicular to the axial line of the motor shaft of the electric motor, and the accessibility can thereby be further improved.

In another aspect of the invention, the cylinder mechanism is provided with a reservoir for reserving brake fluid, and the reservoir is provided such that a direction in which brake fluid is introduced to the reservoir and a direction of attaching and detaching the connector agree with each other.

According to this aspect of invention, access during attaching work or maintenance of the electric brake actuator becomes simple and easy to enable improvement in accessibility and make attaching work and maintenance work from the same direction easy, and the workability is thus improved. Further, it is possible to reduce a load on a worker who carries out such attaching work and maintenance work.

In still another aspect of the invention, the connector is provided such as to enable disposition at each of plural rotation positions with reference to an axial direction of the electric motor.

According to this aspect of the invention, the connector is provided such as to enable disposition at plural rotation positions with reference to an axial direction of the electric motor, and it is thereby possible, for example, to easily match specifications with either right-hand drive or left-hand drive regarding the position of the steering wheel of the vehicle, which further improves the versatility.

In still another aspect of the invention, changing means for changing disposition direction of the connectors between the plural rotation positions with reference to the axial line of the electric motor.

According to this aspect of the invention, it is possible to simply and easily change the disposition positions of the connectors with a simple structure of the changing means.

In yet another aspect of the invention, the connectors are formed in plural separations including at least a power connector for a power source and a sensor connector for a sensor.

According to this aspect of the invention, it is possible to reduce generation of noise to a detection signal that is output from the sensor, and downsizing can be achieved in comparison with a case of integrally forming plural connectors.

In another aspect of the invention, a vehicle brake system includes: an input device for detecting braking operation by an operator; and an electric brake actuator for generating a hydraulic brake pressure, based on at least an electric signal according to the braking operation, wherein the vehicle body attachment structure, for an electric brake actuator, according to the braking operation is applied to the vehicle brake system.

According to this aspect of the invention, it is possible to obtain a vehicle brake system provided with an electric brake actuator capable of improving the versatility.

In still another aspect of the invention, the electric brake actuator is provided with a penetration hole penetrating along a direction substantially perpendicular to an axial line of the cylinder mechanism, and the electric brake actuator is supported by a fixing member penetrating through the penetration hole.

According to this aspect of the invention, a motor cylinder device can be supported in a stable state by making the fixing member penetrate from one side along the penetration hole, the penetration hole penetrating in the direction substantially perpendicular to the axial line of the cylinder, and fixing the fixing member on the other side, the fixing member penetrating through the penetration hole. As a result, by supporting the electric brake actuator stably with a simple structure, reduction in weight is attained and the attachability can be improved.

In yet another aspect of the invention, the fixing member is a bolt, and the bolt is provided with an elastic body for elastically supporting the electric brake actuator main body.

According to this aspect of the invention, as the electric brake actuator is elastically supported by an elastic body provided on the bolt, vibration generated on the electric brake actuator is reduced, and an external force applied to the electric brake actuator from outside can be satisfactorily damped by the elastic force of the elastic body.

In another aspect of the invention, the vehicle body attachment structure for an electric brake actuator includes: a first boss portion provided at one end portion along an axial direction of the penetration hole; a second boss portion provided at another end portion along the axial direction of the penetration hole; and a third boss portion provided along a vertical downward direction perpendicular to the axial line of the penetration hole, wherein the electric brake actuator is supported at three points formed by the first to third boss portions.

According to this aspect of the invention, it is possible to stably support the electric brake actuator at three points formed by the first boss portion and the second boss portion, which are provided on the both end portions along the axial direction of the penetration hole, and the third boss portion provided in the vertical downward direction. As a result, displacement of the electric brake actuator can be reduced.

In still another aspect of the invention, the vehicle body attachment structure for an electric brake actuator, includes: an electric-brake-actuator fixing bracket for fixing an electric brake actuator provided with a cylinder for generating a hydraulic brake pressure, based on an electric signal according to braking operation, wherein the electric-brake-actuator fixing bracket includes: a penetration portion through which the electric brake actuator penetrates along an axial direction of the cylinder, wherein the penetration portion restricts displacement of a portion, of the electric brake actuator, having passed through; a support portion for supporting a substantially central portion of the electric brake actuator in a state of penetrating through along the axial direction of the cylinder mechanism; and a fixing portion to be fixed by being attached to the vehicle body.

According to this aspect of the invention, the electric brake actuator can be stably supported by a simple structure formed by the penetration portion to have a part of the electric brake actuator penetrate through, the support portion for supporting the central portion, and the fixing portion fixed to the vehicle body.

In yet another aspect of the invention, a pipe connected to the electric brake actuator, brake fluid flowing through the pipe, is connected to the cylinder mechanism, and a portion of the pipe, the portion being located at a position away from a connection part of the pipe with the cylinder mechanism, is supported by an intermediate portion of the electric brake actuator.

According to this aspect of the invention, in case that the electric brake actuator is displaced by receiving a force such as vibration, a load is divided and applied to the connection part of the pipe with the cylinder mechanism, the pipe being connected to the cylinder mechanism, and to the supported part of the pipe supported by the intermediate portion of the electric brake actuator. Further, as the intermediate portion of the electric brake actuator is ordinarily close to a mount portion for attaching the electric brake actuator to the vehicle body side, displacement upon reception of a force such as vibration is small. Thus, a stress caused in the pipe by the displacement of the electric brake actuator is reduced.

In another aspect of the invention, the vehicle body attachment structure further includes a hold member for holding the pipe, wherein an attachment portion for attaching the hold member to the electric brake actuator is provided on the driving force transmission section.

According to this aspect of the invention, it is possible to support the pipe to the driving force transmission section, which is ordinarily heavy and rigid, using the hold member. Thus, the pipe can be easily and stably supported at the electric brake actuator.

In still another aspect of the invention, the cylinder mechanism and the driving force transmission section are separable.

According to this aspect of the invention, as the cylinder mechanism, which defines the position of the connection part of the pipe, and the driving force transmission section are separately structured, these two can be produced independently from each other. In case that it is necessary to change the position of the connection part of the pipe, for example in case of mounting on vehicles in plural types, it is possible to make an arrangement by changing only the cylinder mechanism while commonly using the driving force transmission section as it is.

In yet another aspect of the invention, the pipe extends along a direction perpendicular to the axial direction at the connection part with the cylinder mechanism such as to get away from a surface of the electric brake actuator, thereafter again gets close to the surface of the electric brake actuator, and is supported at a thus close portion thereof by the electric brake actuator.

According to this aspect of the invention, interference with other components in the periphery can be prevented. Further, displacement along the circumferential direction in case of occurrence of rotation fluctuation substantially around the central axis of the cylinder mechanism upon reception of a force such as vibration becomes small. Accordingly, an advantage is obtained in that a stress caused by the rotation fluctuation can be reduced.

In another aspect of the invention, the cylinder mechanism is provided with plural ports each of which communicating respectively with either a first hydraulic pressure chamber or a second hydraulic pressure chamber that are formed side by side along the axial direction inside the cylinder mechanism, and the pipe is provided in a plural number, at least corresponding to the plural ports.

According to this aspect of the invention, even in a case that plural pipes are connected to a cylinder mechanism of a so-called tandem type, stresses caused in the respective pipes can be reduced.

In still another aspect of the invention, the plural pipes are disposed side by side around the central axis of the cylinder mechanism, and are attached to the intermediate portion, being held by a single hold member.

According to this aspect of the invention, plural pipes can be attached to the intermediate portion all at once, the portion supporting the pipes becomes compact, and the number of components and the man-hours can be reduced.

In yet another aspect of the invention, the electric brake actuator is attached to a side member extending along a front/rear direction on a left side and a right side of the vehicle.

According to this aspect of the invention, a heavy electric brake actuator can be attached to a side member of the vehicle. The side member is a robust member, and the electric brake actuator can be stably attached to a robust portion.

In another aspect of the invention, the input device and the electric brake actuator are separately arranged from each other, and at least the electric brake actuator is disposed in a housing room in which a vehicle power unit is housed.

According to this aspect of the invention, the input device and the electric brake actuator can be arranged separately from each other, and further, the electric brake actuator can be disposed in the housing room (power plant housing room) in which the vehicle power unit is housed.

In still another aspect of the invention, a direction along which an electrical cable for supplying the electric signal is connected to the electric brake actuator, a direction along which a piping tube for supplying brake fluid or the like is connected to a reservoir provided on the electric brake actuator, and a direction of fastening by a fastening member for fixing the electric brake actuator to the vehicle, are the same direction.

According to this aspect of the invention, the direction along which the electrical cable for supplying the electric signal is connected to the electric brake actuator, and the direction along which the piping tube for supplying brake fluid or the like is connected to the reservoir provided on the electric brake actuator, can be made the same direction. Further, the fastening member for fixing the electric brake actuator to the vehicle can be fastened from the same direction.

Accordingly, the work of connecting the electric cable to the electric brake actuator, the work of connecting the piping tube to the reservoir, and the work of fixing the electric brake actuator, can be carried out from one direction.

In yet another aspect of the invention, the electric brake actuator can be attached to the side portion of the side member.

According to this aspect of the invention, the electric brake actuator can be attached to the side portion of the side member, which attains further stabilization.

In still another aspect of the invention, the electric brake actuator is attached to the upper portion of the side member.

According to this aspect of the invention, the electric brake actuator can be attached to the upper portion of the side member, and further stabilization can be attained.

In yet another aspect of the invention, the electric brake actuator includes: a first mount portion that supports the electric brake actuator on the vehicle body; and a second mount portion that is different from the first mount portion and supports a tip end side of the cylinder mechanism on the vehicle body.

According to this aspect of the invention, the second mount portion is formed on the tip end side of the cylinder mechanism, and displacement on the tip end side of the cylinder mechanism can thereby be effectively reduced. That is, in case of supporting the electric brake actuator on the vehicle body, the first mount portion is in general formed on the actuator mechanism side having an electric motor and a driving force transmission section. In this case, the cylinder mechanism is in a state of protruding from the actuator mechanism. Consequently, when the electric brake actuator receives a force such as vibration and a rotational action is caused around the support point of the first mount portion, the displacement at the tip end of the elongated cylinder mechanism is amplified compared with the first mount portion, and an excessive stress acts on a pipe for hydraulic pressure connected to the cylinder mechanism. In this situation, in this aspect of the invention, with a structure that supports the electric brake actuator on the vehicle body through the first mount portion, by forming the second mount portion, which is different from the first mount portion, on the tip end side along the axial direction of the cylinder mechanism and supporting the tip end side of the cylinder mechanism, it is possible to effectively reduce the displacement on the tip end side of the cylinder mechanism. As a result, it is possible to inhibit an excessive stress from acting on the pipe for hydraulic pressure connected to the cylinder mechanism.

In still another aspect of the invention, the actuator mechanism, the actuator mechanism including the electric motor and the driving force transmission section, and the cylinder mechanism are structured separable from each other.

According to this aspect of the invention, as the portion provided with the first mount portion and the cylinder mechanism are structured separately from each other, these two can be produced independently from each other. In case it is necessary to change the position and the shape of a mount portion, for example, in a case of mounting on vehicles in plural types, it is possible to make an arrangement by changing only the portion where the mount portion is provided while commonly using a cylinder mechanism as it is.

In yet another aspect of the invention, the first mount portion is provided in a vicinity of a center of gravity of the electric brake actuator, the second mount portion is provided at the tip end of the cylinder mechanism, and the electric brake actuator is supported by two points in the vicinity of the center of gravity and at the tip end.

According to this aspect of the invention, by providing the first mount portion in the vicinity of the center of gravity of the electric brake actuator, swinging of the electric brake actuator can be reduced even in a case of receiving a force such as vibration, and displacement of the electric brake actuator can be effectively reduced.

In still another aspect of the invention, the first mount portion is provided in a vicinity of a center of gravity of the electric brake actuator, the cylinder mechanism is provided in advance with plural unprocessed bosses, one of the bosses is formed for the second mount portion for attaching the electric brake actuator to the vehicle body, and rest of the bosses are formed for a port/ports communicating with the cylinder mechanism.

According to this aspect of the invention, by using the boss (stub boss) side, which is the side not used for ports, as the second mount portion, it is not necessary to form an additional mount portion on the electric brake actuator, and it is only necessary, for example, to form screw holes in the bosses for fastening by bolts. Accordingly, processing of the mount portions is easy.

In still another aspect of the invention, the electric brake actuator is disposed such as to incline with the tip end of the cylinder mechanism facing upward.

During replacing the pipe connected to the cylinder mechanism of the electric brake actuator, it is possible that air is mixed in, and if air remains mixed in the cylinder mechanism, it will be a serious obstacle to generation of a hydraulic pressure. In this situation, according to the above-described aspect of invention, by disposing the electric brake actuator with inclination such that the tip end of the cylinder mechanism faces upward, it is possible to easily evacuate air from the cylinder mechanism by the nature of air even in a case that air has mixed in for example during fitting the pipe.

Advantages of the Invention

According to the present invention, it is possible to provide a vehicle body attachment structure for an electric brake actuator of a vehicle brake system wherein the vehicle body attachment structure is capable of reducing the displacement of the electric brake actuator in case of receiving a force such as vibration.

BRIEF DESCRIPTION OF THE DRAWINGS

FIG. 47 is an exploded perspective view of a motor cylinder device in a seventh embodiment according to the invention;

FIG. 48 is an exploded perspective view of a driving force transmission section;

EMBODIMENTS FOR CARRYING OUT THE INVENTION

Figure 1:
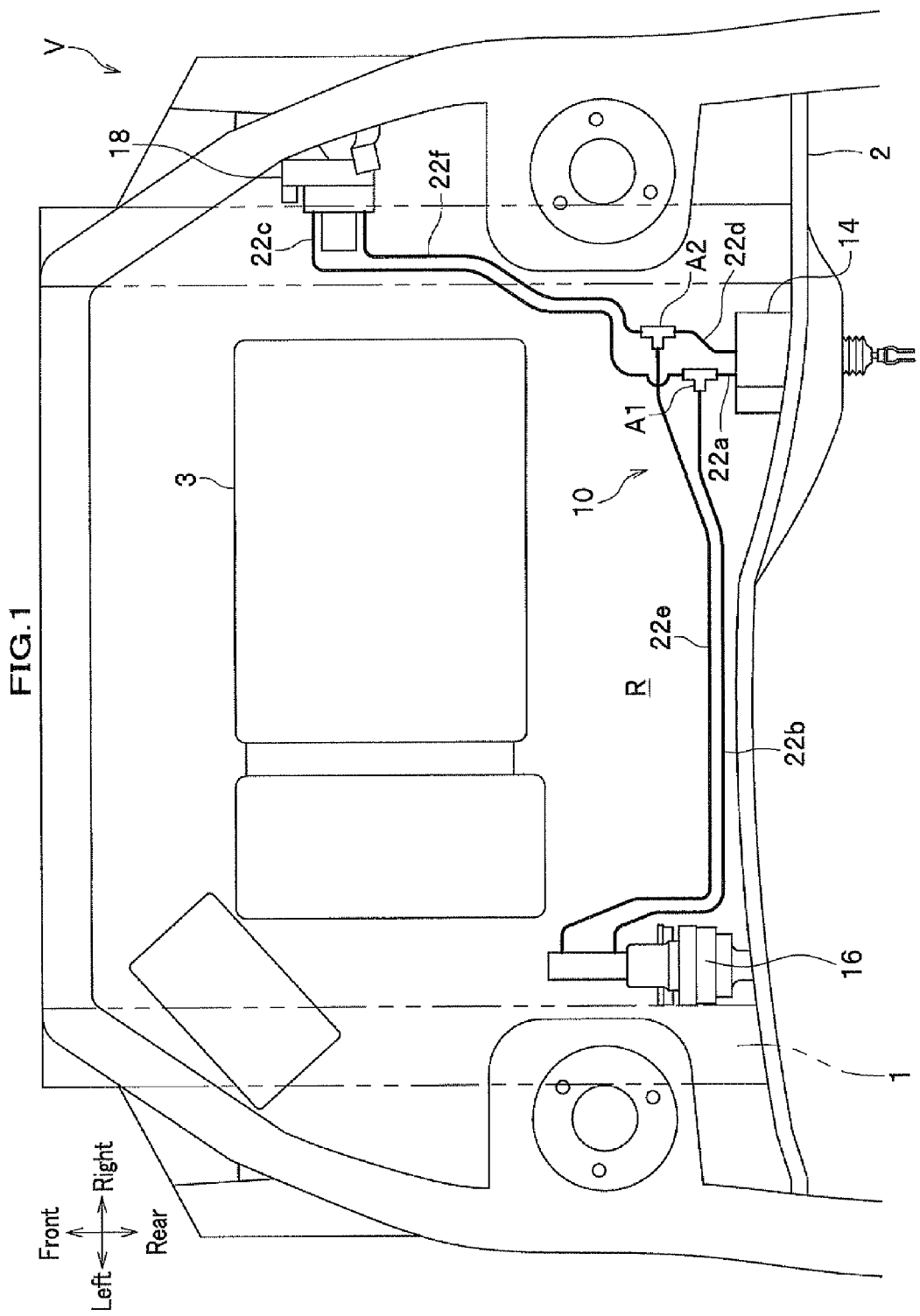
FIG. 1 shows disposition structure of a vehicle brake system in a vehicle wherein a vehicle body attachment structure for an electric brake actuator in a first embodiment according to the present invention is applied to the vehicle brake system.

In the following, an embodiment according to the present invention will be described in detail, referring to the drawings, as appropriate.

First Embodiment

FIG. 1 shows a disposition configuration of a vehicle brake system in a vehicle V, wherein a vehicle body attachment structure, in a first embodiment according to the invention, for an electric brake actuator is applied to the vehicle brake system. The front/rear and left/right directions of the vehicle V are represented by arrows in FIG. 1.

A vehicle brake system 10 in the present embodiment includes two brake systems one of which is a brake system of a by-wire type for a normal use, which operates a brake by transmitting an electric signal, and the other one is a brake system of a conventional hydraulic type for fail-safe, which operates a brake by transmitting a hydraulic pressure.

As shown in FIG. 1, the vehicle brake system 10 is configured by an input device 14 for inputting a braking operation by an operator (driver), a motor cylinder device 16 as an electric brake actuator for generating a hydraulic brake pressure, based on at least an electric signal according to the braking operation, and a vehicle stability assist device 18 (hereinafter, referred to as the VSA device 18, VSA: registered trademark) as a vehicle behavior stabilizer for assisting stabilization of the behavior of the vehicle, based on the hydraulic brake pressure generated by the motor cylinder device 16.

Incidentally, the motor cylinder device 16 may be provided with means for generating a hydraulic pressure, based on an electric signal according to a different physical amount, without being limited to an electric signal according to a braking operation by a driver. An electrical signal according to a different physical amount refers to a signal, by an automatic brake system for example, for avoiding collision of the vehicle V, based on determination by an ECU (Electronic Control Unit) with a sensor or the like on a state around the vehicle V, without depending on a braking operation by a driver.

The input device 14 is herein applied to a right-hand drive vehicle, and is fixed to the right side along the vehicle transverse direction of a dashboard 2 through a bolt or the like. Incidentally, the input device 14 may be one applied to a left-hand drive vehicle. The motor cylinder device 16 is disposed, for example, on the left side along the vehicle transverse direction, which is the side opposite to the input device, and is attached to a vehicle body 1 such as a side frame or the like on the left side through an attaching bracket 190 (see FIG. 7). The VSA device 18 is configured, being provided with functions, for example, an ABS (antilock brake system) function to prevent a wheel lock in braking, a TCS (traction control system) function to prevent spin-off of wheels in accelerating or the like, and a function to reduce transverse sliding in turning. For example, the VSA device 18 is attached to the vehicle body through a bracket at the front end on the right side along the vehicle transverse direction. Incidentally, instead of the VSA device 18, an ABS device having only an ABS function to prevent a wheel lock in braking may be connected. The internal detailed configurations of the input device 14, the motor cylinder device 16, and the VSA device 18 will be described later.

The input device 14, motor cylinder device 16, and VSA device 18 are disposed separately from each other with piping tubes 22a to 22f therebetween in a structure mounting room R in which structures 3 such as an engine or a motor for running provided anterior to the dashboard 2 of a vehicle V are mounted. The vehicle brake system 10 is applicable to any one of a front-wheel drive vehicle, a rear-wheel drive vehicle, and a four-wheel drive vehicle. Further, for a by-wire bake system, the input device 14 and the motor cylinder device 16 are electrically connected with control means, not shown, by a harness, not shown.

Figure 2:
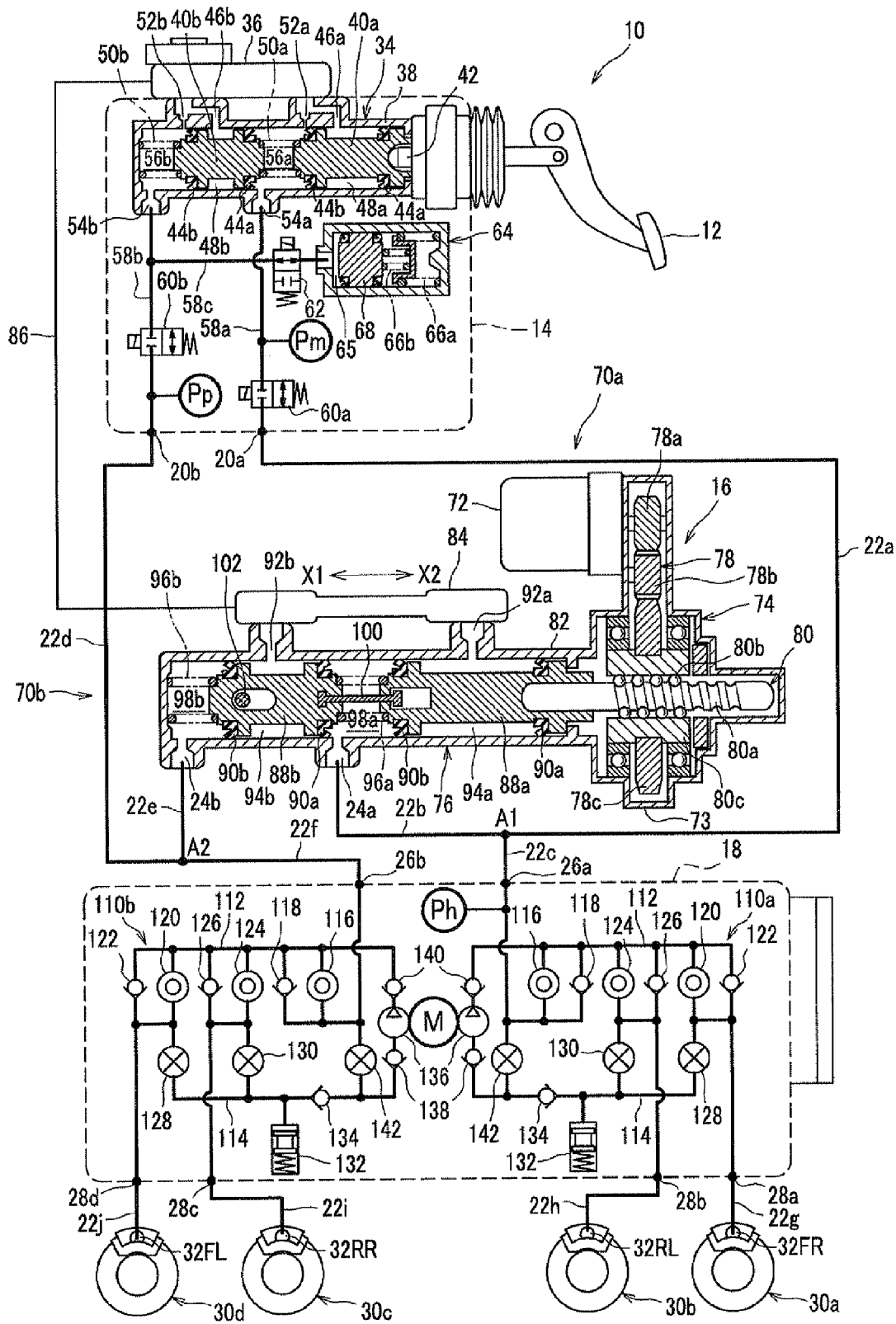
FIG. 2 shows the schematic configuration of the vehicle brake system.

FIG. 2 is a schematic configuration diagram showing the vehicle brake system 10.

Regarding hydraulic passages, with a connection point A1 in FIG. 2 as a reference, a connection port 20a of the input device 14 and the connection point A1 are connected by a first piping tube 22a. Further, an output port 24a of the motor cylinder device 16 and the connection point A1 are connected by a second piping tube 22b. Still further, an inlet port 26a of the VSA device 18 and the connection point A1 are connected by a third piping tube 22c.

With another connection point A2 in FIG. 2 as a reference, another connection port 20b of the input device 14 and the connection point A2 are connected by a fourth piping tube 22d. Further, another output port 24b of the motor cylinder device 16 and the connection point A2 are connected by a fifth piping tube 22e. Still further, another inlet port 26b of the VSA device 18 and the connection point A2 are connected by a sixth piping tube 22f.

The VSA device 18 is provided with a plurality of outlet ports 28a to 28d. The first outlet port 28a is connected, by a seventh piping tube 22g, with a wheel cylinder 32FR of a disk brake mechanism 30a provided at the front wheel on the right side. The second outlet port 28b is connected, by an eighth piping tube 22h, with a wheel cylinder 32RL of a disk brake mechanism 30b provided at the rear wheel on the left side. The third outlet port 28c is connected, by a ninth piping tube 22i, with a wheel cylinder 32RR of a disk brake mechanism 30c provided at the rear wheel on the right side. The fourth outlet port 28d is connected, by a tenth piping tube 22j, with a wheel cylinder 32FL of a disk brake mechanism 30d provided at the front wheel on the left side.

In this case, brake fluid is supplied through the piping tubes 22g-22j connected with the respective outlet ports 28a-28d to the respective wheel cylinders 32FR, 32RL, 32RR, and 32FL of the disk brake mechanisms 30a-30d. A rise in the hydraulic pressure in the wheel cylinders 32FR, 32RL, 32RR, or 32FL operates the wheel cylinders 32FR, 32RL, 32RR, or 32FL, and a braking force is applied to the corresponding wheel (the right-side front wheel, the left-side rear wheel, the right-side rear wheel, or the left-side front wheel).

The vehicle brake system 10 is arranged to be mountable on various vehicles including, for example, a vehicle driven only by an engine (internal combustion engine), a hybrid vehicle, an electric vehicle, and a fuel cell vehicle.

The input device 14 includes a tandem master cylinder 34 capable of generating a hydraulic pressure by a driver's (operator's) operation of the brake pedal 12 and a first reservoir 36 provided at the master cylinder 34. Inside a cylinder tube 38 of the master cylinder 34, two pistons 40a and 40b are slidably arranged, wherein the two pistons 40a and 40b are separated from each other with a certain distance along the axial direction of the cylinder tube 38. The one piston 40a is disposed adjacent to the brake pedal 12 and is connected with the brake pedal 12 through a push rod 42. The other piston 40b is disposed with a longer distance than the piston 40a from the brake pedal 12.

A pair of piton packings 44a and 44b is attached to the outer circumferential surfaces of the one and the other pistons 40a and 40b through an annular stepped portion. Back chambers 48a and 48b communicated with later-described supply ports 46a and 46b are formed between the pair of packings 44a and 44b. Further, a spring member 50a is arranged between the one and the other pistons 40a and 40b. Another spring member 50b is arranged between the other piston 40b and the side end portion of the cylinder tube 38.

Incidentally, instead of providing piston packings 44a and 44b on the outer circumferential surfaces of the pistons 40a and 40b, packings may be attached to the inner circumferential surface of the cylinder tube 38.

The cylinder tube 38 of the master cylinder 34 is provided with two supply ports 46a and 46b, two relief ports 52a and 52b, and two output ports 54a and 54b. In this case, the respective supply ports 46a (46b), and the respective relief ports 52a (52b), are arranged to respectively join with each other and communicate with a reservoir chamber, not shown, in the first reservoir 36.

Further, inside the cylinder tube 38 of the master cylinder 34, a first pressure chamber 56a and a second pressure chamber 56b are provided to generate a hydraulic brake pressure according to a braking effort applied by the driver to the brake pedal 12. The first pressure chamber 56a is arranged such as to communicate with the connection port 20a through a first hydraulic passage 58a. The second pressure chamber 56b is arranged such as to communicate with the other connection port 20b through a second hydraulic passage 58b.

A pressure sensor Pm is provided between the master cylinder 34 and the connection port 20a and on the upstream side of the first hydraulic passage 58a. A first shut-off valve 60a of a solenoid valve of a normally open type is provided on the downstream side of the first hydraulic passage 58a. This pressure sensor Pm detects the hydraulic pressure on the upstream side, which is the master cylinder 34 side of the first shut-off valve 60a, on the first hydraulic passage 58a.

Between the master cylinder 34 and the other connection port 20b, a second shut-off valve 60b of a solenoid valve of a normally open type is arranged on the upstream side with respect to the second hydraulic passage 58b, and a pressure sensor Pp is arranged on the downstream side with respect to the second hydraulic passage 58b. On the second hydraulic passage 58b, this pressure sensor Pp detects the hydraulic pressure on the downstream side of the second shut-off valve 60b, in other words, on the side of the wheel cylinders 32FR, 32RL, 32RR, and 32FL.

The normal openness of the first shut-off valve 60a and the second shut-off valve 60b refers to the type of a valve configured such that the normal position (the position of the valve body during demagnetization (when current is not applied)) is in a state of being at an open position (always open). Incidentally, in FIG. 2, the first shut-off valve 60a and the second shut-off valve 60b are shown in a state during magnetization (A later-described third shut-off valve 62 is similar).

At a point between the master cylinder 34 and the second shut-off valve 60b, the second hydraulic passage 58b is provided with a branched hydraulic passage 58c branching from the second hydraulic passage 58b. On the branched hydraulic passage 58c, serially connected are a third shut-off valve 62 of a solenoid valve of a normally close type and a stroke simulator 64. The normal closing of the third shut-off valve 62 refers to the type of a valve configured such that the normal position (the position of the valve body during demagnetization (when current is not applied)) is in a state of being at a closed position (always closed).

The stroke simulator 64 is disposed on the second hydraulic passage 58b and on the master cylinder 34 side of the second shut-off valve 60b. The stroke simulator 64 is provided with a hydraulic pressure chamber 65 communicating with the branched hydraulic passage 58c, and is arranged such as to be able to suck brake fluid let out through the hydraulic pressure chamber 65 from the second pressure chamber 56b of the master cylinder 34.

Further, the stroke simulator 64 includes a first return spring 66a with a larger spring constant, a second return spring 66b with a smaller spring constant, the first and the second springs 66a and 66b being serially disposed with each other, and a simulator piston 68 urged by the first and second return springs 66a and 66b. The stroke simulator 64 is arranged such that the increase gradient of the pedal reaction force is set low during an early stage of pedaling the brake pedal 12, and the pedal reaction force is set high during a later stage of pedaling, so that the pedal feeling of the brake pedal 12 becomes equivalent to an existing master cylinder.

The configuration of the hydraulic passages is roughly categorized into a first hydraulic system 70a that connects the first pressure chamber 56a of the master cylinder 34 and the plurality of wheel cylinders 32FR and 32RL, and a second hydraulic system 70b that connects the second pressure chamber 56b of the master cylinder 34 and the plurality of wheel cylinders 32RR and 32FL.

The first hydraulic system 70a is configured by the first hydraulic passage 58a connecting the output port 54a of the master cylinder 34 (cylinder tube 38) of the input device 14 and the connection port 20a, the piping tubes 22a and 22b connecting the connection port 20a of the input device 14 and the output port 24a of the motor cylinder device 16, the piping tubes 22b and 22c connecting the output port 24a of the motor cylinder device 16 and the inlet port 26a of the VSA device 18, and the piping tubes 22g and 22h connecting the outlet ports 28a and 28b of the VSA device 18 and the respective wheel cylinders 32FR and 32RL.

The second hydraulic system 70b includes the second hydraulic passage 58b connecting the output port 54b of the master cylinder 34 (cylinder tube 38) of the input device 14 and the other connection port 20b, the piping tubes 22d and 22e connecting the other connection port 20b of the input device 14 and the output port 24b of the motor cylinder device 16, the piping tubes 22e and 22f connecting the output port 24b of the motor cylinder device 16 and the inlet port 26b of the VSA device 18, and the piping tubes 22i and 22j for connecting the outlet ports 28c and 28d of the VSA device 18 and the respective wheel cylinders 32RR and 32FL.

As a result, by forming the hydraulic passages by the first hydraulic system 70a and the second hydraulic system 70b, the respective wheel cylinders 32FR and 32RL, and the respective wheel cylinders 32RR and 32FL, can be independently operated so that braking forces which are independent from each other can be generated.

The motor cylinder device 16 includes an actuator mechanism 74 having an electric motor 72 and a driving force transmission section 73, and a cylinder mechanism 76 urged by the actuator mechanism 74. Further, the driving force transmission section 73 of the actuator mechanism 74 includes a gear mechanism (decelerating mechanism) 78 for transmitting the rotational driving force of the electric motor 72, and a ball screw assembly 80 including a ball screw shaft 80a and balls 80b, wherein the ball screw assembly 80 converts this rotational driving force into a linear driving force.

The cylinder mechanism 76 includes the cylinder main body 82 in a cylindrical shape and a second reservoir 84 arranged at the cylinder main body 82. The second reservoir 84 is connected by a piping tube 86 with the first reservoir 36 arranged at the master cylinder 34 of the input device 14. Brake fluid reserved in the first reservoir 36 is supplied to the second reservoir 84 through the piping tube 86.

The first slave piston 88a and the second slave piston 88b are slidably arranged inside the cylinder main body 82, wherein the slave pistons 88a and 88b are separated from each other with a certain distance along the axial direction of the cylinder main body 82. The first slave piston 88a is disposed adjacent to the ball screw assembly 80 side, is in contact with one end portion of the ball screw shaft 80a, and moves in the direction arrow X1 or X2 integrally with the ball screw shaft 80a. The second slave piston 88b is disposed farther than the slave piston 88a from the ball screw assembly 80 side.

A pair of slave piston packings 90a and 90b are attached on the outer circumferential surfaces of the first and second slave pistons 88a and 88b through an annular stepped portion. A first back chamber 94a and a second back chamber 94b are formed, which are respectively communicated with later-described reservoir ports 92a and 92b, are formed between the pair of the slave piston packings 90a and 90b. Further, a first return spring 96a is arranged between the first and second slave pistons 88a and 88b, and a second return spring 96b is arranged between the second slave piston 88b and the side end portion of the cylinder main body 82.

The cylinder main body 82 of the cylinder mechanism 76 is provided with the two reservoir ports 92a and 92b and the two output ports 24a and 24b. In this case, the reservoir port 92a (92b) is arranged such as to communicate with a reservoir chamber, not shown, in the second reservoir 84.

A first hydraulic pressure chamber 98a is provided in the cylinder main body 82 to generate a hydraulic brake pressure that is output from the output port 24a to the wheel cylinders 32FR and 32RL side. Further, a second hydraulic pressure chamber 98b is provided in the cylinder main body 82 to generate a hydraulic brake pressure that is output from the other output port 24b to the wheel cylinders 32RR and 32FL side.

Restricting means 100 is provided between the first slave piston 88a and the second slave piston 88b to restrict the maximum stroke and the minimum stroke of the slave piston 88a and the slave piston 88b. Further, the second slave piston 88b is provided with a stopper pin 102 that restricts the sliding range of the second slave piston 88b, and inhibits over return of the slave piston 88b to the slave piston 88a side. The restricting means 100 and the stopper pin 102 prevent a defect of another system at the time of a defect of one system, particularly at the time of backup when braking is carried out by a hydraulic brake pressure generated by the master cylinder 34.

The VSA device 18 is a known one and includes a first brake system 110a for control of the first hydraulic system 70a connected to the disk brake mechanisms 30a and 30b (wheel cylinders 32FR and 32RL) for the right-side front wheel and the left-side rear wheel. Further, the VSA device 18 includes a second brake system 110b for control of the second hydraulic system 70b connected to the disk brake mechanisms 30c and 30d (wheel cylinders 32RR and 32FL) for the right-side rear wheel and the left-side front wheel. Incidentally, the first brake system 110a may be formed by a hydraulic system connected to disk brake mechanisms arranged at the left-side front wheel and the right-side front wheel, and the second brake system 110b may be formed by a hydraulic system connected to disk brake mechanisms arranged at the left-side rear wheel and the right-side rear wheel. Further, the first brake system 110a may be formed by a hydraulic system connected to disk brake mechanisms arranged at the right-side front wheel and the right-side rear wheel on one side of the vehicle body, and the second brake system 110b may be formed by a hydraulic system connected to disk brake mechanisms arranged at the left-side front wheel and the left-side rear wheel on the other one side of the vehicle body.

As the first brake system 110a and the second brake system 110b have the same structure, the same reference symbols are assigned to elements corresponding between the first brake system 110a and the second brake system 110b. In the following, the first brake system 110a will be mainly described while describing the second brake system 110b with bracketed notes.

The first brake system 110a (the second brake system 110b) has a first shared hydraulic passage 112 and a second shared hydraulic passage 114 shared by the wheel cylinders 32FR and 32RL (32RR and 32FL). The VSA device 18 includes a regulator valve 116, which is a normal-open type solenoid valve disposed between the inlet port 26a and the first shared hydraulic passage 112, a first check valve 118 that is arranged in parallel with the regulator valve 116 to allow the brake fluid to flow from the inlet port 26a side to the first shared hydraulic passage 112 side (while inhibiting the brake fluid from flowing from the first shared hydraulic passage 112 side to the inlet port 26a side), and a first invalve 120, which is a normally open type solenoid valve disposed between the first shared hydraulic passage 112 and the first outlet port 28a. Further, the VSA device 18 includes a second check valve 122 that allows the brake fluid to flow from the first outlet port 28a side to the first shared hydraulic passage 112 side (while inhibiting the brake fluid from flowing from the first shared hydraulic passage 112 side to the first outlet port 28a side), the second check valve 122 being arranged parallel with the first invalve 120, a second invalve 124, which is a normally open type solenoid valve disposed between the first shared hydraulic passage 112 and the second outlet port 28b, and a third check valve 126 that allows the brake fluid to flow from the second outlet port 28b side to the first shared hydraulic passage 112 side (while inhibiting the brake fluid from flowing from the first shared hydraulic passage 112 side to the second outlet port 28b side), the third check valve 126 being arranged parallel to the second invalve 124.

Still further, the VSA device 18 includes a first outvalve 128, which is a normally closed type solenoid valve disposed between the first outlet port 28a and the second shared hydraulic passage 114, a second outvalve 130, which is a normally closed type solenoid valve disposed between the second outlet port 28b and the second shared hydraulic passage 114, a reservoir 132 connected to the second shared hydraulic passage 114, a fourth check valve 134 that is disposed between the first shared hydraulic passage 112 and the second shared hydraulic passage 114 to allow the brake fluid to flow from the second shared hydraulic passage 114 side to the first shared hydraulic passage 112 side (while inhibiting the brake fluid from flowing from the first shared hydraulic passage 112 side to the second shared hydraulic passage 114 side), a pump 136 that is disposed between the fourth check valve 134 and the first shared hydraulic passage 112 to supply the brake fluid from the second shared hydraulic passage 114 side to the first shared hydraulic passage 112 side, a suction valve 138 and a discharge valve 140 provided before and after the pump 136, a motor M for driving the pump 136, and a suction valve 142 disposed between the second shared hydraulic passage 114 and the inlet port 26a.

Incidentally, in the first brake system 110a, a pressure sensor Ph is provided on the hydraulic passage adjacent to the inlet port 26a to detect the hydraulic brake pressure having been generated by the first hydraulic pressure chamber 98a of the motor cylinder device 16 and output from the output port 24a of the motor cylinder device 16. Detection signals detected by the respective pressure sensors Pm, Pp, and Ph are introduced to control means, not shown.

The vehicle brake system 10 in the present embodiment is basically configured as described above, and the operation and advantages thereof will be described below.

During normal operation when the vehicle brake system 10 normally functions, the first shut-off valve 60a and the second shut-off valve 60b, which are normally open type solenoid valves, turn into a valve close state by being magnetically excited, and the third shut-off valve 62, which is a normally closed type solenoid valve, turns into a valve open state by being magnetically excited (see FIG. 2). Accordingly, as the first hydraulic system 70a and the second hydraulic system 70b are shut off by the first shut-off valve 60a and the second shut-off valve 60b, it does not occur that a hydraulic brake pressure generated by the master cylinder 34 of the input device 14 is transmitted to the wheel cylinders 32FR, 32RL, 32RR, and 32FL of the disk brake mechanisms 30a-30d.

At this moment, a hydraulic brake pressure generated by the second pressure chamber 56b of the master cylinder 34 is transmitted through the branched hydraulic passage 58c and the third shut-off valve 62 in the valve open state to the hydraulic pressure chamber 65 of the stroke simulator 64. The hydraulic brake pressure supplied to the hydraulic pressure chamber 65 displaces the simulator piston 68 against the spring forces of the springs 66a and 66b, and a stroke of the brake pedal 12 is thereby allowed and a pseudo petal reaction force is generated to be applied to the brake pedal 12. As a result, a brake feeling without a strange feeling for a driver can be obtained.

In such a system state, when the control means, not shown, has detected pedaling of the brake pedal 12 by the driver, the control means drives the electric motor 72 of the motor cylinder device 16 to urge the actuator mechanism 74, and displaces the first slave piston 88a and the second slave piston 88b toward the direction arrow X1 in FIG. 2 against the spring forces of the first return spring 96a and the second return spring 96b. By the displacements of the first slave piston 88a and the second slave piston 88b, the brake fluid in the first hydraulic pressure chamber 98a and the brake fluid in the second hydraulic pressure chamber 98b are subjected to a pressure increase, balancing with each other, and a desired hydraulic brake pressure is thus generated.

These hydraulic brake pressures of the first hydraulic pressure chamber 98a and the second hydraulic pressure chamber 98b in the motor cylinder device 16 are transmitted through the first invalve 120 and the second invalve 124 of the VSA device 18 which are in the valve open state, to the wheel cylinders 32FR, 32RL, 32RR, and 32FL of the disk brake mechanisms 30a-30d. By operation of the wheel cylinders 32FR, 32RL, 32RR, and 32FL, desired braking forces are applied to the respective wheels.

In other words, by the vehicle brake system 10 in the present embodiment, during a normal state when the motor cylinder device 16, which functions as an electric brake actuator (hydraulic pressure source for power), control means such as an ECU, not shown, for by-wire control, and the like are operable, a so-called brake by-wire type brake system becomes active wherein in a state that communications between the master cylinder 34, which generates a hydraulic brake pressure by an operator's pedaling of the brake pedal 12, and the disk brake mechanisms 30a-30d (wheel cylinders 32FR, 32RL, 32RR, an 32FL) that brake the respective wheels are shut off by the first shut-off valve 60a and the second shut-off valve 60b, the disk brake mechanisms 30a-30d are operated by the hydraulic brake pressure generated by the motor cylinder device 16. Accordingly, the present embodiment can be suitably applied to a vehicle, such as an electric vehicle or the like, in which a negative pressure that could be caused by a conventional internal combustion engine does not exist.

On the other hand, during an abnormal state when the motor cylinder device 16 or the like is inoperable, a so-called conventional hydraulic type brake system becomes active, wherein the first shut-off valve 60a and the second shut-off valve 60b are respectively made in a valve open state, and the third shut-off valve 62 is made in a valve close state so as to transmit a hydraulic brake pressure generated by the master cylinder 34 to the disk brake mechanisms 30a-30d (wheel cylinders 32FR, 32RL, 32RR, 32FL) and thereby operate the disk brake mechanisms 30a-30d (wheel cylinders 32FR, 32RL, 32RR, and 32FL).

Figure 3:
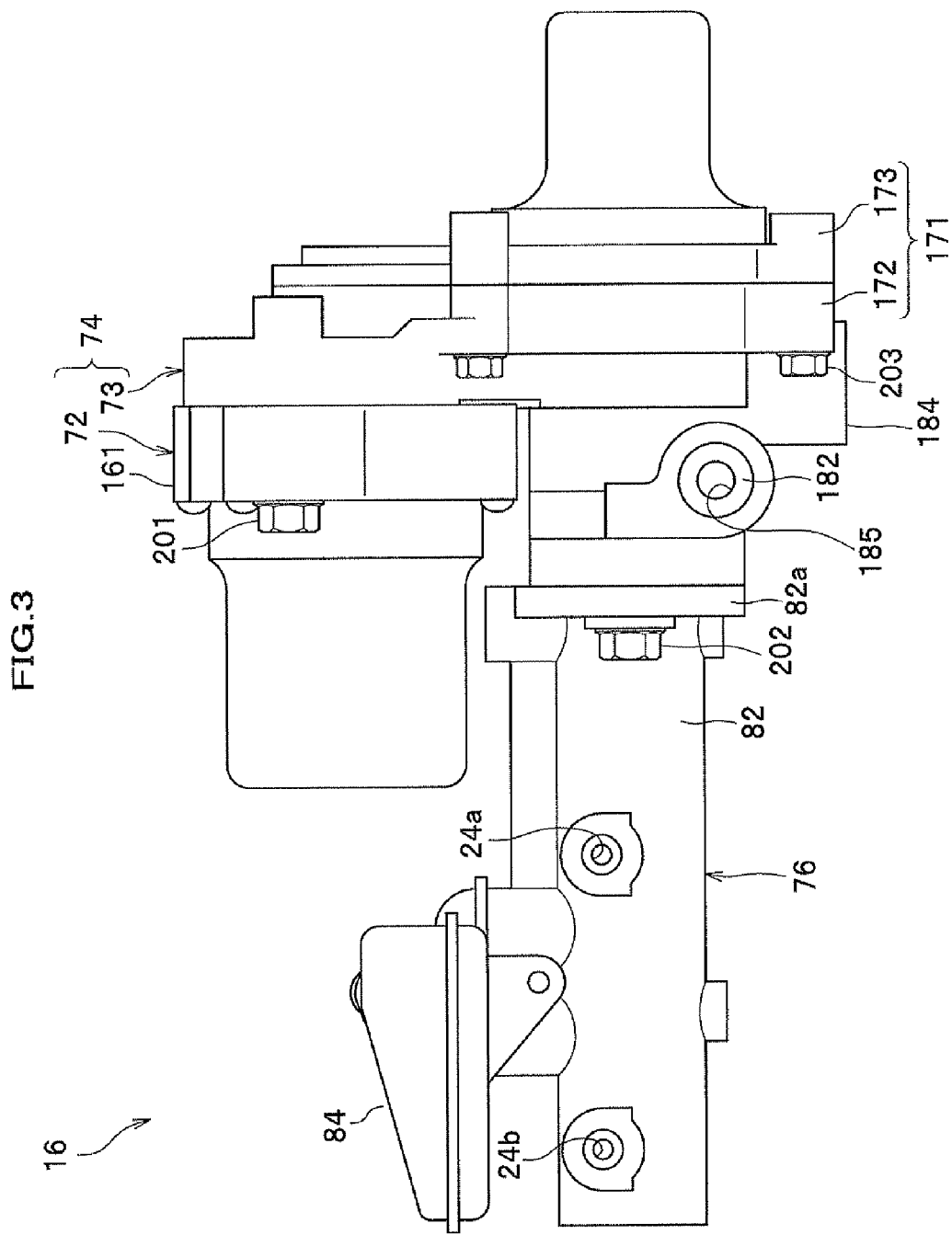
FIG. 3 is a side view of a motor cylinder device.
Figure 4:
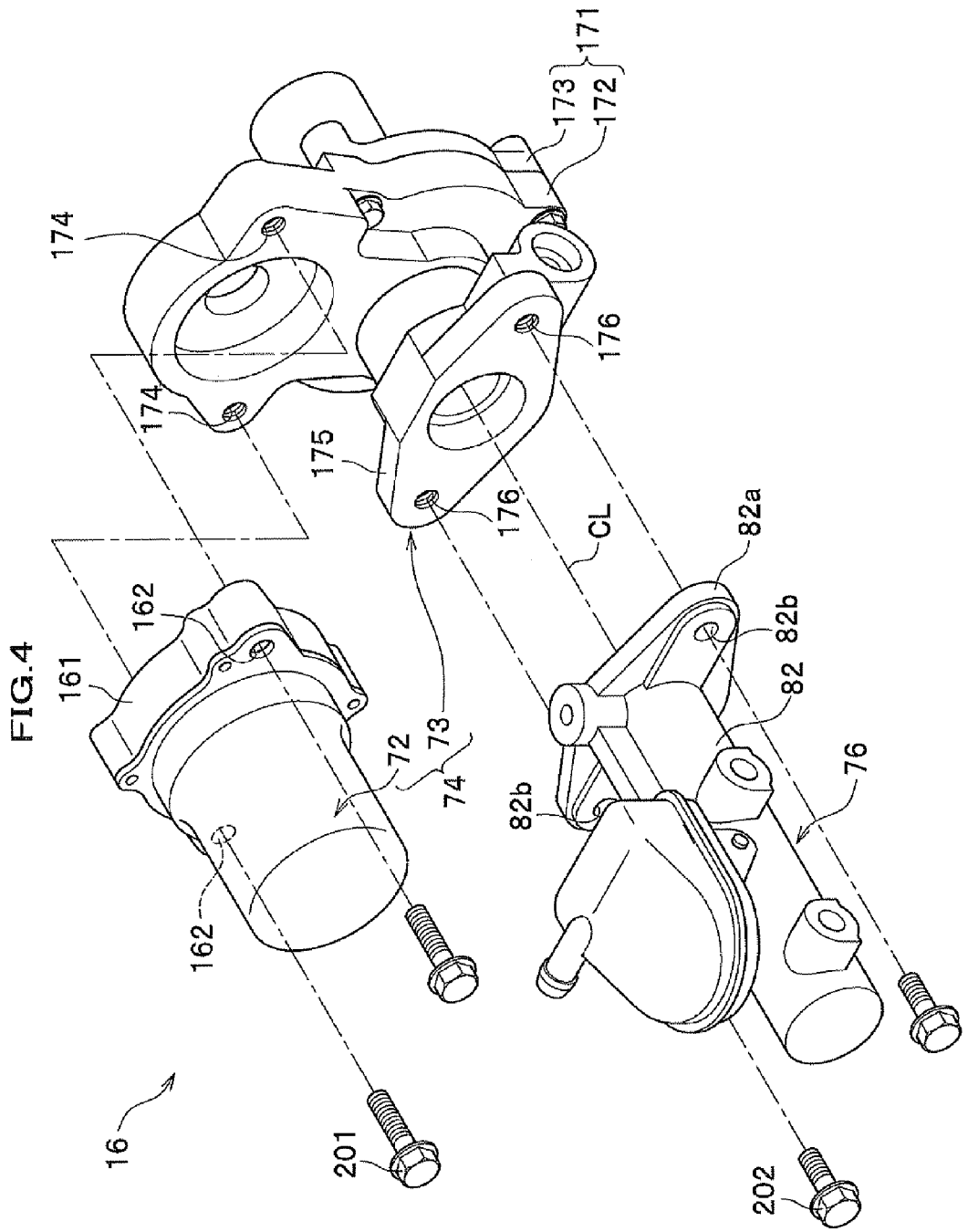
FIG. 4 is an exploded perspective view of the motor cylinder device.
Figure 5:
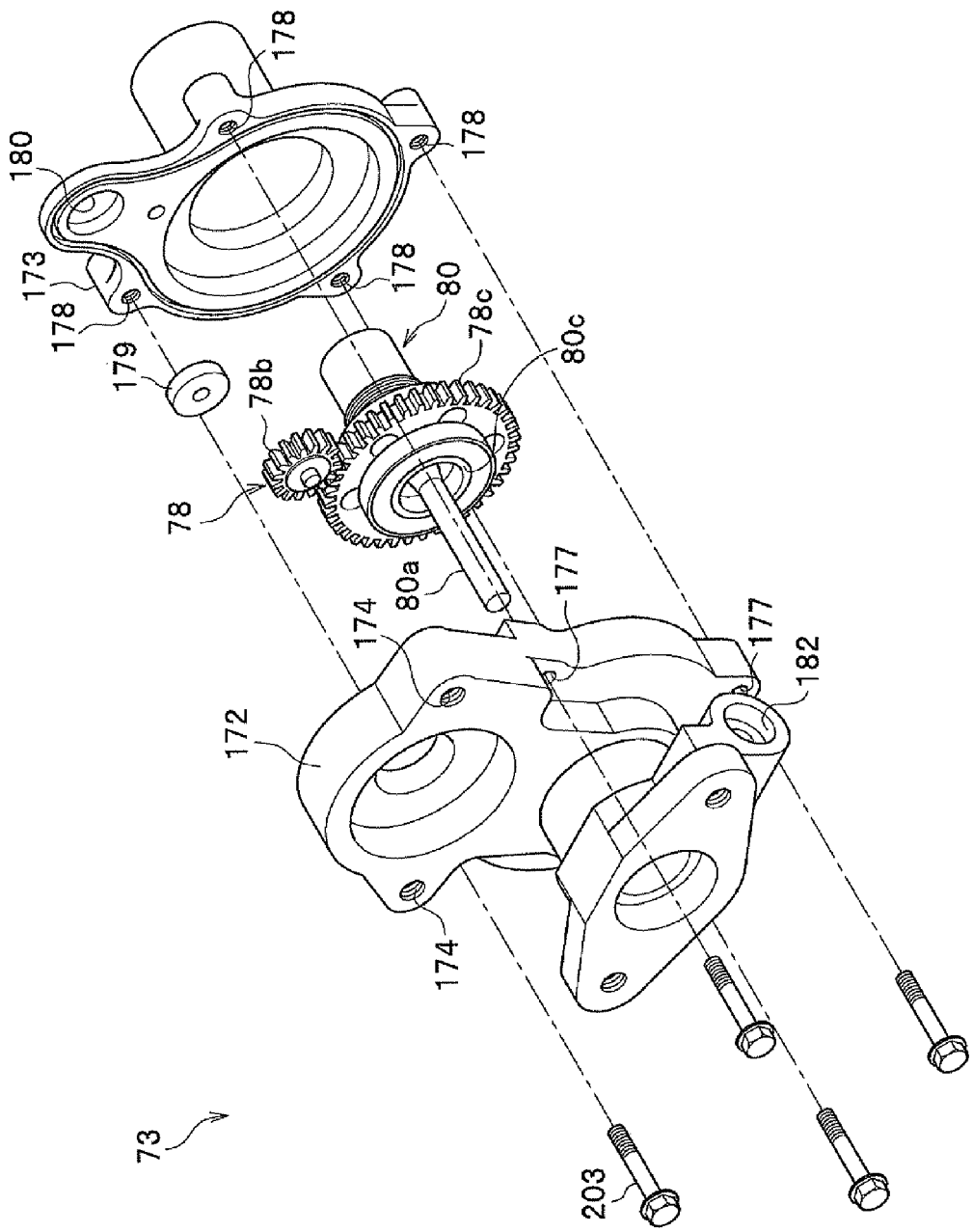
FIG. 5 is an exploded perspective view of a driving force transmission section.

The motor cylinder device 16 will be described below in further detail. FIG. 3 is a side view of the motor cylinder device 16. FIG. 4 is an exploded perspective view of the motor cylinder device 16. FIG. 5 is an exploded perspective view of the driving force transmission section 73.

As shown in FIG. 3, the motor cylinder device 16 includes the electric motor 72 that is driven, based on an electric signal from the control means, not shown, the driving force transmission section 73 for transmitting a driving force generated by the electric motor 72, and the cylinder mechanism 76 for applying a pressure to the brake fluid by moving the first and second slave pistons 88a and 88b (see FIG. 2) along the axial direction by the driving force transmitted from the driving force transmission section 73.

The electric motor 72 is disposed higher than the cylinder mechanism 76. By such an arrangement, it is possible to prevent occurrence of an event that an oil component such as grease in the driving force transmission section 73 enters the electric motor 72 by the action of gravity and reaches an electrical component or the like, not shown.

As shown in FIG. 4, the electric motor 72, the driving force transmission section 73, and the cylinder mechanism 76 are arranged separable from each other. The electric motor 72 has a base portion 161 connected with a harness, not shown, and the base portion 161 is provided with a plurality of penetration holes 162 which bolts 201 penetrate. Further, the end portion, on the driving force transmission section 73 side, of the cylinder main body 82 of the cylinder mechanism 76 is provided with a flange portion 82a having a plurality of penetration holes 82b which bolts 202 penetrate.

The driving force transmission section 73 has an actuator housing 171 for housing driving force transmitting mechanical elements (see FIG. 5), such as a gear mechanism 78, a ball screw assembly 80, and the like. The actuator housing 171 includes a housing 172 disposed on the cylinder mechanism 76 side and a cover 173 for covering the opening end of the housing 172, the opening end being on the side opposite to the cylinder mechanism 76. The housing 172 and the cover 173 of the driving force transmission section 73 are formed from a metal, such as an aluminum alloy (The material for the cylinder main body 82 of the cylinder mechanism 76 is similar).

The housing 172 of the driving force transmission section 73 is provided with a plurality of motor attaching screw holes (motor attachment portion) 174 for attaching the electric motor 72 to the driving force transmission section 73. Further, a flange portion 175 is arranged at the end portion, on the cylinder mechanism 76 side, of the housing 172 that is provided with a plurality of cylinder mechanism attaching screw holes 176 for attaching the cylinder mechanism 76 to the driving force transmission section 73.

The electric motor 72 is attached to the driving force transmission section 73 and fixed, by making bolts 201 penetrate through the penetration holes 162 and thus screwing the bolts 201 into the motor attaching screw holes 174. The cylinder mechanism 76 is attached to the driving force transmission section 73 and fixed, by making the bolts 202 penetrate through the penetration holes 82b and thus screwing the bolts 202 into the cylinder mechanism attaching screw holes 176.

As shown in FIG. 5, the gear mechanism 78 and the ball screw assembly 80 are housed in the actuator housing 171 (see FIG. 4). The gear mechanism 78 includes a pinion gear 78a (see FIG. 2) fixed to the output shaft of the electric motor 72, an idle gear 78b engaging with the pinion gear 78a, and a ring gear 78c engaging with the idle gear 78b. The ball screw assembly 80 includes the ball screw shaft 80a whose tip end side contacts with the first slave piston 88a, balls 80b (see FIG. 2) disposed in the thread groove on the ball screw shaft 80a, and a nut portion 80c screw-engaged with the ball screw shaft 80a through the balls 80b.

The nut portion 80c is fixed to the inner circumferential surface of the ring gear 78c, for example by pressure fitting; a rotational driving force transmitted from the gear mechanism 78 is thereby input to the nut portion 80c; the rotational driving force is thereafter converted into a linear driving force by the ball screw assembly 80; and the ball screw shaft 80a can thus move forward and backward along the axial direction.

The housing 172 and the cover 173 of the actuator housing 171 are arranged separable from each other. The housing 172 is provided with a plurality of penetration holes 177 which the bolts 203 penetrate, wherein the penetration holes 177 are disposed around the central axis CL (see FIG. 4) of the first and second slave pistons 88a and 88b (see FIG. 2). A plurality of housing attaching screw holes 178 are formed at positions, of the cover 173, corresponding to the penetration holes 177. By making the bolts 203 penetrate the penetration holes 177 and thereby screwing the bolts 203 into the housing attaching screw holes 178, the housing 172 and the cover 173 are joined with each other. Incidentally, the reference symbol 179 in FIG. 5 represents a bearing for rotatably supporting the tip end of the output shaft of the electric motor 72, and the bearing 179 is insertion-fitted to a hole portion 180 formed on the cover 173.

Figure 6:
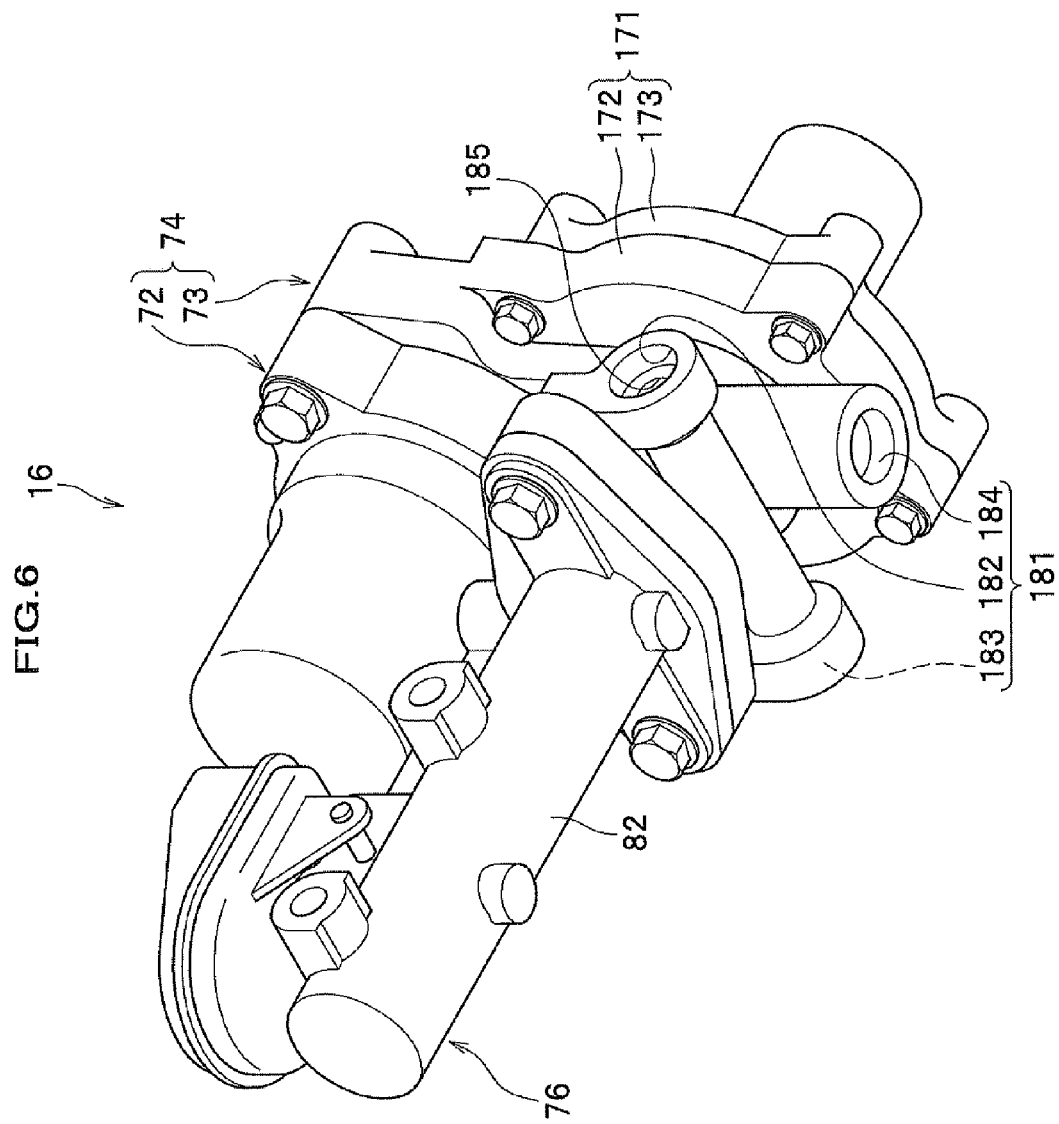
FIG. 6 is a perspective view of the motor cylinder device in a view from oblique below.
Figure 7:
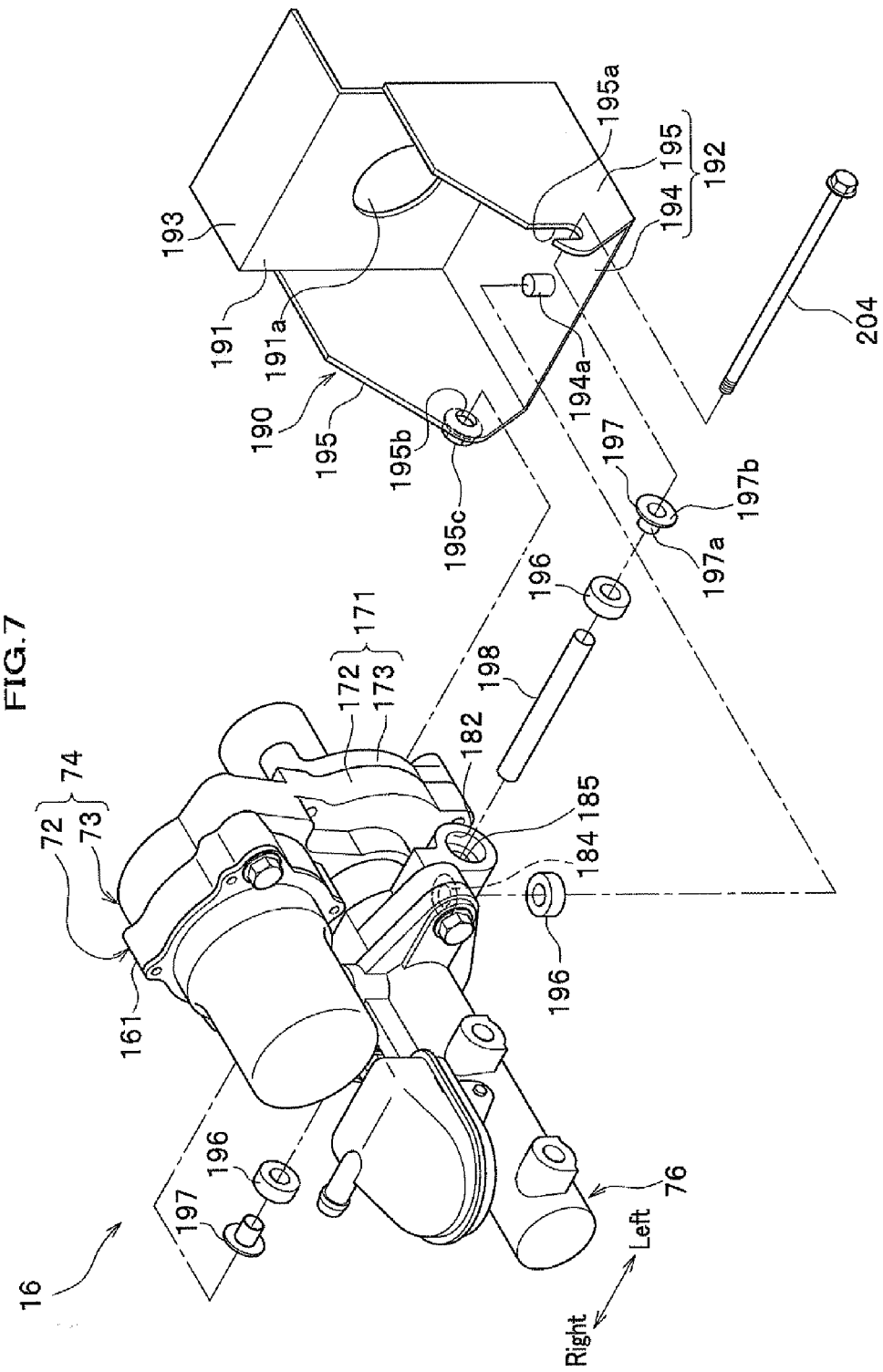
FIG. 7 is an exploded perspective view for illustration of a method of attaching the motor cylinder device to a vehicle body.

FIG. 6 is a perspective view of the motor cylinder device 16 in a view from oblique below. FIG. 7 is an exploded perspective view for illustration of a method of attaching the motor cylinder device 16 to the vehicle body.

As shown in FIG. 6, the motor cylinder device 16 is provided with a mount portion 181 to attach the motor cylinder device 16 to a vehicle body 1 (see FIG. 1), for example, at a side frame. In a view from the cover 173 side with respect to the central axis CL (see FIG. 4) direction, the mount portion 181 includes a left mount hole 182 located on the left side, a right mount hole 183 located on the right side, and a lower mount hole 184 arranged downward. The left, right, and lower mount holes 182-184 are respectively formed with a cylindrical recession. Further, the mount portion 181 has a penetration hole 185 with an axial center perpendicular to the central axis CL (see FIG. 4), wherein the penetration hole 185 is formed along the axial center common to the left mount hole 182 and the right mount hole 183.

The mount portion 181 is provided in the vicinity of the center of gravity of the motor cylinder device 16. Concretely, the mount portion 181 is provided at a part where the position of the center of gravity (or the closest part to the center of gravity) of the motor cylinder device 16, out of the electric motor 72, the driving force transmission section 73, and the cylinder mechanism 76, is present, that is at the driving force transmission section 73 in this case. In more detail, the mount portion 181 is arranged at the housing 172 of the driving force transmission section 73, the housing 172 being provided with the motor attaching screw holes 174 (see FIG. 5). However, the mount portion 181 can be arranged at any position as long as the position is in the vicinity of the central gravity of the motor cylinder device 16 without being limited to the position of the driving force transmission section 73 nor the housing 172. By such a structure, the vicinity of the center of gravity of the motor cylinder device 16 can be supported and swinging of the motor cylinder device 16 can be reduced even when a force, such as vibration, is applied.

As shown in FIG. 7, the motor cylinder device 16 is attached by the first mount portion 181 (see FIG. 6) to the vehicle body 1 (see FIG. 1), at the side frame for example, through an attaching bracket 190.

The attaching bracket 190 is provided with a support plate 192 structured by a pair of side plates 195, 195 for supporting the motor cylinder device 16, the side plates 195, 195 sandwiching the motor cylinder device 16 from the left/right directions by screw fastening with bolts (male screw members) 204, and a bottom plate 194 for supporting the middle portion (central portion) of the motor cylinder device 16 from below, the bottom plate 194 being substantially horizontal and continuous from the bottom sides of the pair of side plates 195, 195. Further, the attaching bracket 190 is provided with a back plate 191 that is substantially along the vertical direction and continuous from the side plates 195, 195 and the bottom plate 194, and provided with a fixing plate 193 for fixing to the vehicle body side, the fixing plate 193 being continuous from the back plate 191. An opening 191a which the protrusion portion of the cover 173 penetrates is formed close to the center of the back plate 191.

One side plate 195 is provided with a notch 195a substantially in a U-shape which a bolt 204 can penetrate, and the other side plate 195 is provided with a penetration hole 195b which the bolt 204 penetrates. A nut 195c, which can be screw-engaged with the bolt 204, is fixed and attached to the outside of the penetration hole 195b of the side plate 195 for example by welding. Further, a pin 194*a* is provided, being standing at the center of the upper surface of the bottom plate 194.

In attaching the motor cylinder device 16 to the attaching bracket 190, used are a first collar 198 in a long cylindrical shape, a rubber bush 196, a second collar 197 having a cylindrical portion 197*a* and a flange 197*b* formed at the end of the cylindrical portion 197*a*, and the bolt 204. The rubber bush 196 is an elastic member of rubber substantially in a cylindrical shape, and is capable of absorbing vibration and shock. Incidentally, it is also possible to improve the flexibility of the rubber bush 196 for example by forming asperity on the outer circumferential surface of the rubber bush 196.

First, the first collar 198 is inserted inside the penetration hole 185 of the motor cylinder device 16. Then, each of the second collars 197 having the cylindrical portion 197*a* insertion-fitted to the inside of the central hole of the rubber bush 196 is insertion-fitted and attached to the inside the left mount hole 182 or the right mount hole 183. Further, the rubber bush 196 is insertion-fitted into the lower mount hole 184 and thus attached. Then, the pin 194*a* is insertion fitted to the central hole of the rubber bush 196 attached to the lower mount hole 184 so that the motor cylinder device 16 is installed on the bottom plate 194 of the attaching bracket 190. Thus, the middle portion of the motor cylinder device 16 is supported from below by the lower mount hole 184. Herein, it is also possible to form a female screw hole at the bottom surface of the lower mount hole 184, insert a cylindrical collar instead of the pin 194*a* into the central hole of the rubber bush 196, and insert a male screw member such as a bolt from below the penetration hole formed through the bottom plate 194.

When the motor cylinder device 16 is installed on the bottom plate 194, the rubber bushes 196 and the second collars 197 attached respectively to the left mount hole 182 and the right mount hole 183 of the motor cylinder device 16 are respectively at the notch 195*a* and the penetration hole 195*b* of the side plates 195. The bolt 204 penetrates through the notch 195*a*, the second collar 197, the rubber bush 196, the first collar 198, the rubber bush 196, and the second collar 197 in this order, and thus can be screwed into the nut 195*c*. At this moment, the bolt 204 comes to penetrate through the penetration hole 185. Incidentally, in a state that the bolt 204 penetrates through the penetration hole 185, the motor cylinder device 16 may be installed on the bottom plate 194 such that the shaft portion of the bolt 204 passes inside the notch 195*a* and the head portion passes through the outer side of the notch 195*a*. Thus, by the left mount hole 182 and the right mount hole 183, the motor cylinder device 16 is supported such as to be sandwiched by the pair of side plates 195, 195 from the left and right directions.

In such a manner, the left mount hole 182 and the right mount hole 183 are arranged, allowing fastening to the vehicle body side by one bolt 204 inserted through the penetration hole 185. Accordingly, screw fastening is possible by only fastening once by one bolt 204 at the left and right opening ends of the penetration hole 185, and the attaching work is thereby easy.

Then, the fixing plate 193 of the attaching bracket 190 is fixed by screw fastening or welding to the vehicle body 1 (see FIG. 1) such as a side frame or the like, directly or through another connecting member not shown.

As described above, by using the mount portion 181, it is possible to attach the motor cylinder device 16 to the vehicle body side, supporting three portions, namely the left, right, and bottom portions of the motor cylinder device 16. Further, as the mount portion 181 of the motor cylinder device 16 is floating-supported on the vehicle body side through the rubber bush 196, vibration and shock can be absorbed.

As described above, according to the present embodiment, the mount portion 181 for attaching the motor cylinder device 16 to the vehicle body 1 such as a side frame or the like is provided in the vicinity of the center of gravity of the motor cylinder device 16.

Accordingly, as it is possible to support the vicinity of the center of gravity of the motor cylinder device 16, swinging can be reduced even when the motor cylinder device 16 receives a force among a variety including vibration of the vehicle V or the motor cylinder device 16 itself, a shock, etc., and displacement of the motor cylinder device 16 can be effectively reduced.

Further, as the mount portion 181 can be concentrated in the vicinity of gravity, the space dedicated to attachment can be small, and it is thereby possible to increase the degree of freedom of attaching the motor cylinder device 16 to the vehicle body 1 even in a narrow disposition space.

Further, the mount portion 181 is provided at a portion separable from the cylinder mechanism 76 of the motor cylinder device 16, concretely, at the driving force transmission section 73, which is ordinarily heavy and rigid. In such a manner, as the driving force transmission section 73, which is provided with the mount portion 181, and the cylinder mechanism 76 are in separate structures, these two can be produced independently from each other. In case it is necessary to change the position and the shape of the mount portion 181, for example, in a case of mounting on vehicles in plural types, it is possible to make an arrangement by changing only the driving force transmission section 73 while commonly using the cylinder mechanism 76 as it is.

Concretely, the mount portion 181 is provided on a actuator housing 172 that is provided with a motor attaching screw hole 174 for attaching the electric motor 72 to the driving force transmission section 73 (see FIG. 5). Accordingly, in case it is necessary to change the position and the shape of a mount portion 181 and/or the attaching position of the electric motor 72 with respect to the rotational direction corresponding to the connecting direction of harness, for example, in a case of mounting on vehicles in plural types, it is possible to make an arrangement by changing only the mount portion 181 and the housing 172, of the driving force transmission section 73, provided with the motor attaching screw hole 174.

Figure 8:
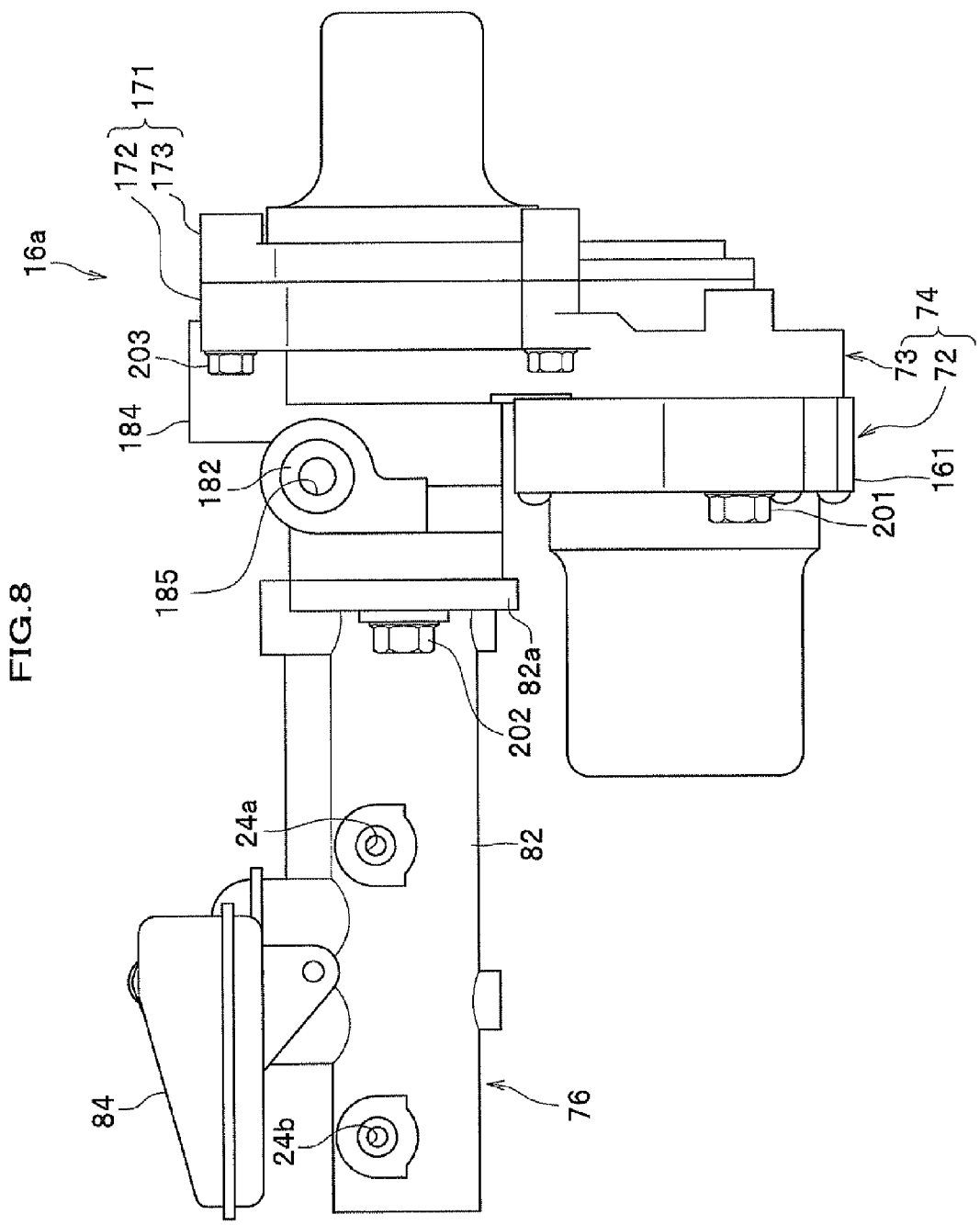
FIG. 8 is a side view of a motor cylinder device in a modified example of the first embodiment.

FIG. 8 is a side view of a motor cylinder device 16*a* in a modified example of the first embodiment. Assuming that the structures and actions similar to the embodiment shown in FIGS. 1 to 7 are taken in into this modified example, detailed description will be omitted, and only differences will be described below. As shown in FIG. 8, in this modified example, an electric motor 72 is located lower than the cylinder mechanism 76, and a mount portion 181 (182 to 184) is provided at an upper portion of a motor cylinder device 16*a*. That is, the electric motor 72 and the driving force transmission section 73 are attached to the cylinder mechanism 76 in a state of being rotated by 180 degrees around the central axis CL (see FIG. 4). By such a structure, as the motor cylinder device 16*a* can be supported by bridging with a lower location of the electric motor 72, the anti-vibration performance can be improved.

The present invention has been described above based on the first embodiment, however, the invention is not limited to the structures described in the foregoing embodiment, and the structures can be modified and changed, as appropriate, in a scope without departing from the spirit of the invention, including appropriately combining or selecting structures described in the foregoing embodiment.

For example, in the foregoing embodiment, the mount portion 181 is configured by the left, right, and lower mount holes 182 to 184, the invention is not limited thereto. Any one is applicable as the mount portion 181 as long as it is provided in the vicinity of gravity of the motor cylinder device 16, and it is possible to change the shape, the number, the support direction, the fixing method using a screw, pin, or the like, as appropriate.

Further, although the motor cylinder device 16 is attached to the vehicle body side through the attaching bracket 190 in the foregoing embodiment, the invention is not limited thereto. The motor cylinder device 16 may be attached to the vehicle body side, for example through a connecting member in a different shape, or directly.

Still further, although the cylinder mechanism 76 and the driving force transmission section 73 are structured separable from each other in the foregoing embodiment, the invention is not limited thereto. For example, the cylinder main body 82 and the actuator housing 172 may be formed by integral forming.

Second Embodiment

A second embodiment according to the present invention will be described below. The same symbols will be assigned to elements common with those in the first embodiment, and structures and description in the first embodiment will be quoted.

The support structure of a piping tube connected to the motor cylinder device 16 will be described, referring to FIG. 9.

Figure 9:
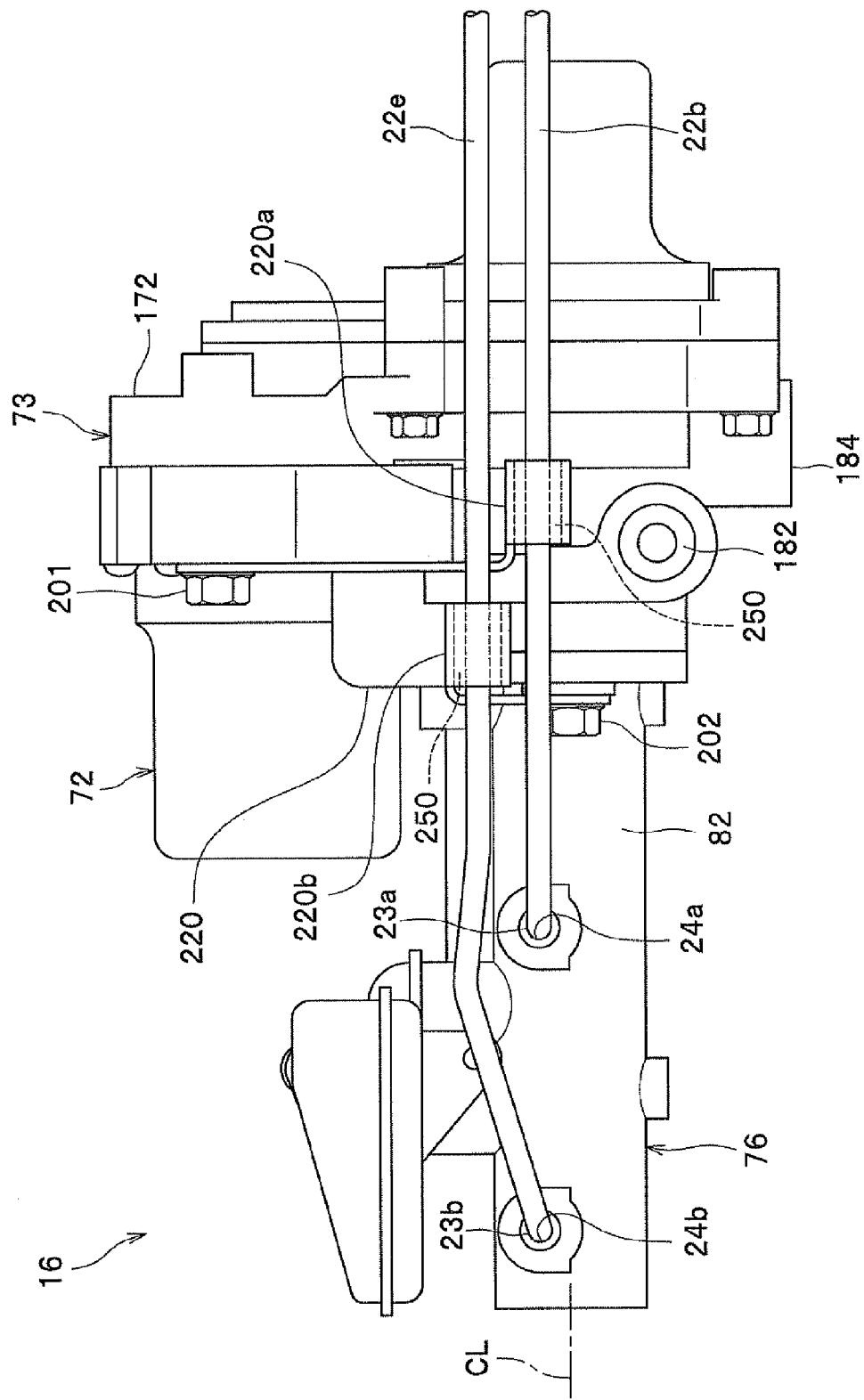
FIG. 9 is a side view of the support structure of a piping tube in a second embodiment according to the present invention.

FIG. 9 is a side view of the support structure of a piping tube in a second embodiment according to the present invention. In order to avoid the complexity of the view, members including an attaching bracket 190 will be omitted in FIG. 9.

As shown in FIG. 9, piping tubes 22b and 22e, in which brake fluid flows, are connected to output ports 24a and 24b formed on the cylinder main body 82 of the cylinder mechanism 76. The piping tubes 22b and 22e are formed by bending a metal pipe such as a steel pipe into a certain shape (Other piping tubes are similarly formed.)

Respective portions of the piping tubes 22b and 22e, which are located at respective positions away along the respective extending directions of the piping tubes 22b and 22e from the connection parts 23a and 23b with the output ports 24a and 24b of the piping tubes 22b and 22e, are supported and fixed by the intermediate portion of the motor cylinder device 16. The intermediate portion of the motor cylinder device 16 refers to a portion that is not the end portion of the motor cylinder device 16 along the central axis direction CL of a first and second slave pistons 88a and 88b (see FIG. 2) but is a portion near the center of the motor cylinder device 16. Incidentally, the central axis CL is also the central axis of the cylinder mechanism 76.

In such a manner, a structure is formed such that in case the motor cylinder device 16 is displaced by receiving a force such as vibration, a load is divided to the connecting part of the piping tube 22b, 22e with the cylinder mechanism 76 and the supported part of the piping tube 22b, 22e supported by the intermediate portion of the motor cylinder device 16.

Herein, a clamp member 220 is provided to hold the piping tubes 22b and 22e, wherein the housing 172 of a driving force transmission section 73 is provided with motor attaching screw holes 174 and cylinder mechanism attaching screw holes 176 (see FIG. 4), as attaching portions for attaching the clamp member 220 to the motor cylinder device 16. Accordingly, the piping tubes 22b and 22e can be supported by the driving force transmission section 73, which is ordinarily heavy and rigid, using the clamp member 220. Incidentally, the motor attaching screw holes 174 and the cylinder mechanism attaching screw holes 176 also serve as attaching screw holes for attaching the clamp member 220.

Further, the piping tubes 22b and 22e are disposed side by side around the central axis CL of the cylinder mechanism 76, held by the single clamp member 220, and thus attached to the intermediate portion of the motor cylinder device 16. Incidentally, the piping tubes 22b and 22e may be attached to the intermediate portion of the motor cylinder device 16 by two separated respective clamp members. Further, an attaching screw hole for the clamp member may be provided differently from the motor attaching screw hole 174 and the cylinder mechanism attaching screw hole 176.

The clamp member 220 is formed by punching a metal sheet with elasticity, of a spring steel for example, into a certain shape and thereafter performing a bending process. The clamp member 220 is provided with a first curved portion 220a that has a cross-section substantially in a C-shape and is capable of holding therein the piping tube 22b, to which a rubber bush 250 is attached, and a second curved portion 220b that has a cross-section substantially in a C-shape and is capable of holding therein the piping tube 22e, to which a rubber bush 250 is attached. The rubber bushes 250 are elastic members of rubber substantially in a cylindrical shape and are capable of absorbing vibration and shock. Incidentally, it is also possible to improve the flexibility, for example by forming asperity on the outer circumferential surface of the rubber bush 250.

Connecting the piping tubes 22b and 22e to the motor cylinder device 16 is carried out in the following manner.

First, in assembling the motor cylinder device 16, by making bolts 201 and 202 penetrate through penetration holes, not shown, of the clamp members 220 and screwing the bolts 201 and 202 into the motor attaching screw hole 174 and the cylinder mechanism attaching screw hole 176 (see FIG. 4) as attaching portions, the clamp member 220 is attached in advance to the motor cylinder device 16. Then, while the portions of the rubber bushes 250, 250, which have been attached to the piping tubes 22b and 22e in advance, are held respectively by the first curved portion 220a and the second curved portion 220b, the tip end portions of the piping tubes 22b and 22e are connected to the output ports 24a and 24b of the cylinder mechanism 76.

Figure 10:
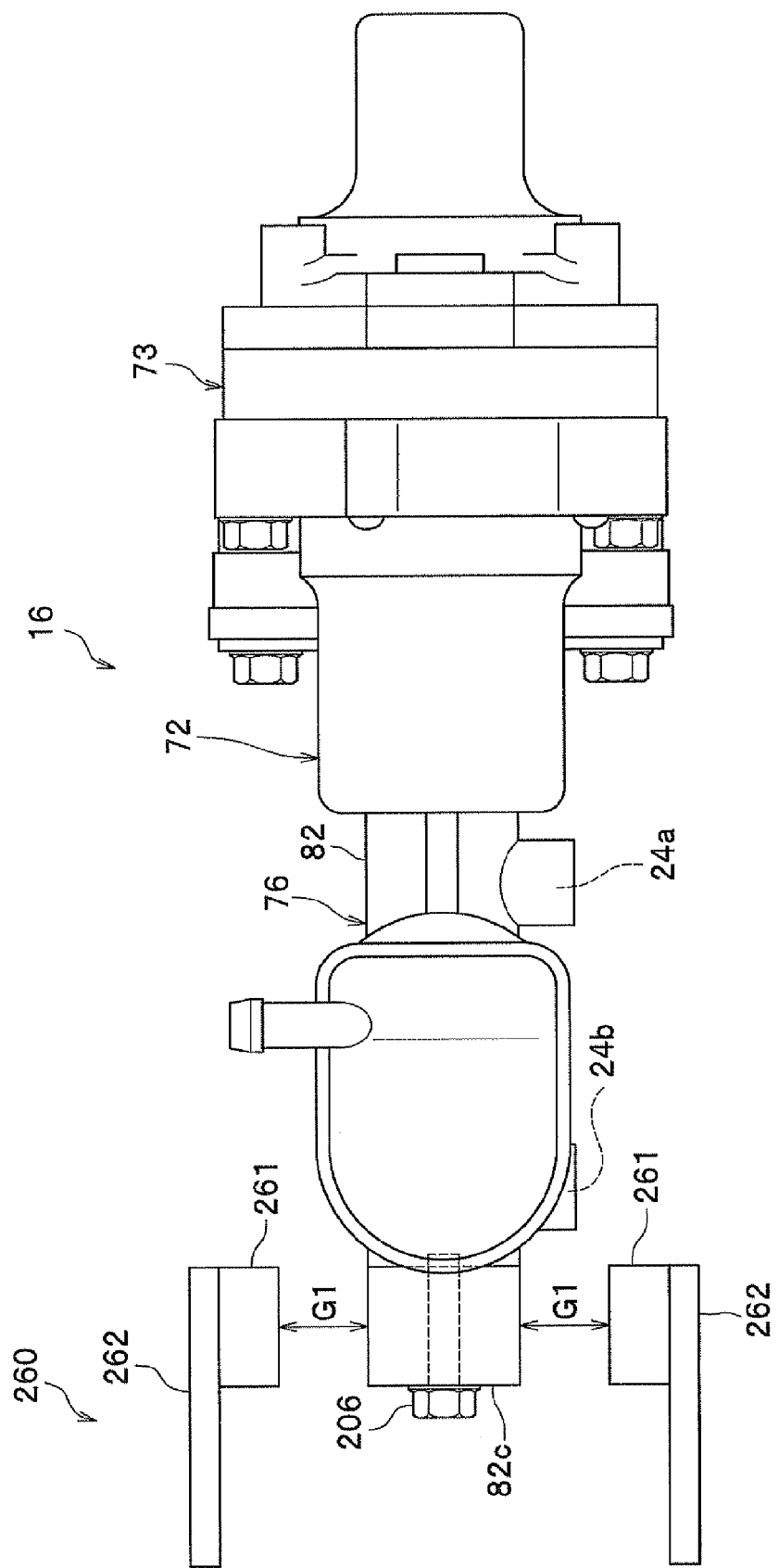
FIG. 10 is a top view showing the displacement reducing structure of a motor cylinder device in the second embodiment.
Figure 11:
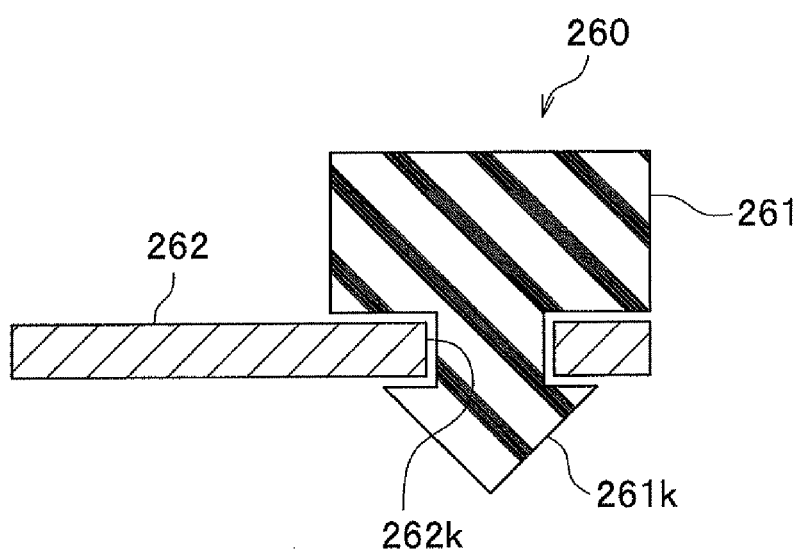
FIG. 11 is a cross sectional view of a load transmission section cut by a plane parallel to the central axis of a cylinder mechanism.

In the following, the displacement reduction structure of the motor cylinder device 16 will be described, referring to FIGS. 10 and 11. FIG. 10 is a top view showing the displacement reduction structure of the motor cylinder device in the second embodiment. FIG. 11 is a cross-sectional view of a load transmission section 260 cut by a plane parallel to the central axis CL (see FIG. 9) of the cylinder mechanism 76. Incidentally, in order to avoid the complexity of the view, members including the attaching bracket 190 and the piping tubes 22b and 22e are omitted in FIG. 9 (in figures hereinafter also).

As shown in FIG. 10, the cylinder mechanism 76 is provided with a cylindrical tip end portion 82c (tip end vicinity) to be fixedly attached to the front end surface of the cylinder main body 82. The tip end portion 82c is formed of a resin or a metal such as an aluminum alloy.

The tip end portion 82c is screw-fastened to the cylinder main body 82 by a bolt 206 for example. Herein, the root portion of the shaft of the bolt 206 is fit-engaged with the penetration hole formed at the tip end portion 82c, and thereby, even when a load along the direction perpendicular to the central axis CL (see FIG. 9) is applied to the tip end portion 82c, the tip end portion 82c is prevented from deviating. The male screw portion formed on the tip end side of the shaft of the bolt 206 is screw-engaged with a female hole formed at the front end of the cylinder main body 82.

The method of fixedly attaching the tip end portion 82c to the front end surface of the cylinder main body 82 is not limited to screw fastening, and various methods can be adopted including adhesion and welding. Further, the tip end portion 82c may be integrally formed at the front end of the cylinder main body 82. Still further, a portion on the front end side of the cylinder main body 82 may be used as the tip end portion 82c.

A displacement reduction structure of the motor cylinder device 16 is formed between the motor cylinder device 16 and a vehicle body 1 (see FIG. 1) such as a side frame, and has the load transmission section 260 for transmitting a load from the motor cylinder device 16 to the vehicle body 1. The load transmission section 260 is provided independently from a mount portion 181 (see FIG. 6).

The load transmission section 260 is provided with an elastic body 261 contactable with the motor cylinder device 16 and a bracket 262 as a support member for supporting the elastic body 261. A plurality of such load transmission sections 260 is disposed around the central axis CL (see FIG. 9). In the present embodiment, load transmission sections 260 are contactable with the tip end portion 82c of the cylinder mechanism 76 and are disposed in a pair on the left side and the right side of the tip end portion 82c of the cylinder mechanism 76, with the central axis CL (see FIG. 9) therebetween.

Gaps G1 are provided between the cylinder mechanism 76 and the load transmission sections 260 so that a load from the motor cylinder device 16 is transmitted to the vehicle body 1 (see FIG. 1) such as the side frame in case the motor cylinder device 16 is displaced. The gaps G1 are set to a distance that can limit the displacement to a degree that does not affect the functions of the motor cylinder device 16 so that, for example, a stress caused in the piping tube 22b or 22e (see FIG. 9) connected to the motor cylinder device 16 becomes lower than or equal to an allowable stress.

As shown in FIGS. 10 and 11, each bracket 262 is provided with a penetration hole 262k for holding the elastic body 261. An engagement portion 261k having an outer diameter slightly larger than that of the penetration hole 262k is formed at the end surface, on the bracket 262 side, of the elastic body 261. With such a structure, by pushing the engagement portion 261k of the elastic body 261 into the penetration hole 262k of the bracket 262, the bracket 262 becomes able to easily hold the elastic body 261. Incidentally, the number of penetration holes 262k and the number of engagement portions 261k to be provided are arbitrary, and can be either single or plural. Incidentally, the each elastic body 261 may be held by the bracket 262 by a different method such as screw fastening or adhesion.

Although the each elastic body 261 is substantially in a rectangular parallelepiped shape, the surface facing the tip end portion 82c of the motor cylinder device 16 is preferably formed in a curved surface shape matching with the outer circumferential surface of the tip end portion 82c. With such a structure, it is possible to ensure a stable contact by making the contact area wide in case the elastic body 261 comes in contact with the tip end portion 82c. The each elastic body 261 is a buffer member of rubber capable of absorbing vibration or shock. Incidentally, it is also possible to improve the flexibility by forming asperity on the surface facing the tip end portion 82c of the elastic body 261.

The each bracket 262 is formed from a metal such as a rigid steel. The bracket 262 is for example in a plate shape, however, can be processed into a shape, as appropriate, such as to prevent interference with other members. The bracket 262 is fixed directly or through a different connecting member, not shown, to the vehicle body 1 (see FIG. 1) such as the side frame by screw fastening, welding, or the like.

The displacement reduction structure, arranged as described above, of the motor cylinder device 16 operates as follows.

That is, when the motor cylinder device 16 receives a force, which is stronger than usual, among a variety including vibration of the vehicle V or the motor cylinder device 16 itself, a shock, etc., the motor cylinder device 16 attached to the vehicle body (see FIG. 1) such as the side frame is displaced by the mount portion 181 (see FIG. 6). When the amount of the displacement of the motor cylinder device 16 becomes larger than or equal to the gap G1, the motor cylinder device 16 comes in contact with the load transmission section 260 provided independently from the mount portion 181, and the load from the motor cylinder device 16 is transmitted to the vehicle body 1 (see FIG. 1) such as the side frame. Thus, the displacement of the motor cylinder device 16 is reduced.

As described above, in the present embodiment, the each load transmission section 260 is provided independently from the mount portion 181 (see FIG. 6), wherein the load transmission section 260 is formed between the motor cylinder device 16 and the vehicle body 1 (see FIG. 1) such as the side frame or the like to transmit a load from the motor cylinder device 16 to the vehicle body 1.

Thus, according to the present embodiment, the displacement of the motor cylinder device 16 can be reduced when the motor cylinder device 16 receives a force such as vibration. Herein, when the motor cylinder device 16 receives a force such as vibration with a normal magnitude, the sound and vibration of the motor cylinder device 16 are reduced by being supported by the mount portion 181 (see FIG. 6), and when the motor cylinder device 16 receives a force such as vibration that exceeds an ordinary magnitude, a load from the motor cylinder device 16 is received by the load transmission section 260, wherein the displacement of the motor cylinder device 16 can thereby be reduced.

As the displacement of the motor cylinder device 16 can be reduced in such a manner, it is possible to reduce, for example, a stress caused in the piping tube 22b or 22e (see FIG. 9) connected to the motor cylinder device 16.

Further, in the present embodiment, the each load transmission section 260 is made contactable with the tip end portion 82c of the cylinder mechanism 76. Accordingly, it is possible to more effectively reduce the displacement in the vicinity of the tip end of the cylinder mechanism 76, particularly displacement that is possibly caused around the mount portion 181 (see FIG. 6). In the present embodiment, particularly, displacement in the left/right direction (see FIG. 7) in the vicinity of the tip end of the cylinder mechanism 76 can be effectively reduced.

Still further, in the present embodiment, the each load transmission section 260 is provided with the elastic body 261 contactable with the cylinder mechanism 76 and the bracket 262 supporting the elastic body 261. Accordingly, a force such as vibration or the like can be damped by the elastic body 261, and displacement caused on the cylinder mechanism 76 can be effectively reduced. Further, the cylinder mechanism 76 itself can be protected.

Yet further, in the present embodiment, the each gap G1 is provided between the motor cylinder device 16 and the load transmission section 260 so that a load from the motor cylinder device 16 is transmitted to the vehicle body 1 (see FIG. 1) such as the side frame when the motor cylinder device 16 is displaced. Accordingly, when the motor cylinder device 16 receives a force such as vibration or the like with a comparatively small magnitude, as the force such as vibration or the like is not transmitted to the load transmission section 260, transfer of vibration through the load transmission section 260 and occurrence of sound can be prevented.

Figure 12:
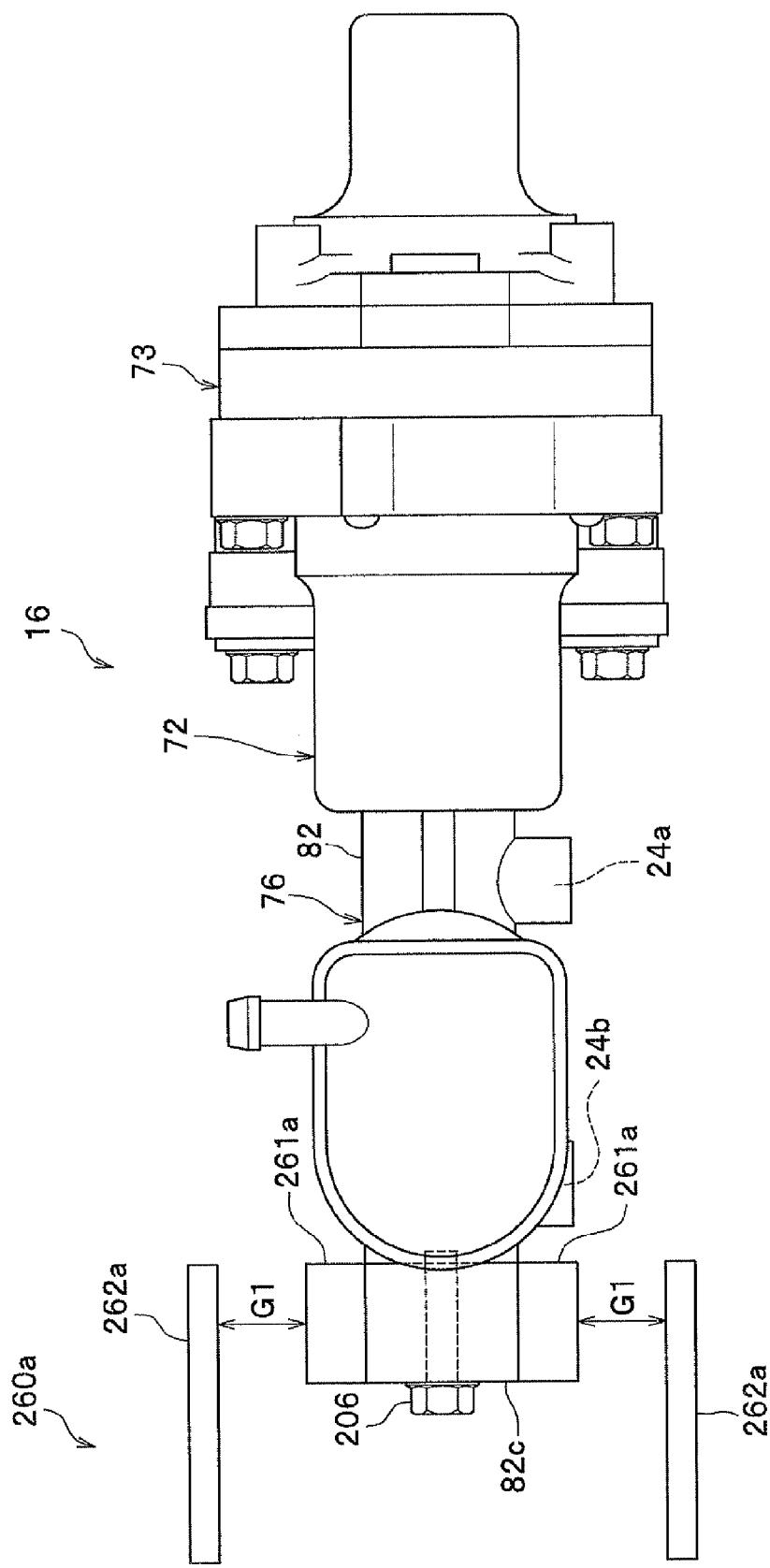
FIG. 12 is a top view showing the displacement reducing structure of a motor cylinder device in a first modified example of the second embodiment.

FIG. 12 is a top view showing the displacement reducing structure of a motor cylinder device in a first modified example of the second embodiment. Assuming that structures and operations which are similar to those in the second embodiment shown in FIGS. 9 to 11 are taken in into this first modified example, detailed description will be omitted and differences will be described (in other modified examples described later also).

The first modified example of the second embodiment is different from the second embodiment in that the elastic body 261a and the bracket 262a of a load transmission section 260a are disposed separately from each other. Herein, the elastic body 261a is fixedly attached to the outer circumferential surface of the tip end portion 82c of a motor cylinder device 16 by a method of adhesion, engagement, screw fastening or the like. On the other hand, a penetration hole for holding the elastic body 261a is not formed through the bracket 262a, and the bracket 262a is disposed at a position facing the side surface of the elastic body 261a. A gap G1 is provided between the motor cylinder device 16 and the bracket 262a, which is a part of the load transmission section 260a. That is, while the each elastic body 261 is provided on the corresponding bracket 262 in the second embodiment, the each elastic body 261a is provided on the motor cylinder device 16 in the first modified example of the second embodiment. According to the such arranged first modified example of the second embodiment, operations and advantages similar to those in the foregoing second embodiment can be achieved.

Figure 13:
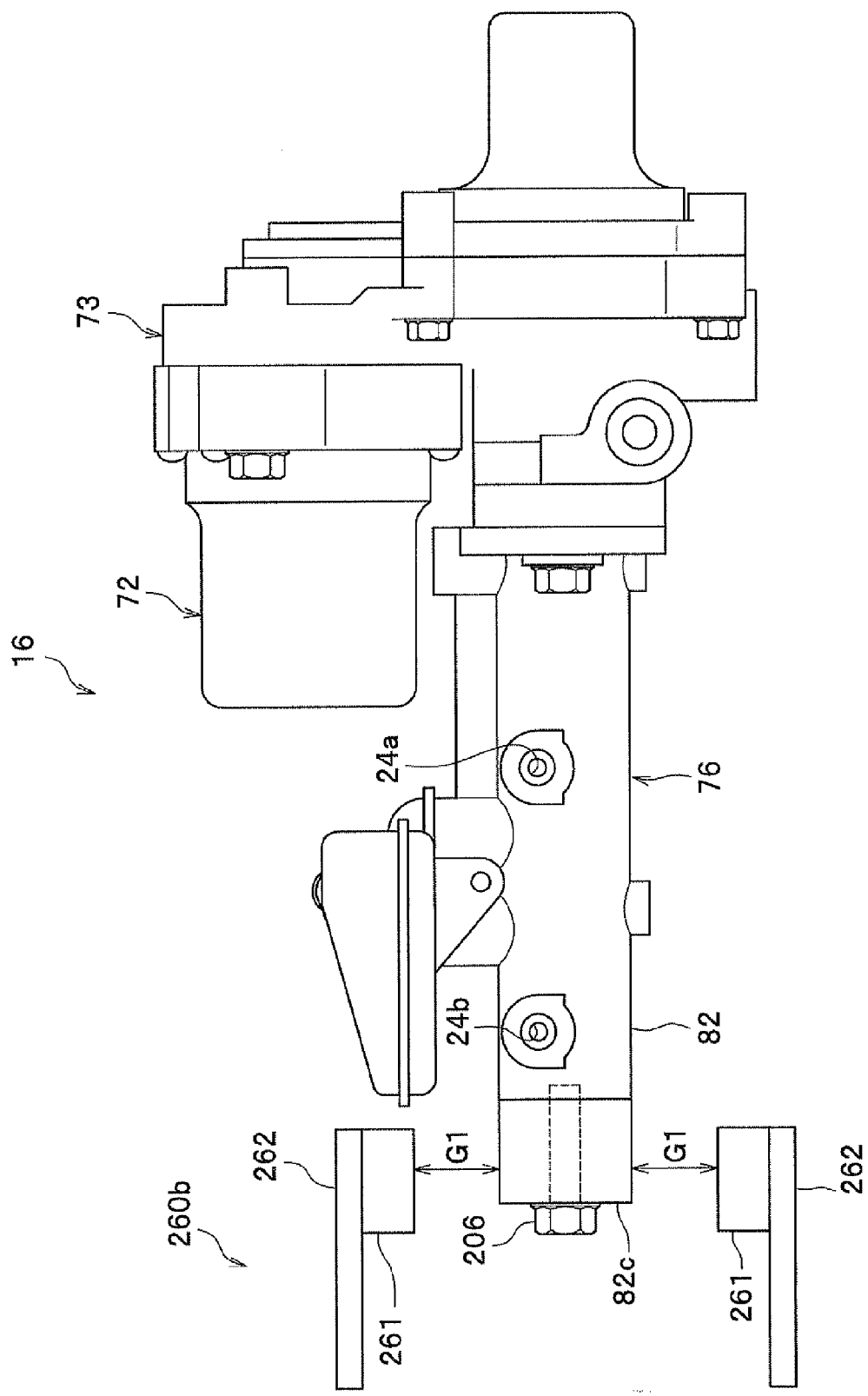
FIG. 13 is a side view showing the displacement reducing structure of a motor cylinder device in a second modified example of the second embodiment.

FIG. 13 is a side view showing the displacement reducing structure of a motor cylinder device in a second modified example of the second embodiment. The second modified example of the second embodiment is different from the second embodiment in that load transmission sections 260b are provided in a pair at upper and lower positions with respect to the tip end portion 82c of the cylinder mechanism 76 with the central axis CL (see FIG. 9) therebetween. According to the such arranged second modified example of the second embodiment, operations and advantages similar to those in the foregoing second embodiment can be achieved, and particularly, displacement in the upper and lower direction in the vicinity of the tip end of the cylinder mechanism 76 can be more effectively reduced.

Figure 14:
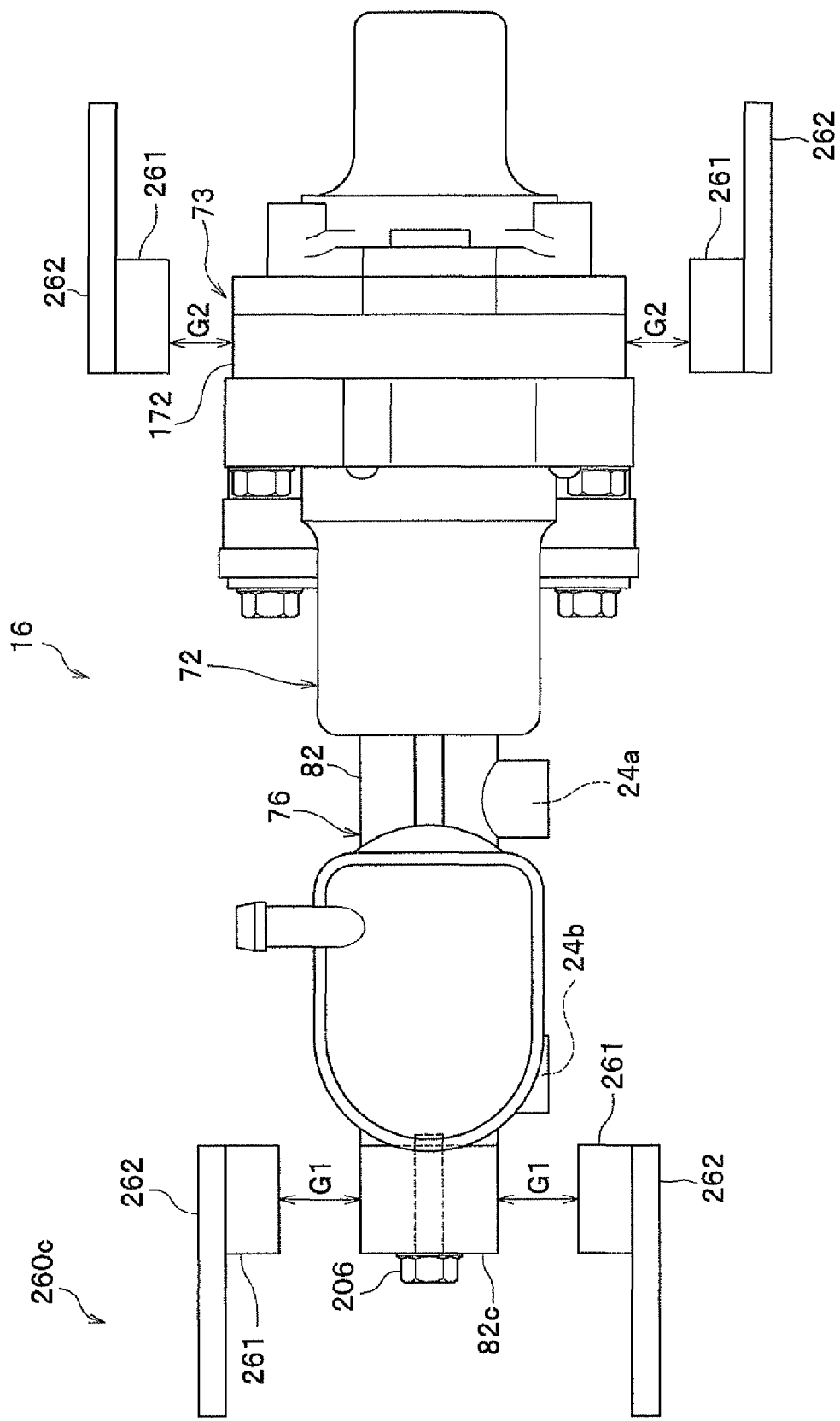
FIG. 14 is a top view showing the displacement reducing structure of a motor cylinder device in a third modified example of the second embodiment.

FIG. 14 is a top view showing the displacement reducing structure of a motor cylinder device in a third modified example of the second embodiment. The third modified example of the second embodiment is different from the second embodiment in that load transmission sections 260c are contactable not only with the tip end portion 82c of the motor cylinder device 16 but also with a driving force transmission section 73, and load transmission sections 260c are disposed not only at the left and the right with respect to the tip end portion 82c of the cylinder mechanism 76 with the central line CL (see FIG. 9) therebetween but also at the left and the right with respect to the driving force transmission section 73 in respective pairs. Gaps G2 are provided between the driving force transmission section 73 and the load transmission section 260c so that a load from the motor cylinder device 16 is transmitted to the vehicle body 1 (see FIG. 1) such as the side frame when the motor cylinder device 16 is displaced. The gaps G2 may be set, for example, smaller than the above-described gaps G1 in order to stably reduce the motor cylinder device 16 as a whole.

According to the such arranged third modified example of the second embodiment, in addition to that similar operations and advantages to those in the foregoing second embodiment are achieved, the load transmission sections 260c can receive a load from the driving force transmission section 73, which is ordinarily heavy and rigid, so that displacement of the motor cylinder device 16 as a whole in the left-right direction can be effectively reduced. Incidentally, it is also possible to adopt an arrangement to dispose load transmission sections 260c in one pair disposed only to the left and the right with respect to the driving force transmission section 73 of the cylinder mechanism 76 with the central axis CL (see FIG. 9) therebetween.

Figure 15:
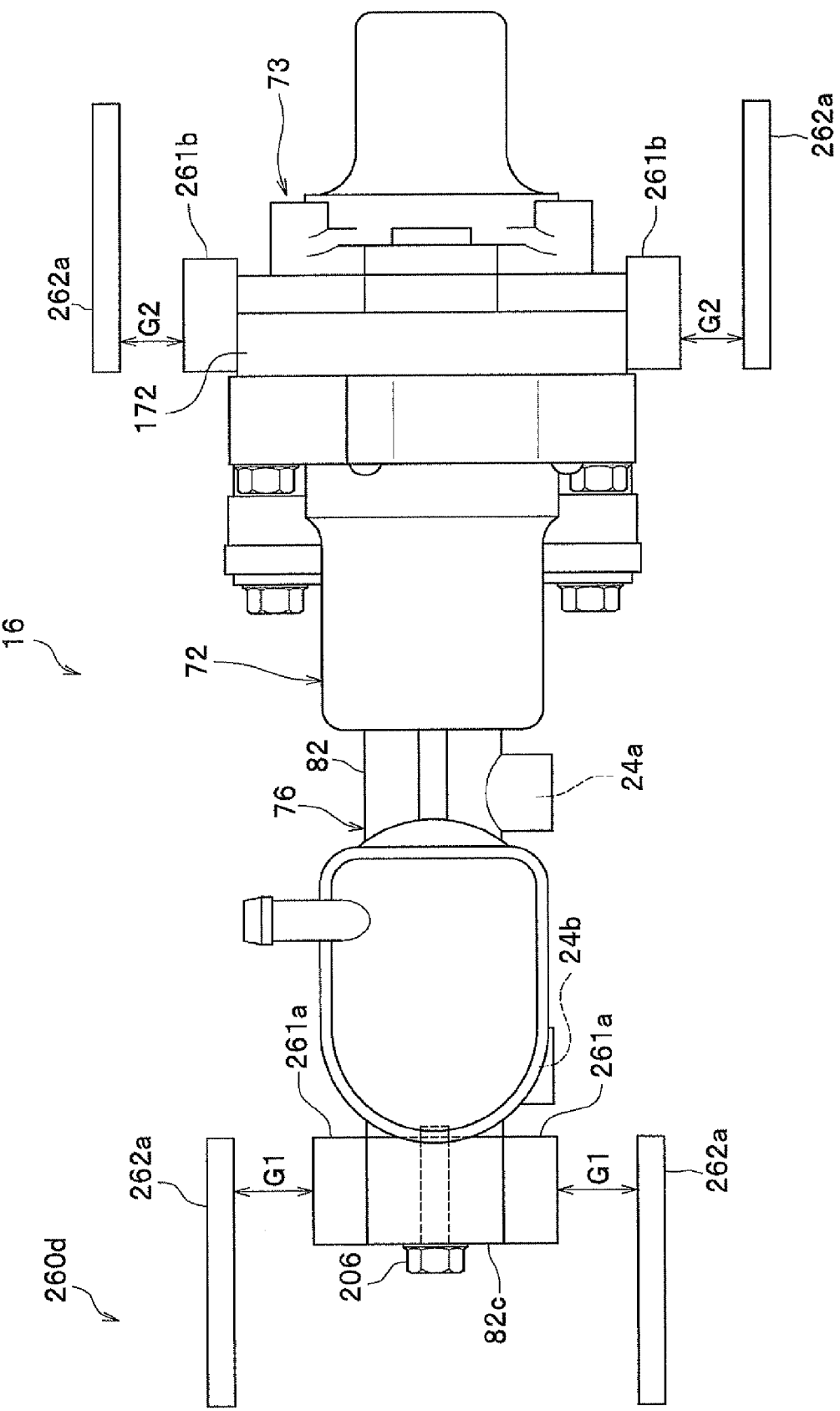
FIG. 15 is a top view showing the displacement reducing structure of a motor cylinder device in a fourth modified example of the second embodiment.

FIG. 15 is a top view showing the displacement reducing structure of a motor cylinder device in a fourth modified example of the second embodiment. The fourth modified example of the second embodiment is different from the third modified example of the second embodiment in that the elastic body 261a of a load transmission section 260d and a bracket 262a are disposed separately from each other. As the structure of an elastic body 261a and a bracket 262a is similar to those in the second embodiment, and description will be omitted. According to the such arranged fourth modified example of the second embodiment, operations and advantages similar to those in the third modified example of the second embodiment can be achieved.

Figure 16:
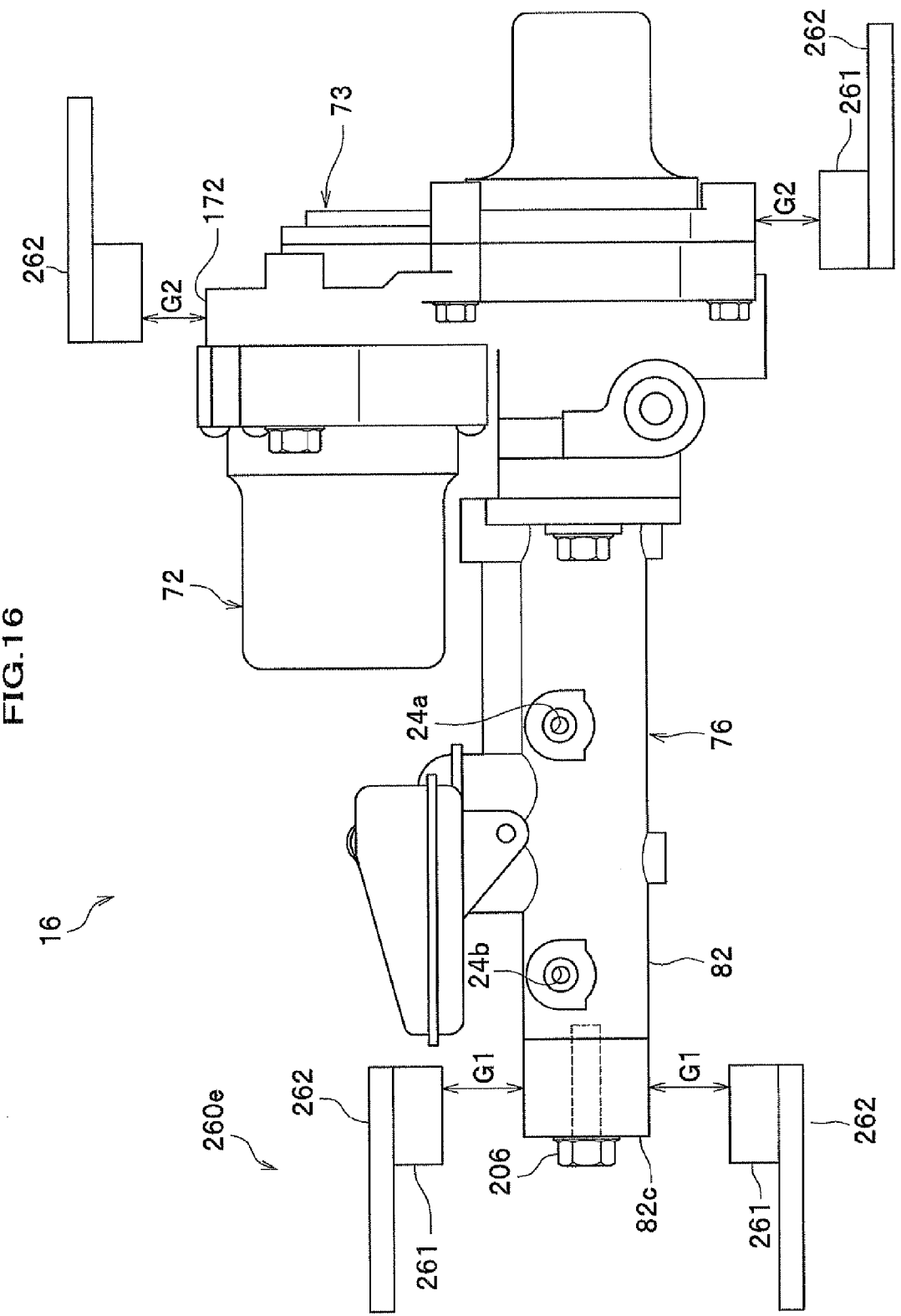
FIG. 16 is a side view showing the displacement reducing structure of a motor cylinder device in a fifth modified example of the second embodiment.

FIG. 16 is a side view showing the displacement reducing structure of a motor cylinder device in a fifth modified example of the second embodiment. The fifth modified example of the second embodiment is different from the second example of the second embodiment in that load transmission sections 260e are contactable not only with the tip end portion 82c of the motor cylinder device 16 but also with a driving force transmission section 73, and load transmission sections 260e are disposed not only at upper and lower positions with respect to the tip end portion 82c of the cylinder mechanism 76 with the central line CL (see FIG. 9) therebetween but also at upper and lower positions with respect to the driving force transmission section 73 in respective pairs.

According to the such arranged fifth modified example of the second embodiment, operations and advantages similar to those in the second modified example of the foregoing second embodiment can be achieved, and further, the load transmission sections 260e can receive a load from the heavy and rigid driving force transmission section 73 so that displacement of the motor cylinder device 16 as a whole can be more effectively reduced. Incidentally, it is also possible to adopt an arrangement to dispose load transmission sections 260e in one pair disposed only to the upper and lower positions with respect to the driving force transmission section 73 of the cylinder mechanism 76 with the central axis CL (see FIG. 9) therebetween.

Figure 17:
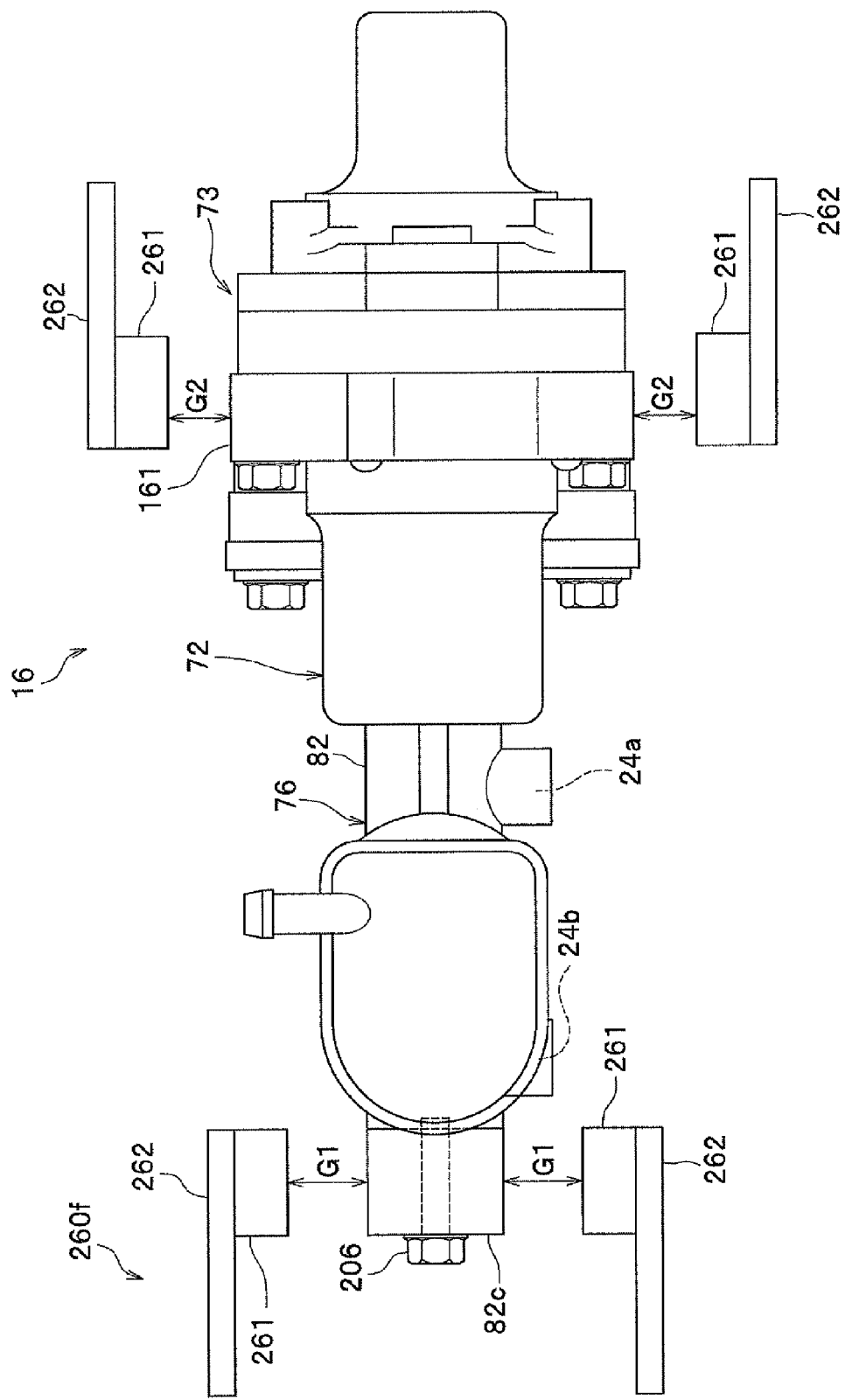
FIG. 17 is a top view showing the displacement reducing structure of a motor cylinder device in a sixth modified example of the second embodiment.

FIG. 17 is a top view showing the displacement reducing structure of a motor cylinder device in a sixth modified example of the second embodiment. The sixth modified example of the second embodiment is different from the second embodiment in that load transmission sections 260f are contactable not only with the tip end portion 82c of a motor cylinder device 16 but also with the base portion 161 of an electric motor 72, and disposed not only at the left and the right with respect to the tip end portion 82c of the cylinder mechanism 76 with the central line CL (see FIG. 9) therebetween but also at the left and the right with respect to the base portion 161 of the electric motor 72.

According to the such arranged sixth modified example of the second embodiment, operations and advantages similar to those in the foregoing second embodiment can be achieved, and further, as the load transmission sections 260f are disposed in the vicinity of the connector of an electric motor 72 connected with a harness, not shown, it is possible to reduce displacement in the vicinity of the connector, and thus decrease a load applied to the harness. Incidentally, it is also possible to adopt an arrangement to dispose load transmission sections 260f in one pair disposed only to the left and the right with respect to the base portion 161 of the electric motor 72 of the cylinder mechanism 76 with the central axis CL (see FIG. 9) therebetween.

The invention has been described above, based on the second embodiment, however, the invention is not limited to the structures described in the foregoing embodiment, and the structures can be modified and changed, as appropriate, in a scope without departing from the spirit of the invention, including appropriately combining or selecting structures described in the foregoing embodiment.

For example, the disposition positions of the load transmission sections provided with an elastic body and a bracket can be changed, as appropriate. For example, any two or more of the load transmission sections 260 and 260a-260f of the displacement reducing structures of the motor cylinder devices in the second embodiment and the first to sixth modified examples of the second embodiment can be adopted at an arbitrary combination. Further, the disposition of load transmission sections are not limited to the left/right and the upper/lower positions with respect to a motor cylinder device 16, and may be at positions, for example, with equal intervals such as trisected intervals along the circumferential direction around the central axis CL. Further, load transmission sections may be disposed, for example, at positions facing a housing 172 in the vicinity of an output shaft of the electric motor 72. By such an arrangement, the displacement of the electric motor 72 can be more effectively reduced.

Further, although in the foregoing embodiment gaps are provided between the motor cylinder device 16 and the load transmission sections in a state of no displacement of the motor cylinder device 16, the invention is not limited thereto. It is also possible that load transmission sections are arranged in advance such as to contact with the motor cylinder device 16, and also by such an arrangement, the displacement of the motor cylinder device 16 can be reduced when the motor cylinder device 16 receives a force such as vibration or the like.

Still further, although in the foregoing embodiment the mount portion 181 is formed by the left, right, and lower mount holes 182 to 184, the invention is not limited thereto. The shapes and numbers of mounts, the support direction, the fixing method using screws, pins, or the like can be changed, as appropriate.

Third Embodiment

A third embodiment according to the present invention will be described below. The same symbols will be assigned to elements common with those in the first embodiment, and structures and description in the first embodiment will be quoted.

Figure 18:
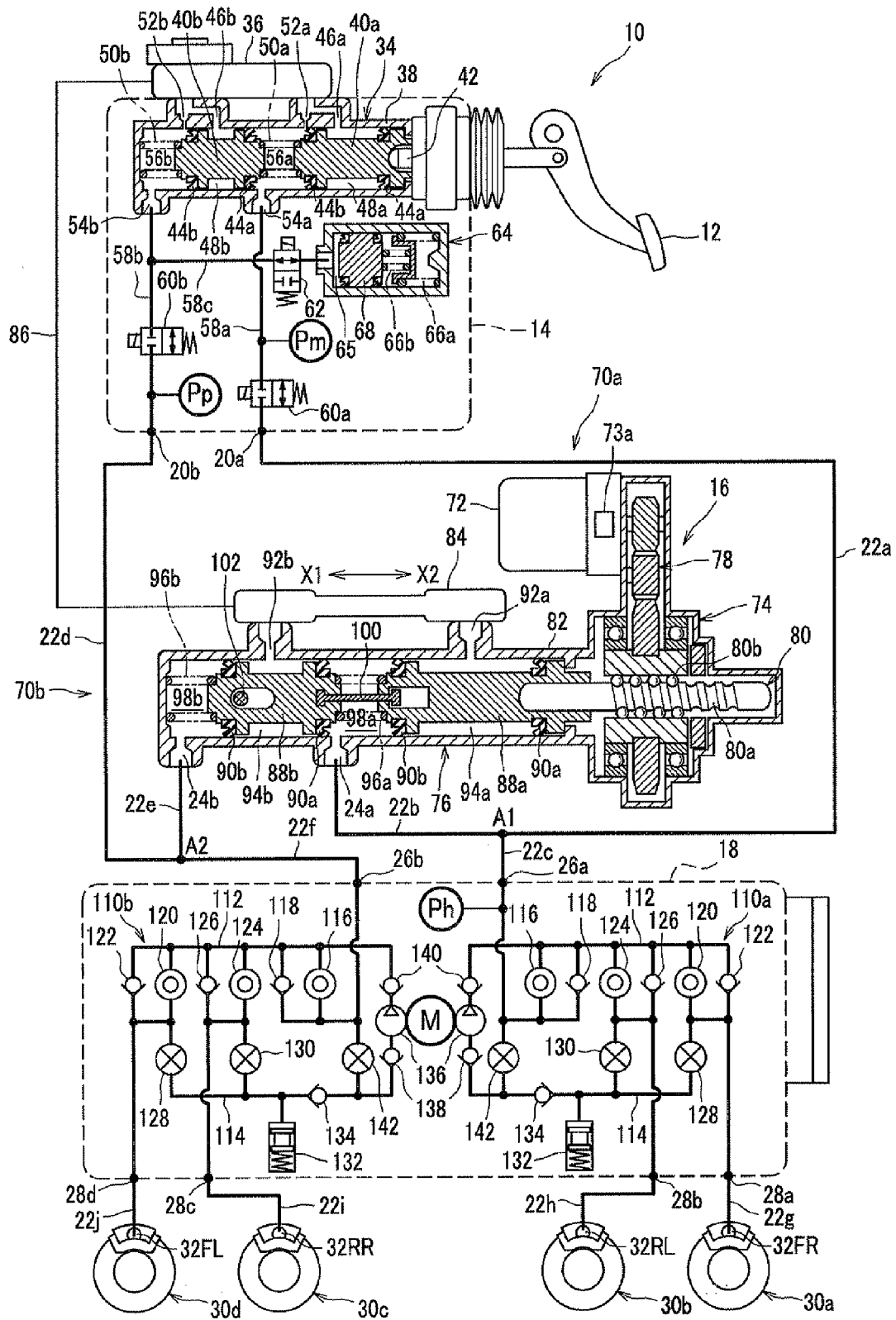
FIG. 18 shows the schematic configuration of a vehicle brake system in which a motor cylinder device in a third embodiment according to the present invention is built.

FIG. 18 shows the schematic configuration of a vehicle brake system in which a motor cylinder device in a third embodiment according to the present invention is built. As a vehicle brake system 10 shown in FIG. 18 is generally similar to that in the first embodiment, description thereof will be omitted, as appropriate, and different points will be mainly described below.

Figure 19:
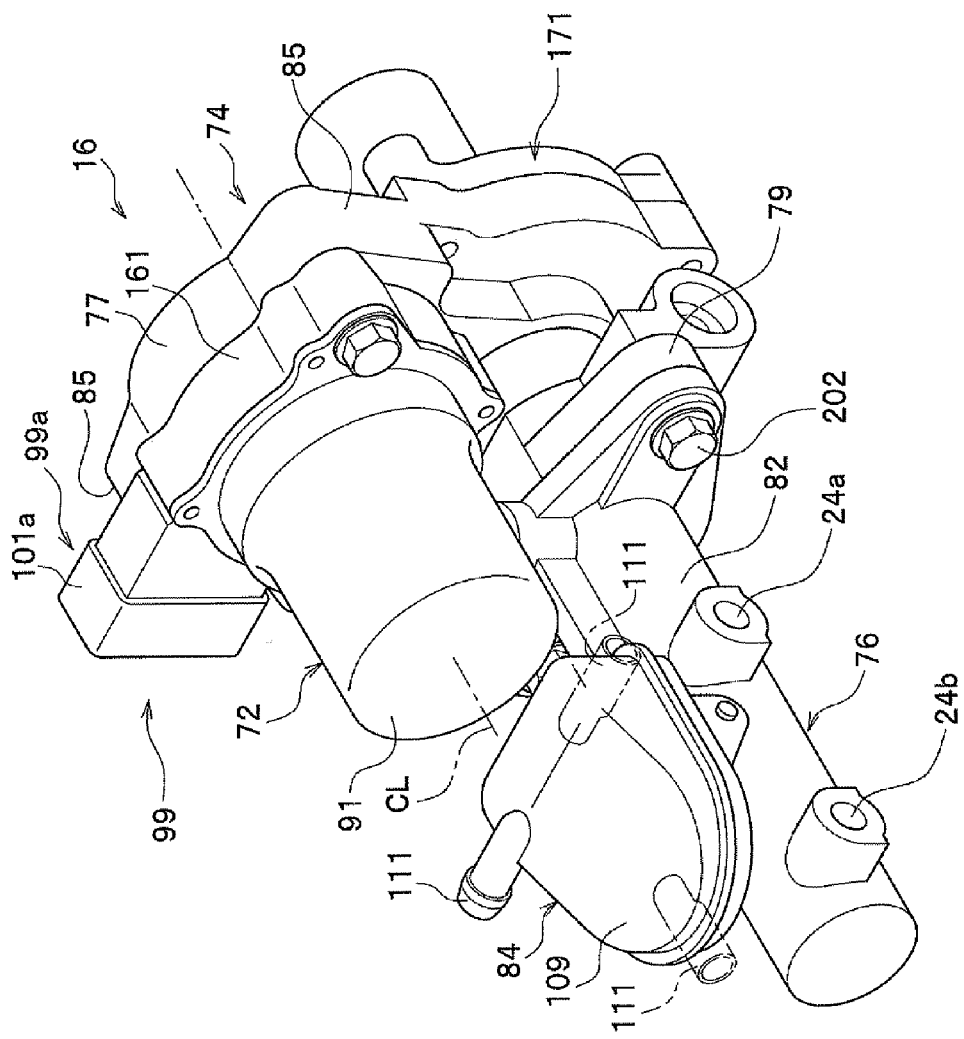
FIG. 19 is a perspective view of the motor cylinder device shown in FIG. 18.
Figure 20:
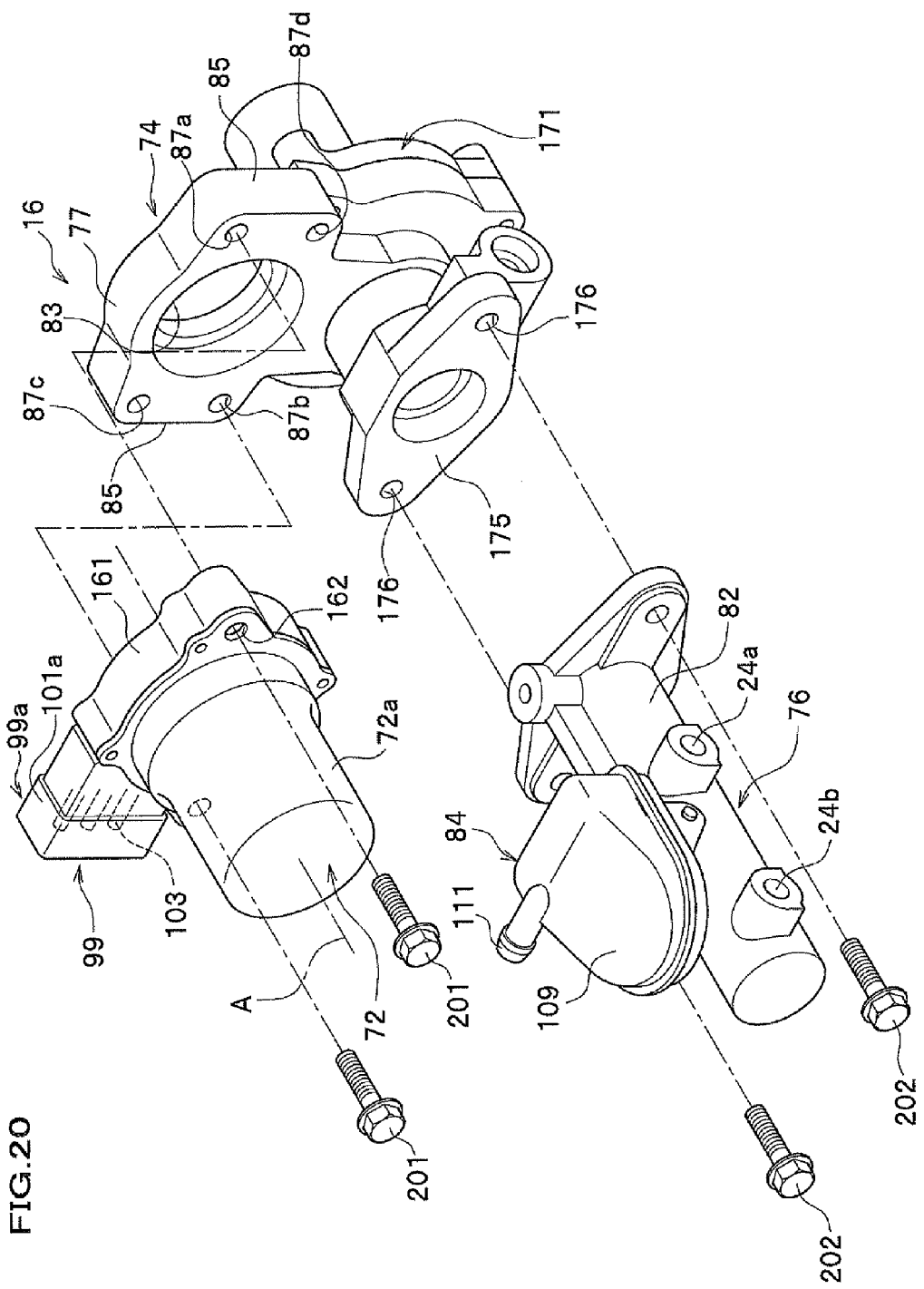
FIG. 20 is an exploded perspective view of the motor cylinder device.
Figure 21:
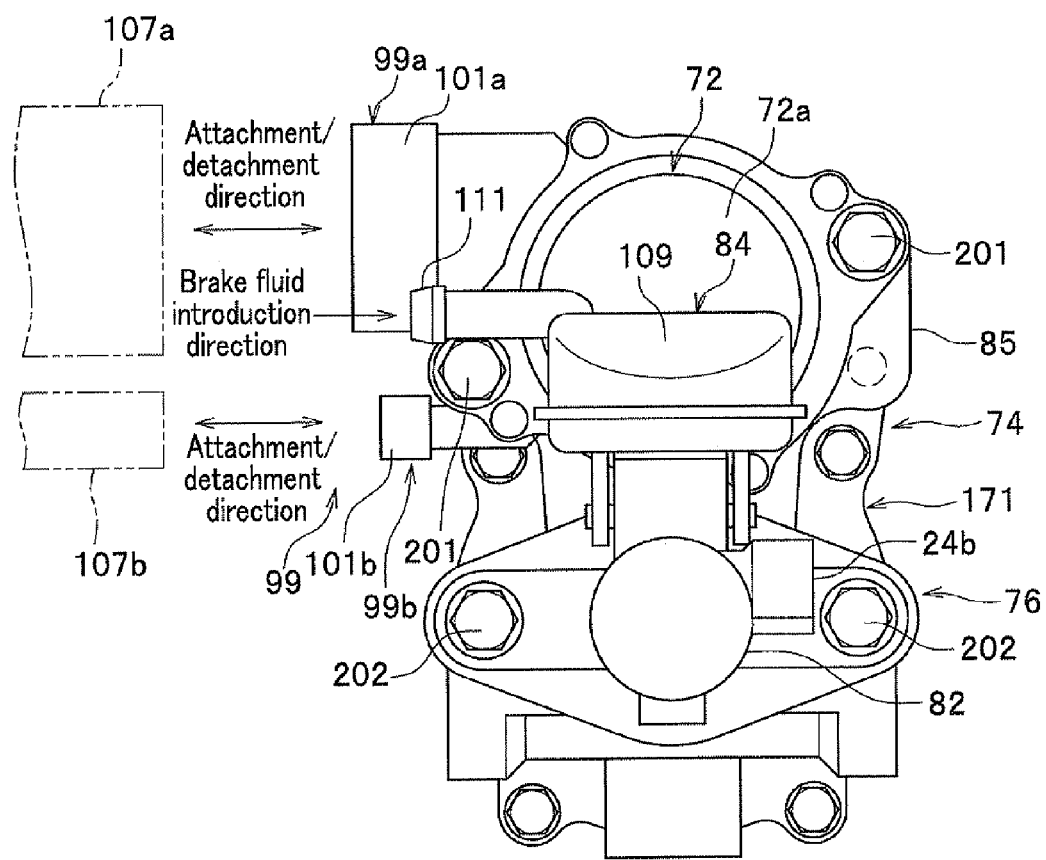
FIG. 21 is a front view of the motor cylinder device.

FIG. 19 is a perspective view of the motor cylinder device shown in FIG. 18. FIG. 20 is an exploded perspective view of the motor cylinder device. FIG. 21 is a front view of the motor cylinder device.

The motor cylinder device 16, which functions as an electric brake actuator, includes, as shown in FIG. 19, an actuator mechanism 74 including an electric motor 72 and a cylinder mechanism 76 urged by the actuator mechanism 74.

As shown in FIG. 20, the actuator mechanism 74 includes an actuator housing 171, and the actuator housing 171 is provided with a connection portion 77, through which the electric motor 72 is connected, and a flange portion 175, through which a cylinder main body 82 is connected. Incidentally, the other end portion of the cylinder main body 82, the other end portion being formed by a plate substantially in a rhombic shape, is fastened to the flange portion 175 through a pair of screw members (bolts) 202 which are fastened to a pair of screw holes 176.

Further, as shown in FIG. 18, the actuator housing 171 houses a rotational angle sensor 73a for detecting the rotational angle of the electric motor 72, the rotational angle sensor 73a being provided in a later-described end block 161 of the electric motor 72, a gear mechanism (deceleration mechanism) 78 for transmitting the rotational driving force of the electric motor 72 by engagements between plural gears including a gear connected to the output shaft (motor shaft) of the electric motor 72, and a ball screw assembly 80 including a ball screw shaft 80a and balls 80b, the ball screw shaft 80a moving forward and backward along the axial direction by the transmission of the rotational driving force through the gear mechanism 78. Incidentally, the rotational angle sensor 73a is configured, for example, by a resolver, a rotary encoder, or the like.

As shown in FIG. 20, the connection portion 77 of the actuator housing 171 is provided with an opening portion 83 substantially in a circular shape and four screw holes 87a to 87d arranged at parts in the vicinity of the four corners of a side wall 85 in a rectangular shape in a view from the cylinder main body 82 side. In this case, as described later, through a pair of screw members (bolts) 201 fastened to a pair of screw holes 87a, 87b (or 87c, 87d) selected from four screw holes 87a to 87d, the electric motor 72 is integrally joined with the actuator housing 171. Incidentally, a pair of screw holes 87c, 87d (or 87a, 87b), which is the rest having not been selected, is exposed to outside as it is. Regarding the number of screw holes, punching or the like can be carried out, as appropriate, when screw holes are used, and four screw holes may not be provided in advance.

The plural screw holes 87a to 87d formed on the rectangular side wall 85 and the pair of screw members 201 fastened to the screw holes 87a to 87d function as changing means for changing the disposition direction of a connector 99, and changing the disposition direction of the connector 99 will be described later in detail.

The electric motor 72 is, for example, a known servo motor or the like, and includes a motor casing 72a formed in a cylindrical shape with a bottom, an end block (base portion) 161 having insertion holes (penetration holes) 162 through which the screw members 201 are to penetrate and being connected integrally with the motor casing 72a, and a connector 99 connected to the end block 161 through a connecting pins, not shown, protruding outward from the side surface of the end block 161. Incidentally, a rotor, a stator, magnets, and the like, not shown, are arranged in the motor casing 72a.

The connector 99, which is electrically connected with the electric motor 72, is disposed on the side surface side of the actuator housing 171. The connector 99 is formed integrally with the motor casing 72a (The end block 161 may be included.) and fixed to the connection portion 77 of the actuator housing 171. In the present embodiment, by disposing the connector 99 outside the actuator housing 171 and on the side surface side (side portion) of the actuator housing 171, access to the connector 99 becomes easy, and the accessibility is thus improved.

The connector 99 includes a power connector 99a for a power source supplying power to the electric motor 72 and a sensor connector 99b for a sensor transmitting a detection signal detected by the rotational angle sensor 73a to control means, not shown, and is configured by plural divided connectors for different purposes. These divided power connector 99a and the sensor connector 99b are disposed in parallel to each other in the same direction, and are arranged such as to extend in the direction perpendicular to the axial line of the output shaft (motor shaft) of the electric motor 72.

The power connector 99a has a connector housing 101a in a rectangular pipe shape, and plural connector pins 103, which are electrically connected with the electric motor 72, are housed in the connector housing 101a. The sensor connector 99b has a connector housing 101b in a rectangular pipe shape, and plural connector pins (not shown), which are electrically connected with the rotational angle sensor 73a, are housed in the connector housing 101b.

As shown in FIG. 21, a connecting connector 107a attachable and detachable along the arrow direction (attaching/detaching direction) is connected to the power connector 99a. The connector pins 103 (see FIG. 20) are inserted through the connecting connector 107a, and a terminal portion, not shown, electrically connected with the connecting pins 103 is provided.

Further, a connecting connector 107b attachable and detachable along the arrow direction (attaching/detaching direction) is connected to the sensor connector 99b. Connector pins, not shown, are inserted through the connecting connector 107b, and a terminal portion, not shown, electrically connected with the connecting pins is provided. Incidentally, the one connecting connector 107a is electrically connected with a power source such as a battery by a harness, not shown, and the other connecting connector 107b is electrically connected with control means, not shown, by a harness, not shown.

The cylinder mechanism 76 includes the cylinder main body 82 substantially in a cylindrical shape, and a second reservoir 84 provided directly on the outer circumferential surface of the cylinder main body 82. The cylinder main body 82 is provided such as to be separable from the actuator housing 171, and the actuator housing 171 and the cylinder main body 82 construct the electric brake actuator main body.

By providing the second reservoir 84 directly attached to the cylinder main body 82 of the motor cylinder device 16, a necessary and enough amount of brake fluid can be ensured. The second reservoir 84 is connected with the first reservoir 36 provided on the master cylinder 34 of the input device 14 by a piping tube 86, and brake fluid reserved in the first reservoir 36 is supplied into the second reservoir 84 through the piping tube 86.

The second reservoir 84 includes a reservoir main body 109, and a nipple 111 connected with the piping tube 86 is provided on a reservoir main body 109. Brake fluid is introduced through the nipple 111 into the reservoir main body 109, wherein the extending direction of the nipple 111 is the introduction direction of the brake fluid. Incidentally, the take-out direction (extending direction) of the nipple 111 from the reservoir main body 109 can be set to an arbitrary direction selected from various directions of the reservoir main body 109, for example as shown by a virtual line in FIG. 19 as an example.

In the present embodiment, as shown in FIG. 21, an arrangement is made such that the introduction direction of the brake fluid to the second reservoir 84 and the attaching/detaching direction of the connector 99 (the power connector 99a and the sensor connector 99b) agree with each other. As a result, access during attaching work or maintenance of the motor cylinder device 16 becomes simple and easy to enable improvement in accessibility and make attaching work and maintenance work from the same direction easy, and the workability is thus improved. Further, it is possible to reduce a load on a worker who carries out such attaching work and maintenance work.

In the present embodiment, by disposing the connector 99 on the side surface side (side portion) outside the actuator housing 171, an attaching/detaching space for the connector 99 is ensured to make access to the connector 99 simple and easy, which enables improvement in the accessibility. As a result, the usability of the motor cylinder device 16 increases so that the versatility is improved.

In this case, for example, the connector 99 is provided such as to extend along the direction substantially perpendicular to the axial line of the output shaft (the motor shaft) of the electric motor 72, and the accessibility can thereby be further improved.

Further, in the present embodiment, as shown in FIG. 21, an arrangement is made such that the introduction direction (the extending direction of the nipple 111 connected with the piping tube 86) of the brake fluid to the second reservoir 84 and the attaching/detaching direction of the connector 99 (the power connector 99a and the sensor connector 99b) agree with each other. As a result, access during attaching work or maintenance of the motor cylinder device 16 becomes simple and easy to enable improvement in accessibility and make attaching work and maintenance work from the same direction easy, and the workability is thus improved. Further, it is possible to reduce a load on a worker who carries out such attaching work and maintenance work.

Figure 22:
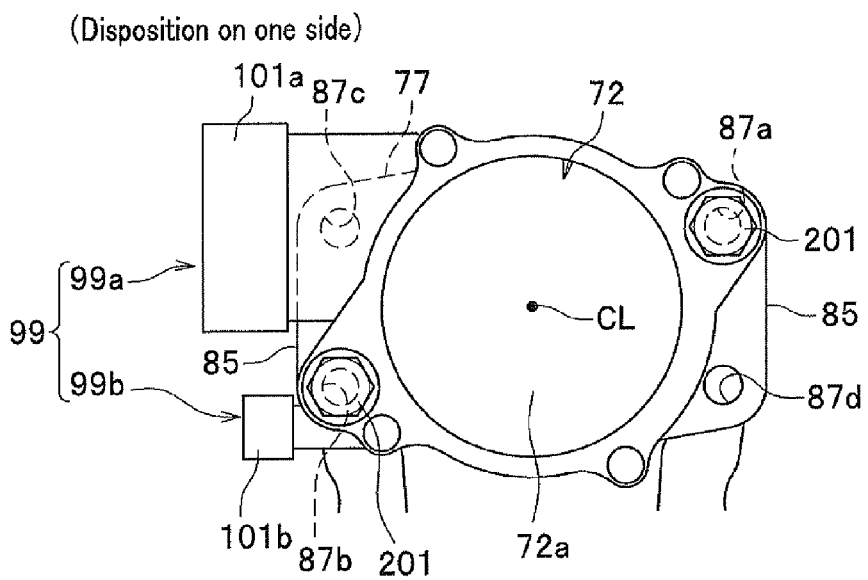
FIG. 22 is a partial front view showing a state that a connector is disposed on one side of an electric motor.
Figure 23:
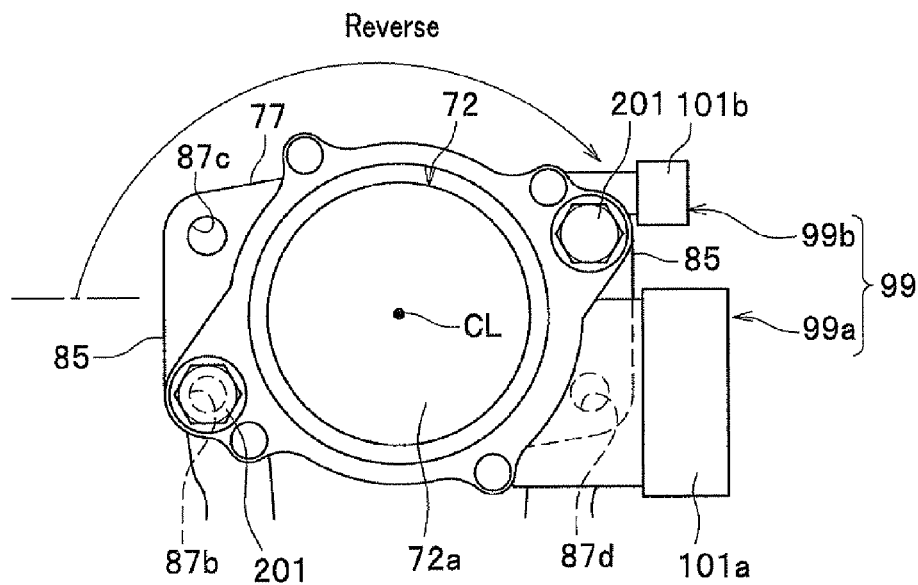
FIG. 23 is a partial front view showing a state that the connector is reversed by 180 degrees from the state in FIG. 22 and disposed on the other side of the electric motor.
Figure 24:
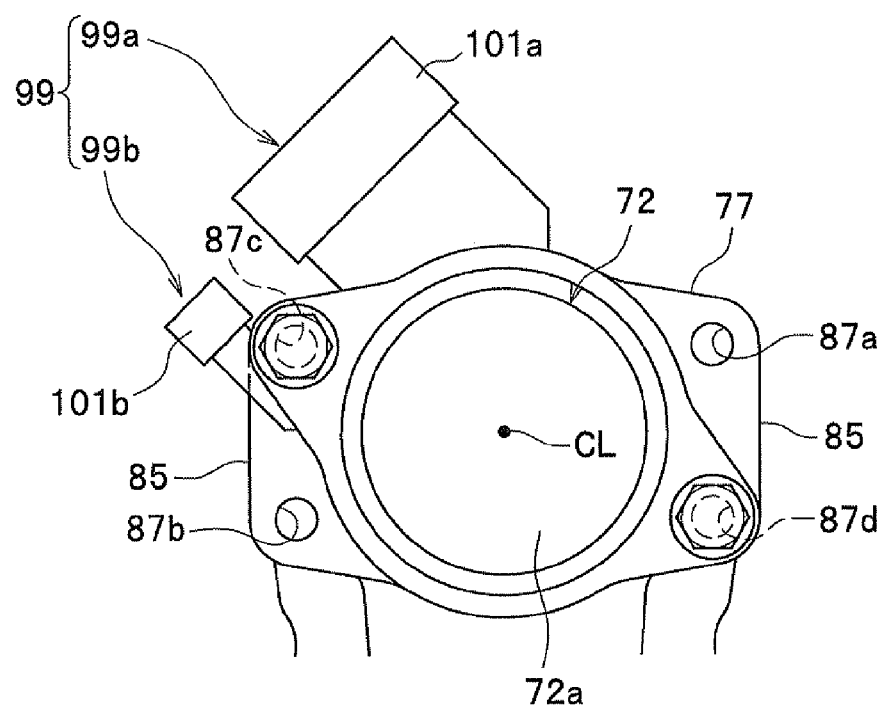
FIG. 24 is a partial front view showing a state that the connector is disposed with inclination with respect to the electric motor.

FIG. 22 is a partial front view showing a state that a connector is disposed on one side of an electric motor. FIG. 23 is a partial front view showing a state that the connector is reversed by 180 degrees from the state in FIG. 22 and disposed on the other side of the electric motor. FIG. 24 is a partial front view showing a state that the connector is disposed with inclination with respect to the electric motor.

In the example, shown in FIG. 22, of rotation disposition of the connector 99, the pair of screw members 201 is fastened to the pair of screw holes 87a and 87b diagonally located opposite to each other, and the electric motor 72 is thereby fixed to the connection portion 77. As a result, the power connector 99a on the upper side and the sensor connector 99b on the lower side are disposed on the one side along the transverse direction of the electric motor 72 in a state that the power connector 99a and the sensor connector 99b are disposed in parallel to each other. In this case, the pair of screw holes 87a and 87b is selected from the four screw holes 87a to 87d, and the pair of screw holes 87c and 87d, which is the rest having not been selected, is exposed to outside as it is.

Further, in the example, shown in FIG. 23, of rotation disposition of the connector 99, by rotating the connector 99 shown in FIG. 22 from the state of disposition of the connector 99 on the one side by 180 degrees with the axial line (central line) of the electric motor 72 as the rotation center, the connector 99 is reversed so that the pair of screw members 201 are fastened to the screw holes 87a and 87b, and the electric motor 72 is thereby fixed to the connection portion 77. As a result, the sensor connector 99b on the upper side and the power connector 99a on the lower side are disposed on the other side along the transverse direction of the electric motor 72 in a state that the sensor connector 99b and the power connector 99a are disposed in parallel to each other. In this case, the electric motor 72 and the connector 99 are the same ones as those in FIG. 22, wherein the pair of screw holes 87a and 87b is selected from the four screw holes 87a to 87d, and the pair of screw holes 87c and 87d, which is the rest having not been selected, is exposed to outside as it is.

Still further, in the example shown in FIG. 24 of rotation disposition of the connector 99, the pair of screw members 201 are fastened to the other pair of screw holes 87c and 87d diagonally located opposite to each other, and the electric motor 72 is thereby fixed to the connection portion 77. As a result, the connector 99 is disposed in a state of being inclined with respect to the electric motor 72. In this case, the other pair of screw holes 87c and 87d is selected from the four screw holes 87a to 87d, and the pair of screw holes 87a and 87b, which is the rest having not been selected, is exposed to outside as it is. The electric motor 72 and the connector 99 are the same ones as those in FIG. 22.

In the present embodiment, as shown in FIGS. 22 to 24, the connector 99 is provided such as to enable disposition at plural rotation positions with reference to the axial line CL of the electric motor 72, and it is thereby possible, for example, to easily match specifications with either right-hand drive or left-hand drive regarding the position of the steering wheel of the vehicle, which further improves the versatility.

Yet further, in the present embodiment, changing means for changing the disposition direction of the connector 99 is arranged by the four screw holes 87a to 87d formed on the rectangular side wall 85 and the pair of screw members 201 selectively fastened to the screw holes 87a to 87d. The screw holes 87a to 87d to fasten the pair of screw members 201 are arbitrarily selected from the plural screw holes 87a to 87d, and the connector 99 is rotated with the axial line CL of the electric motor 72 as the rotation center such as to match the selected screw holes 87a to 87d. Thus, the disposition position of the connector 99 can be changed. As a result, in the present embodiment, the changing means can be arranged by a simple structure, and the disposition position of the connector 99 can thus be simply and easily changed. Incidentally, the numbers and the dispositions of the screw holes 87a to 87d and the screw members 201 have been described above as an example without being limited to the number shown in FIGS. 22 to 24, and may be set, as appropriate.

Further, in the present embodiment, the connector 99 is arranged in divided two structures respectively including at least the power connector 99a and the sensor connector 99b for a sensor. Thus, it is possible to reduce occurrence of noise on a detection signal that is output from the rotational angle sensor 73a, and also achieve downsizing compared with a case of integrating plural connecters.

Still further, in the present embodiment, it is possible to obtain a vehicle brake system 10 provided with a motor cylinder device 16 capable of improving the versatility.

Fourth Embodiment

A fourth embodiment according to the present invention will be described below. The same symbols will be assigned to elements common with those in the first embodiment, and structures and description in the first embodiment will be quoted.

Figure 25:
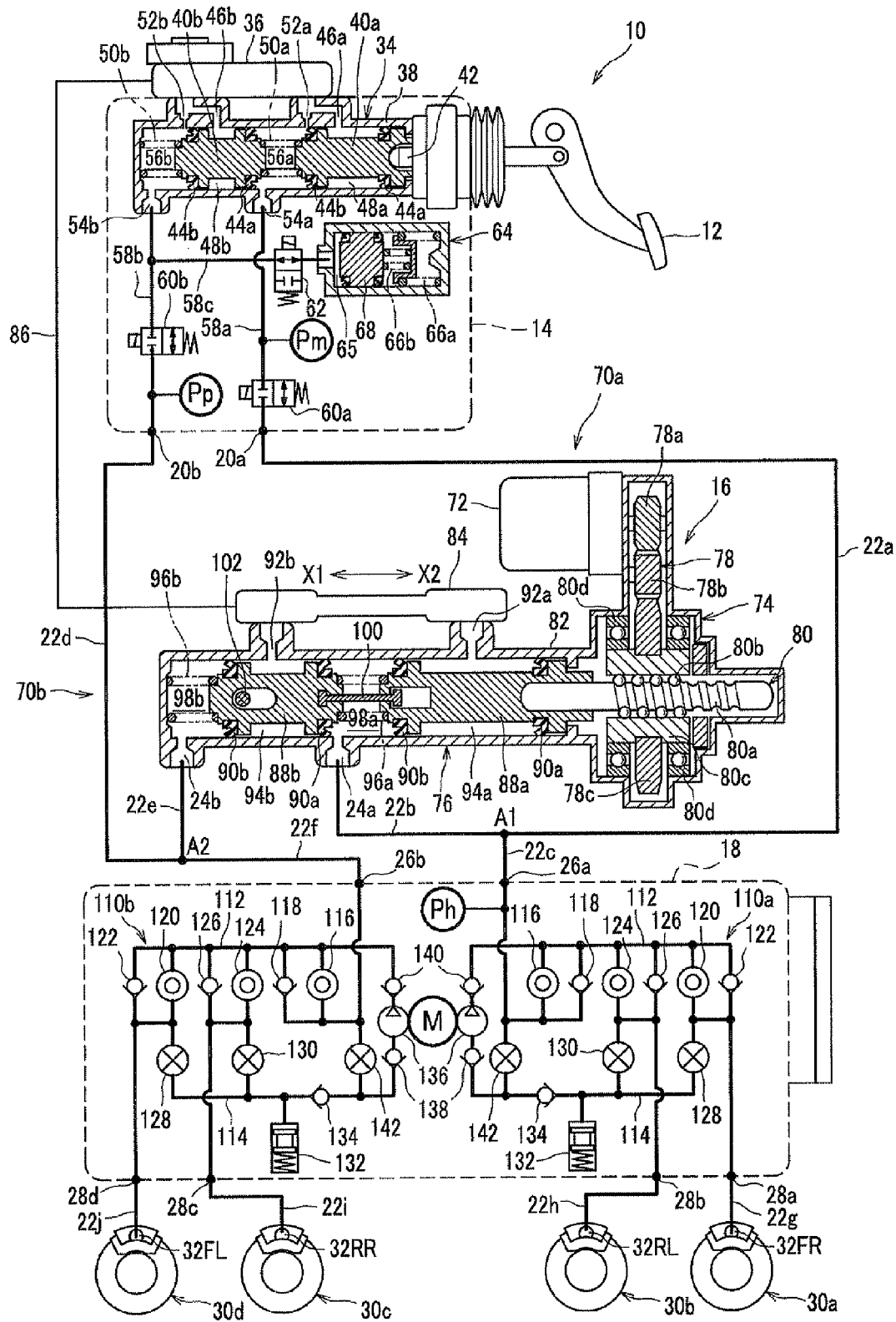
FIG. 25 shows the schematic configuration of a vehicle brake system in which a motor cylinder device in a fourth embodiment according to the present invention is built.

FIG. 25 shows the schematic configuration of a vehicle brake system in which a motor cylinder device in a fourth embodiment according to the present invention is built. As a vehicle brake system 10 shown in FIG. 25 is generally similar to that in the first embodiment, description thereof will be omitted, as appropriate, and different points will be mainly described below.

Figure 26:
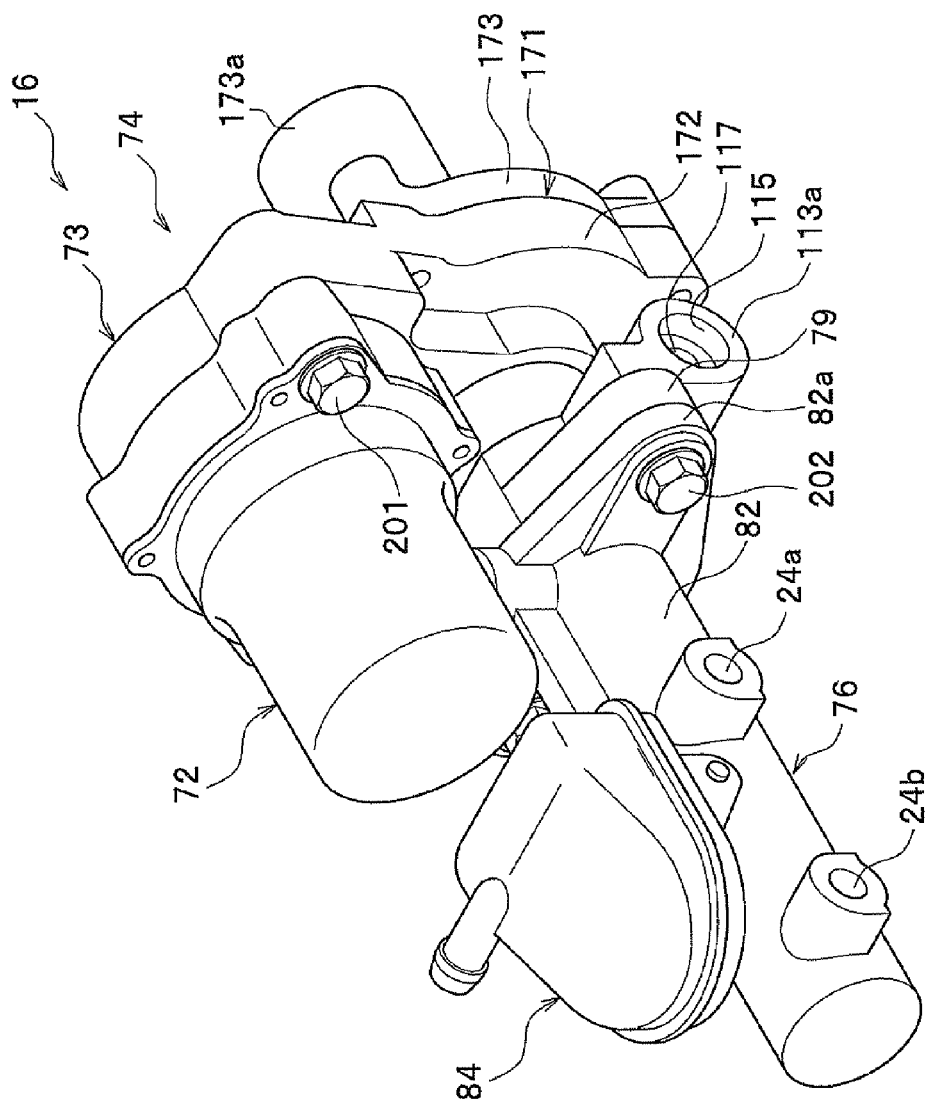
FIG. 26 is a perspective view of the motor cylinder device shown in FIG. 25.
Figure 27:
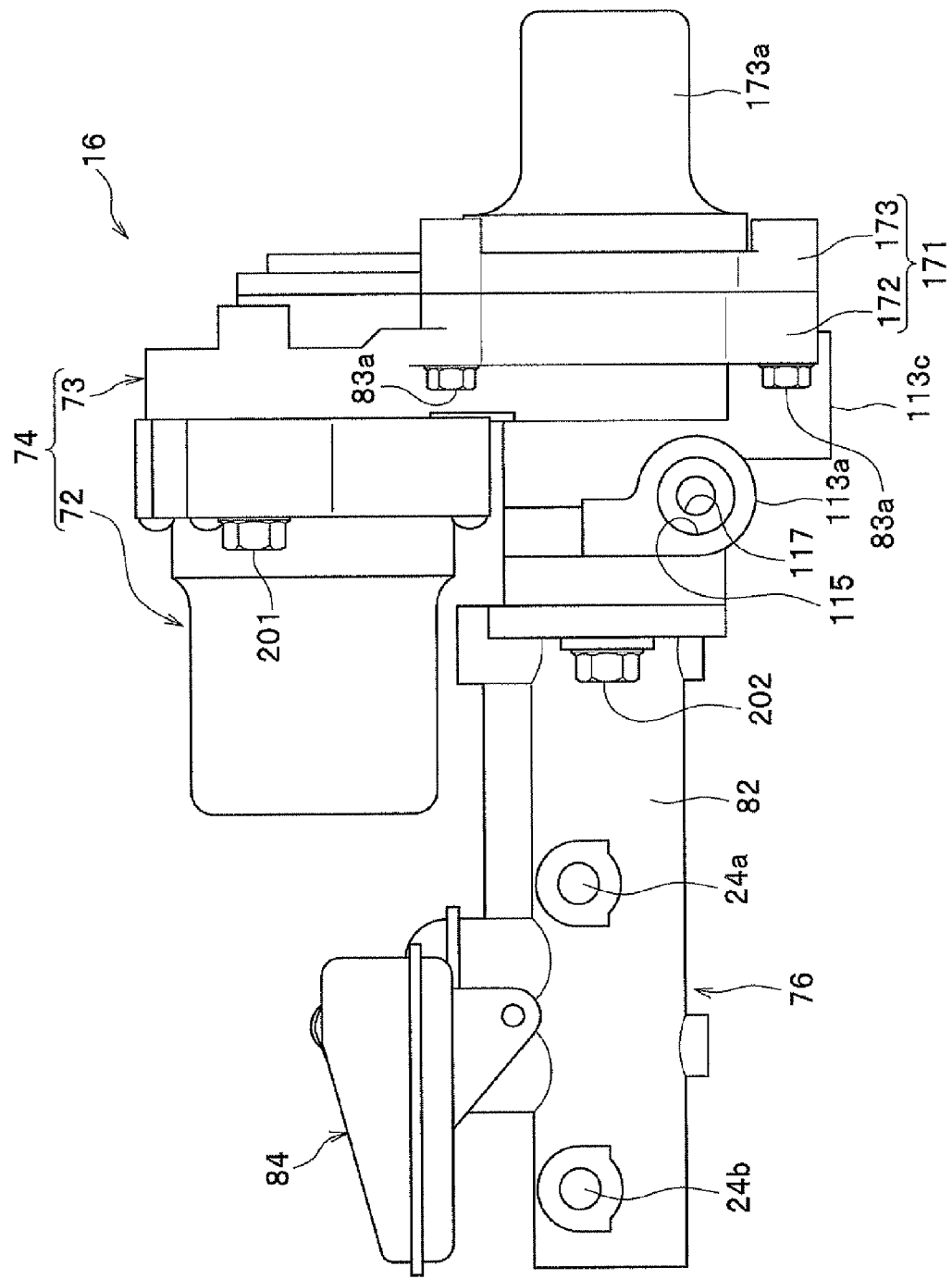
FIG. 27 is a side view of the motor cylinder device.
Figure 28:
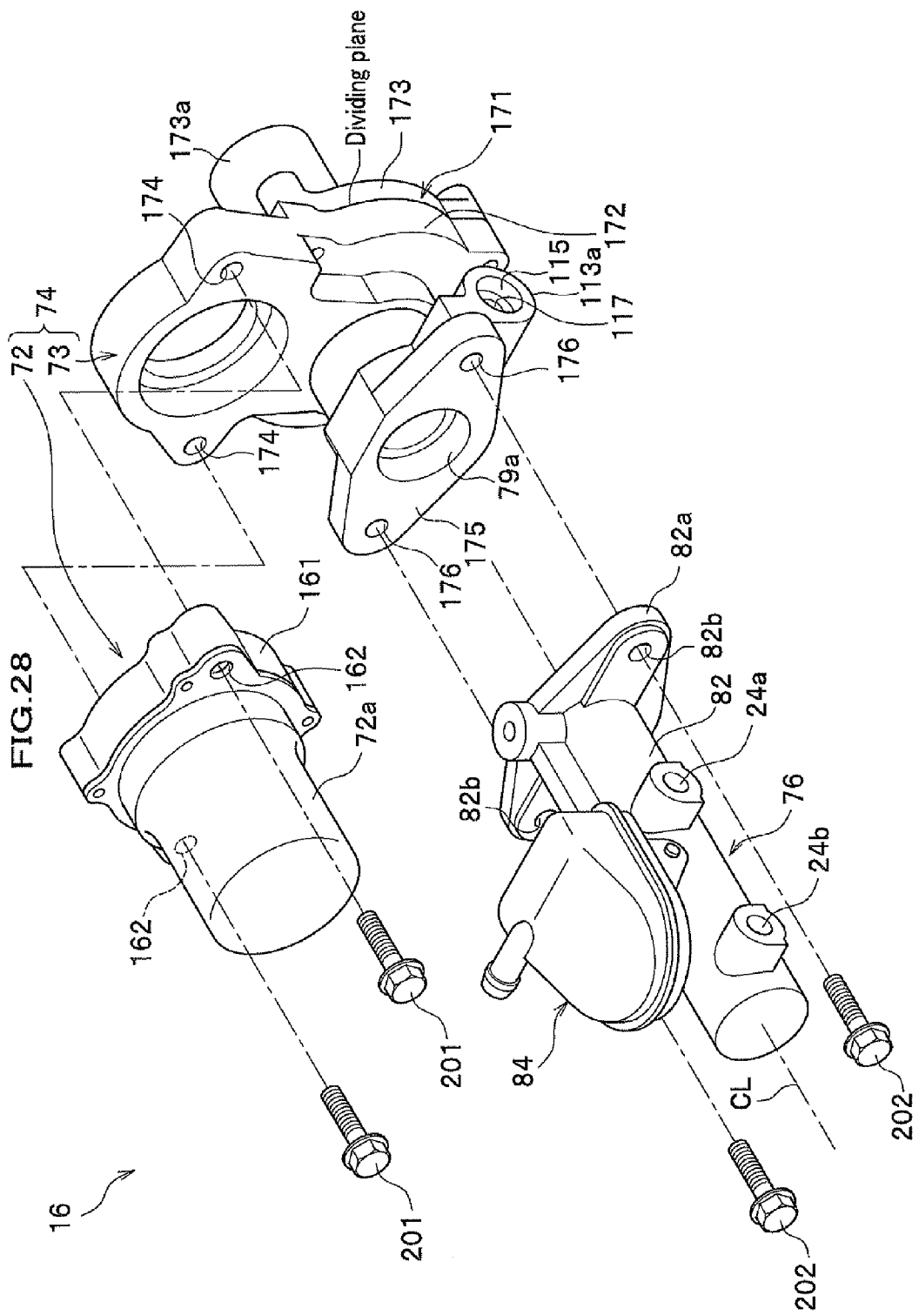
FIG. 28 is an exploded perspective view of the motor cylinder device.
Figure 29:
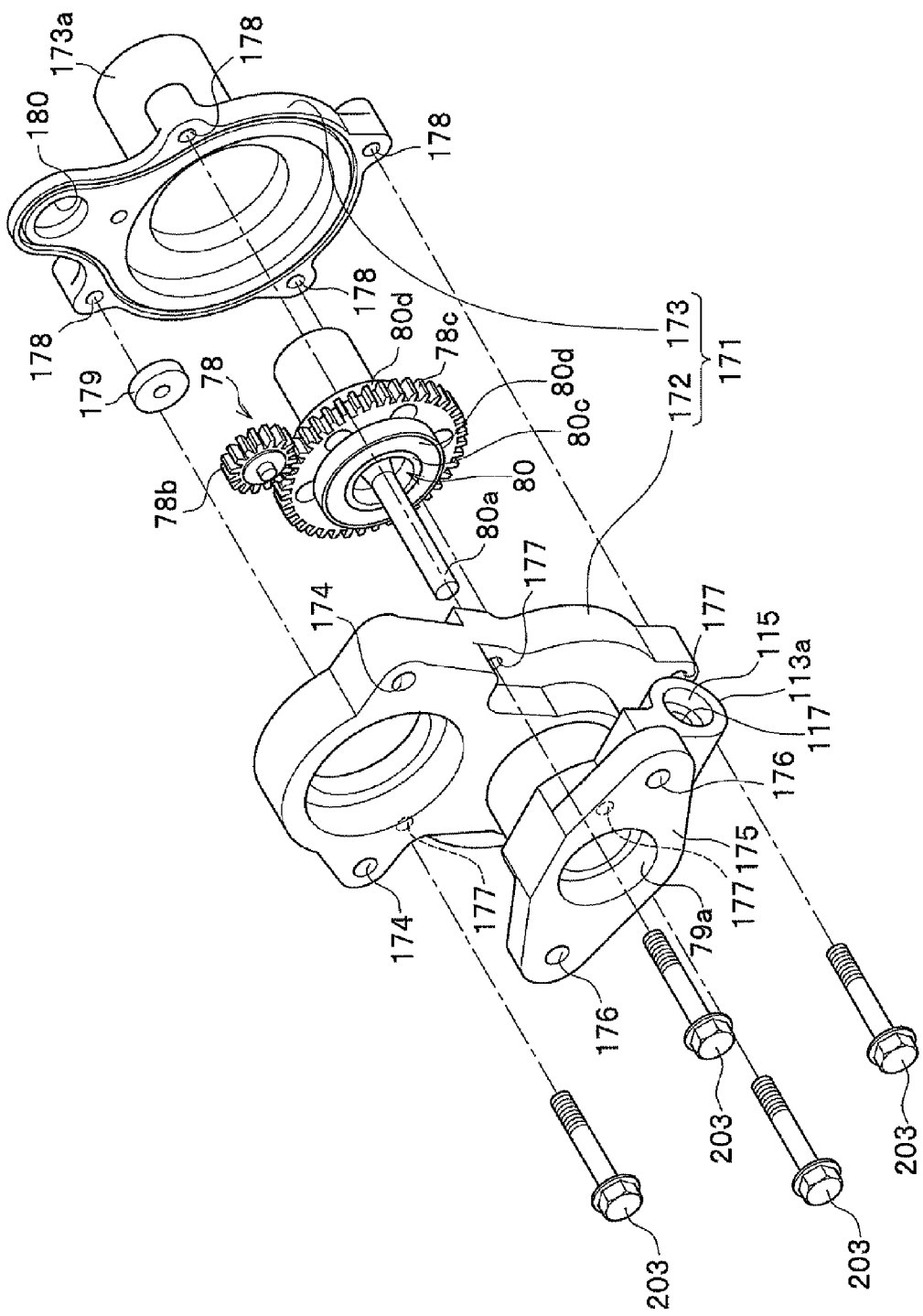
FIG. 29 is an exploded perspective view of a driving force transmission section of the motor cylinder device.
Figure 30:
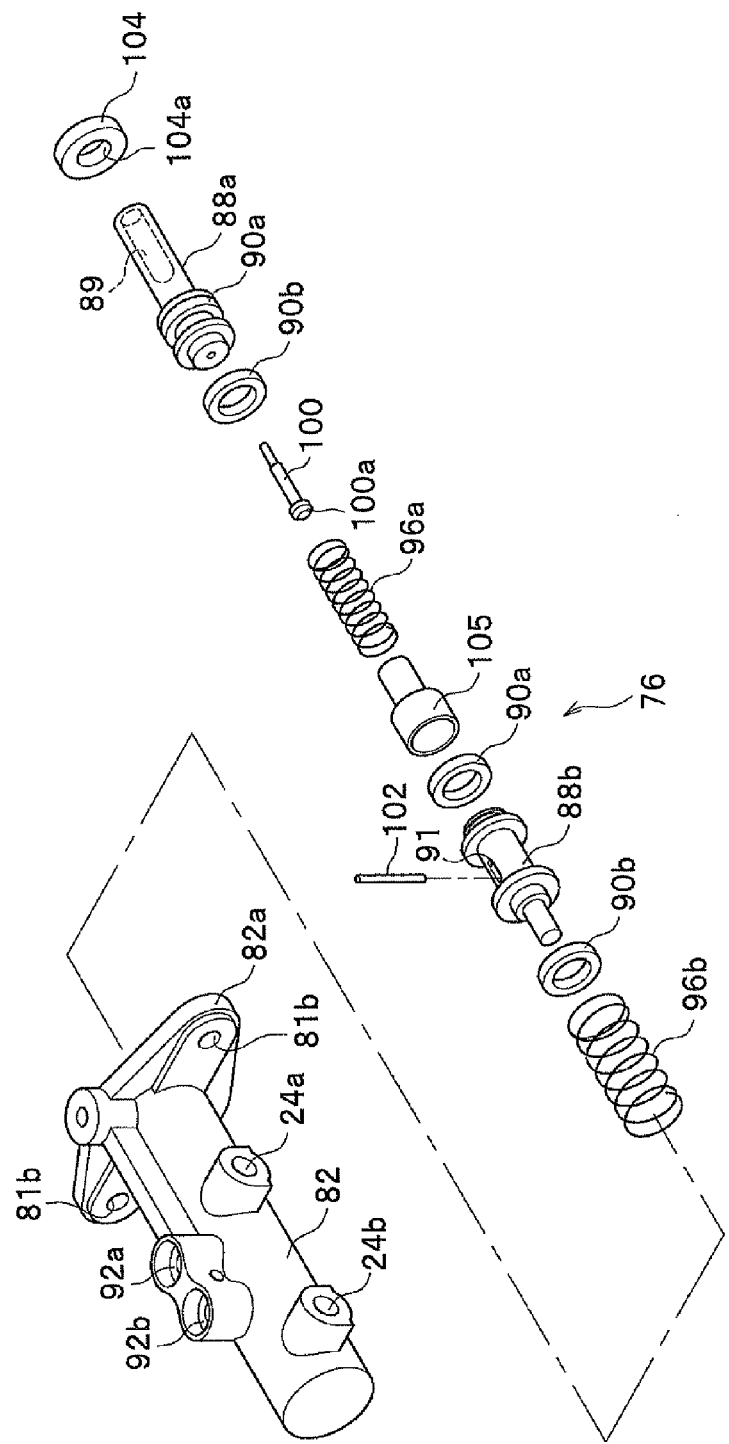
FIG. 30 is an exploded perspective view of a cylinder mechanism of the motor cylinder device.

FIG. 26 is a perspective view of the motor cylinder device shown in FIG. 25. FIG. 27 is a side view of the motor cylinder device. FIG. 28 is an exploded perspective view of the motor cylinder device. FIG. 29 is an exploded perspective view of a driving force transmission section of the motor cylinder device. FIG. 30 is an exploded perspective view of a cylinder mechanism of the motor cylinder device.

A motor cylinder device 16 that functions as an electric brake actuator is, as shown in FIG. 26, provided with an actuator mechanism 74 having an electric motor 72 and a driving force transmission section 73, and a cylinder mechanism 76 urged by the actuator mechanism 74. In this case, as shown in FIG. 28, the electric motor 72, the driving force transmission section 73, and the cylinder mechanism 76 are arranged such as to be separable from each other.

Further, the driving force transmission section 73 of the actuator mechanism 74 includes a gear mechanism (deceleration mechanism) 78 for transmitting the rotational driving force of the electric motor 72, and a ball screw assembly 80 for converting this rotational driving force into linear movement (linear axial force) and transmitting the linear movement (linear axial direction) to the side of later-described slave pistons 88a and 88b.

The electric motor 72 is subjected to drive control based on a control signal (electrical signal) from control means, not shown, and is for example a servo motor, wherein the electric motor 72 is disposed higher than the cylinder mechanism 76. By such a disposition arrangement, oil component such as grease in the driving force transmission section 73 is satisfactorily prevented from entering the electric motor 72 by gravity action.

The electric motor 72 is configured by a motor casing 72a formed in a cylindrical shape with a bottom and a base portion 161 that is integrally joined with the motor casing 72a, wherein a harness, not shown, is connected to the base portion 161. The base portion 161 is provided with a plurality of insertion holes (penetration holes) 162 for inserting screw members (bolts) 20 through, and the electric motor 72 is fastened to a later-described actuator housing 171 through the screw members 201.

The driving force transmission section 73 has the actuator housing 171, and the gear mechanism (deceleration mechanism) 78, the ball screw assembly 80, and other mechanical elements for transmitting driving force are housed in the space portion in the actuator housing 171. The actuator housing 171 is arranged, as shown in FIG. 29, in divided structures that are a first body (housing) 172 disposed on the cylinder mechanism 76 side and a second body (cover) 173 closing the opening end on the side opposite to the cylinder mechanism 76. Incidentally, an electric brake actuator main body is configured by the actuator housing 171 and a later-described cylinder main body 82.

As shown in FIG. 28, a pair of screw holes 174 for attaching the electric motor 72 to the driving force transmission section 73 is provided on the upper side of the first body 172 to, and the electric motor 72 is fixed by fastening the pair of screw members 201 to the screw holes 174. Further, a flange portion 175 substantially in a rhombic shape is provided at the end portion of the actuator housing 172, the end portion being on the cylinder mechanism 76 side, and the flange portion 175 is provided with a substantially circular opening 79a and a pair of screw holes 176 for attaching the cylinder mechanism 76. In this case, a pair of screw members 202 penetrating through the insertion holes (penetration holes) 82b of a flange portion 82a provided on the other end portion of the cylinder main body 82 is screwed into the screw holes 176, and the cylinder mechanism 76 and the driving force transmission section 73 are thereby integrally joined.

As shown in FIG. 29, the gear mechanism 78 and the ball screw assembly 80 are housed between the first body 172 and the second body 173. The gear mechanism 78 is provided with a pinion gear 78a (see FIG. 25) with a small diameter fitted to the output shaft of the electric motor 72, an idle gear 78b with a small diameter engaging with the pinion gear 78a, and a ring gear 78c with a large diameter engaging with the idle gear 78b.

The ball screw assembly 80 includes a ball screw shaft 80a whose one end side is in contact with the first slave piston 88a of the cylinder mechanism 76, plural balls 80b (see FIG. 25) that roll and move along a screw groove in a spiral shape formed on the outer circumferential surface of the ball screw shaft 80a, a nut portion 80c substantially in a cylindrical shape that is fitted to the inside of the ring gear 78c to rotate integrally with the ring gear 78c and is screw-engaged with the balls 80b, and a pair of ball bearings 80d (see FIG. 25) for rotatably and axially supporting the one end side and the other end side of the nut portion 80c along the axial direction. Incidentally, the nut portion 80c is fixed to the inner diameter surface of the ring gear 78c, for example by pressure fitting.

The driving force transmission section 73 is configured in such a manner. Thus, after the rotational driving force of the electric motor 72 transmitted through the gear mechanism 78 is input to the nut portion 80c, the rotational driving force is converted into a linear axial force (linear movement) by the ball screw assembly 80 to move the ball screw shaft 80a forward and backward along the axial direction.

The first body 172 and the second body 173 of the actuator housing 171 are integrally joined through four bolts 203 and are arranged to be separable from each other. The first body 172 is provided with insertion holes (penetration holes) 177 to let the four bolts penetrate through, and the second body 173 is provided with screw holes 178 at positions corresponding to the insertion holes 177, the screw portions of the bolts 203 being screwed into the screw holes 178.

In this case, by screwing the bolts 203, the bolts 203 penetrating through the insertion holes 177 of the first body 172, into the screw holes 178 of the second body 173, the first body 172 and the second body 173 are integrally joined. Incidentally, a circular recession portion (hole portion) 180 is provided on the upper side of the second body 173, and a bearing 179 for axially and rotatably supporting the tip end portion of the output shaft of the electric motor 72 is attached to the above-describe circular recessed portion 180.

In the present embodiment, having a plane substantially perpendicular to the axial line CL of the cylinder main body 82 of the cylinder mechanism 76 be a dividing plane (see FIG. 28), the actuator housing 171 is configured in divided structures of the first body 172 and the second body 173. Thus, the fastening direction of the plural bolts 203 becomes parallel to the axial line (central axis) CL of the cylinder main body 82, and the attaching work of the actuator housing 171 can thereby be easily carried out.

The cylinder mechanism 76 includes the cylinder main body 82 and the second reservoir 84 arranged on the cylinder main body 82. The second reservoir 84 is connected by a piping tube 86 with the first reservoir 36 arranged on the master cylinder 34 of the input device 14, and is arranged to supply the brake fluid reserved in the first reservoir 36 into the second reservoir 84 through the piping tube 86.

As shown in FIGS. 25 and 30, the first slave piston 88a (piston) and the second slave piston 88b (piston) are slidably arranged with a certain distance therebetween along the axial direction of the cylinder main body 82. The first slave piston 88a is disposed close to the ball screw assembly 80 side, and moves along direction arrow X1 and direction arrow X2 integrally with the ball screw shaft ball screw shaft 80a and in contact with one end portion of the ball screw shaft 80a through a hole portion 89. The second slave piston 88b is disposed farther than the first slave piston 88a from the ball screw assembly 80 side.

A pair of slave packings 90a and 90b is attached on the outer circumferential surface of the first and second slave pistons 88a and 88b through an annular stepped portion. A first back chamber 94a and a second back chamber 94b are formed between the pair of slave piston packings 90a and 90b, wherein the first back chamber 94a and the second back chamber 94b communicate respectively with later-described reservoir ports 92a and 92b (see FIG. 25). Further, a first return spring 96a is arranged between the first and second slave pistons 88a and 88b, and a second return spring 96b is arranged between the second slave piston 88b and the side end portion (bottom wall) of the cylinder main body 82.

The cylinder main body 82 of the cylinder mechanism 76 is provided with two reservoir ports 92a and 92b, and two output ports 24a and 24b. In this case, the reservoir port 92a (92b) is arranged to communicate with a reservoir chamber, not shown, in the second reservoir 84.

Further, inside the cylinder main body 82, there are provided a first hydraulic pressure chamber 98a for controlling a hydraulic brake pressure that is output from the output port 24a to the side of wheel cylinders 32FR and 32RL, and a second hydraulic pressure chamber 98b for controlling a hydraulic brake pressure that is output from the other output port 24b to the side of wheel cylinders 32RR and 32FL.

Restricting means 100 in a shape of a bolt is provided between the first slave piston 88a and the second slave piston 88b to restrict the maximum stroke (the maximum displacement distance) and the minimum stroke (the minimum displacement distance) of the slave piston 88a and the slave piston 88b. Further, the second slave piston 88b is provided with a stopper pin 102 that engages with a penetration hole 91 penetrating along a direction substantially perpendicular to the axial line of the second slave piston 88b so as to restrict the sliding range of the second slave piston 88b and inhibit over return of the slave piston 88b to the slave piston 88a side. Thus, the restricting means 100 and the stopper pin 102 prevent a defect of another system at the time of a defect of one system, particularly at the time of backup when braking is carried out by a hydraulic brake pressure generated by the master cylinder 34.

Incidentally, as shown in FIG. 30, a piston guide 104 is attached to the opening portion of the cylinder main body 82, wherein the piston guide 104 is stopped through a circlip, not shown. The piston guide 104 is provided with a penetration hole 104a which the first slave piston 88a can penetrate through with a clearance, and by making the rod portion of the first slave piston 88a slide along the penetration hole 104a, it is possible to linearly guide the first slave piston 88a in contract with one end portion of the ball screw shaft 80a. Further, a connection piston 105 is connected to the second slave piston 88b, and the connection piston 105 is provided with an engagement hole, not shown, with which a heat portion 100a of the restricting means 100 formed in a bolt shape engages.

Figure 31:
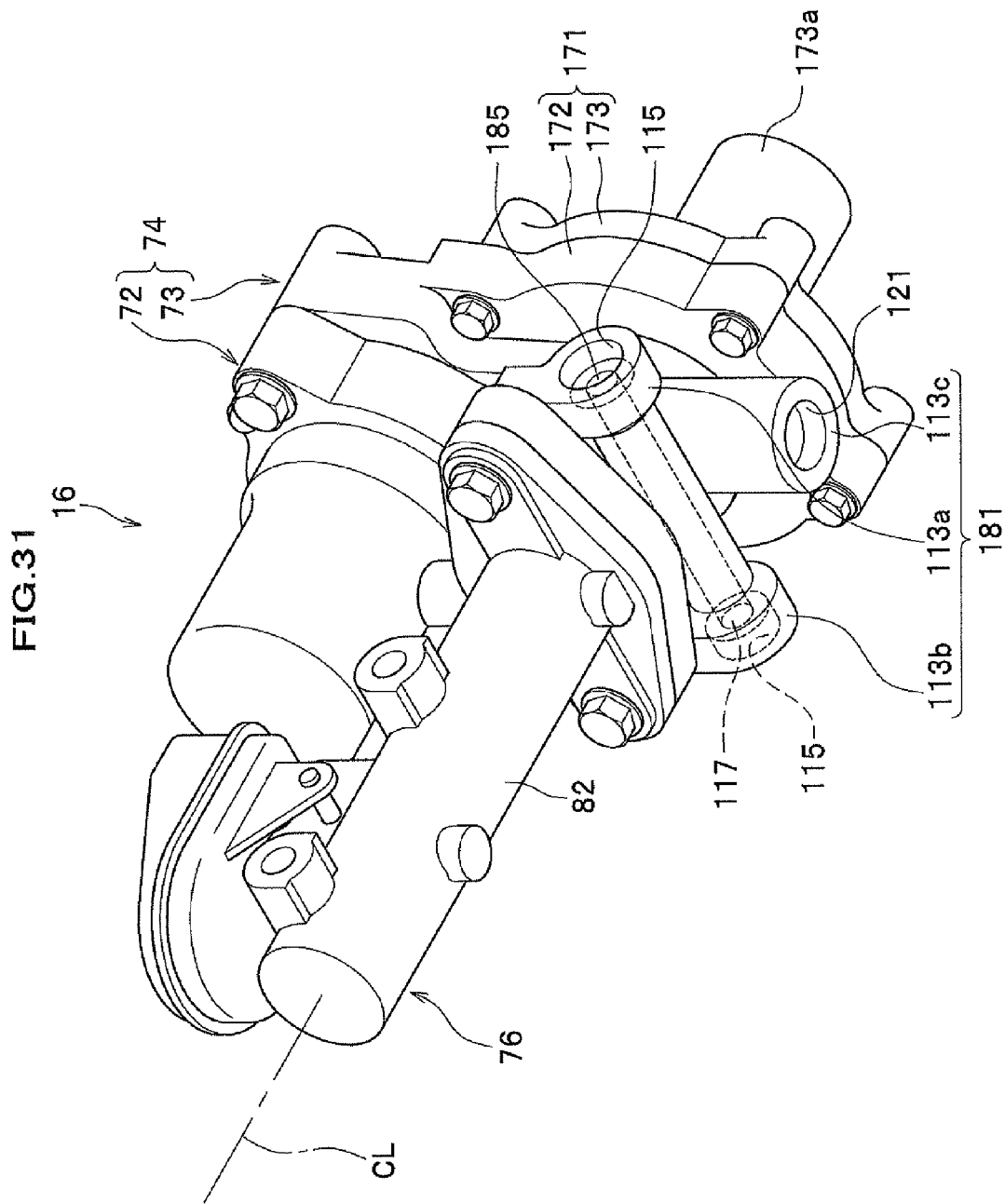
FIG. 31 is a perspective view of the motor cylinder device in a view from below.
Figure 32:
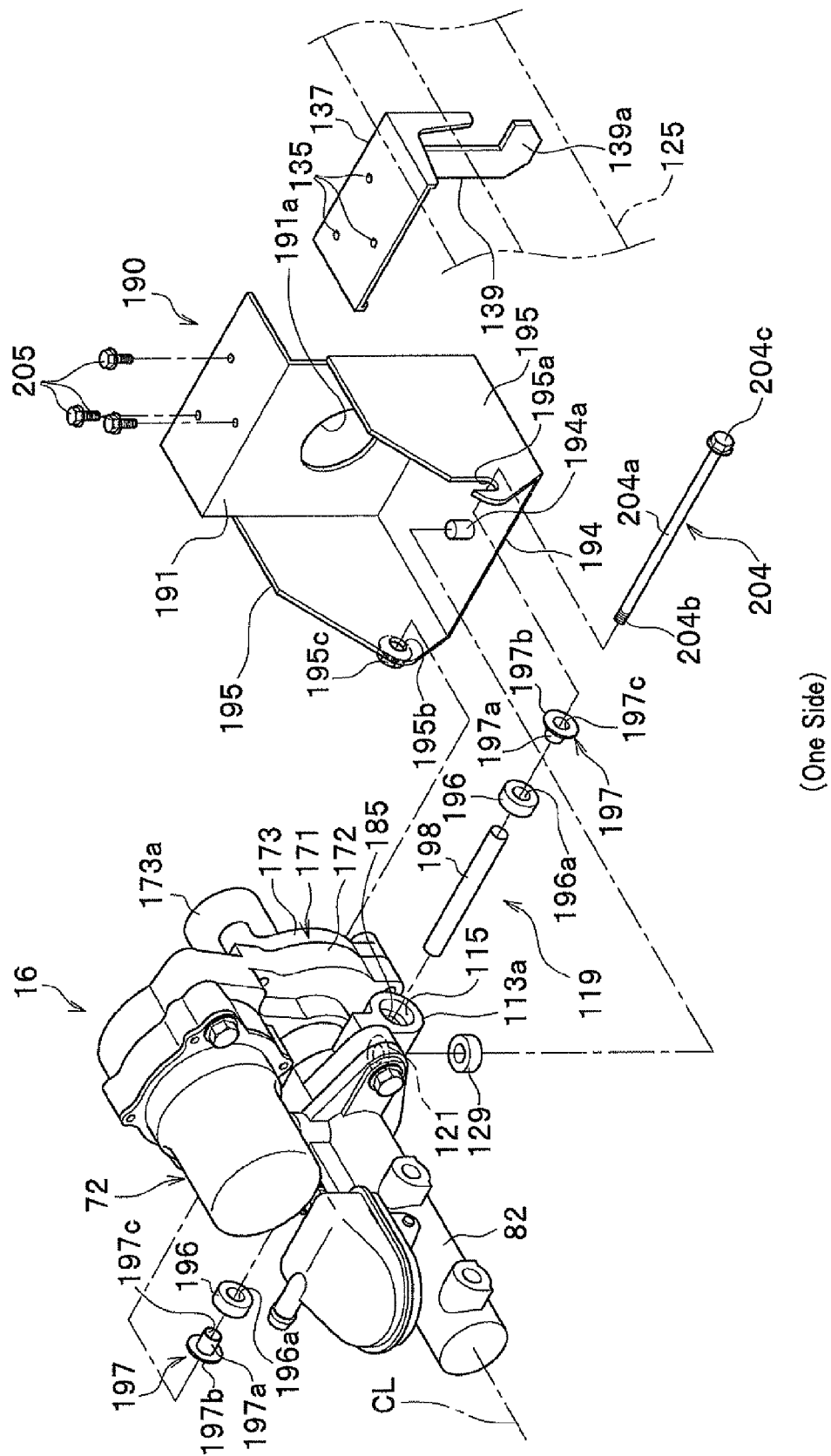
FIG. 32 is a perspective view showing a state that the motor cylinder device is fixed to a vehicle body frame through a fixing bracket supported by three points.

FIG. 31 is a perspective view of the motor cylinder device in a view from below. FIG. 32 is a perspective view showing a state that the motor cylinder device is fixed to a vehicle body frame through a fixing bracket supported by three points.

As shown in FIG. 31, on the lower side of the actuator housing 171 (or the first body 172), a mount portion 181 that supports the motor cylinder device 16 and attaches the motor cylinder device 16 to for example a vehicle body or the like. The mount portion 181 includes a first boss portion 113a located on the left side in a view from the second body 173 side and protruding along a direction substantially perpendicular to the axial line CL of the cylinder main body 82, a second boss portion 113b located on the right side in a view from the second body 173 side and protruding along a direction opposite to the first boss portion 113a, and a third boss portion 113c in a cylindrical shape protruding downward in a view from the second body 173 side.

The opening portions of the first boss portion 113a and the second boss portion 113b, which are provided on the left and right sides of the first body 172, are provided with stepped holes 115 in a circular shape, and the deeper side of the stepped holes 115 is provided with a penetration hole 185 that penetrates thorough mutually from the stepped hole portions 115 along a direction substantially perpendicular to the axial line CL of the cylinder main body 82. In this case, a support mechanism 119, shown in FIG. 32, is arranged inside the stepped hole portions 115 and the penetration hole 185.

In other words, the first boss portion 113a is located at one end portion along the axial direction of the penetration hole 185, the second boss portion 113b is located at the other end portion along the axial direction of the penetration hole 185, and the third boss portion 113c is located vertically downward substantially perpendicular to the axial line of the penetration hole 185. Incidentally, the third boss portion 113c is provided with a hole portion (lower mount hole) with a bottom. The first boss portion 113a, the second boss portion 113b, and the boss portion 113c are formed integrally with the first body 172, for example, by die-casting, using a light metal material such as an aluminum alloy.

As shown in FIG. 32, the motor cylinder device 16 is attached to a vehicle body, for example such as a front side frame 125, through the support mechanism 119 and the fixing bracket (electric brake actuator fixing bracket; attaching bracket) 190. Incidentally, the motor cylinder device 16 can also be fixed to the lower side of a dashboard (not shown) that partitions a power plant room, which houses an engine, a running motor, and other vehicle driving devices, and an interior cabin.

The support mechanism 119 will be described first, and then the fixing bracket 190 will be described.

As shown in FIG. 32, the support mechanism 119 includes: a single collar member (first collar) 198 that is formed in a hollowed cylindrical body inserted to the inner center of the penetration hole 185; a pair of elastic bodies (rubber bush) 196 that are located at the both ends of the first collar 198 along the axial direction and are formed by an annular body of rubber or the like attached to the stepped hole portions 115 of the first boss portion 113a and the second boss portion 113b; a pair of stop members (second collars) 197 each of which is provided with an axial portion (cylindrical portion) 197a attached to the hole portion 196a of the elastic body 196 and a flange portion 197b, the axial portion 196a and the flange portion 197b being formed integrally with each other, and provided with a hole portion 197c penetrating through the axial portion 197a along the axial line; and a single bolt (fixing member) 204 that is inserted from one side substantially perpendicular to the axial line CL of the cylinder main body 82 and penetrates through one stop member 197, one elastic body 196, the collar member 198, the other elastic body 196, and the other stop member 19, which are arranged inside the penetration hole 185.

The bolt 204 has a long axial body 204a, wherein a screw portion 204b is provided at one end portion along the axial direction of the axial body 204a, and a head portion 204c, on which a washer is attached, is provided at the other end portion.

The fixing bracket 190 has a vertical cross-section in a C-shape, and includes a pair of side plates 195, 195 supporting the first boss portion 113a and the second boss portion 113b of the motor cylinder device 16, sandwiching from the left/right horizontal directions, a bottom plate 194 having a protruding portion (pin) 194a that is inserted and fitted in the hole portion 121 of the third boss portion 113c, wherein an elastic body 196 of rubber or the like is attached to the protruding portion 194a, and a support plate (back plate) 191 connected to the pair of side plates 195, 195 and the bottom plate 194 to support the motor cylinder device 16.

Further, the fixing bracket 190 has a connecting plate 137 fastened to the upper surface portion of the support plate 191 through screw members 205 screwed into screw holes 135 formed through the upper surface, and a fixing plate 139 that has a bent portion 139a bent substantially in an L-shape and fixes the fixing bracket 190 by being welded to the side surface of the front side frame 125.

One side plate 195 positioned on one side is provided with a notched portion 195 substantially in a U-shape, and the axial body 204a of the bolt 204 is held by being stopped by the notched portion 195a. Further, the other side plate 195 is provided with a nut 195c welded and fixedly attached, and the screw portion 204b of the bolt 204 after penetrating through the insertion hole (penetration hole) 195b is screwed to the nut 195c.

The motor cylinder device 16 (the cylindrical portion 173a of the second body 173) is inserted along the axial direction of the cylinder main body 82 through the central portion of the support plate 191, and the central portion 191 is provided with a circular hole portion (opening) 191a that functions as an insertion portion for restricting the displacement of a portion having passed through. Further, the support plate 191 functions as a support portion for supporting a part of the motor cylinder device 16 in a state of inserting through along the axial direction of the cylinder main body 82. Further, the fixing plate 139 welded to the front side frame 125, which forms a vehicle body, functions as a fixing portion.

In this case, a certain clearance is formed between the circular hole portion 191a and the cylindrical portion 173a of the second body 173, and when a heavy load is applied to the motor cylinder device 16 by some cause and the motor cylinder device 16 is excessively displaced, the clearance becomes zero so that the cylindrical portion 173a of the second body 173 and the circular hole portion 191a come in contact with each other.

In attaching work, first the fixing bracket 190 is fixed to the front side frame 125 by welding a fixing plate 139 to the side surface of the front side frame 125, then the cylindrical portion 173a of the motor cylinder device 16 is inserted through the circular hole portion 191a, and the protrusion portion 194a is inserted and fitted to inside the hole portion 121 of the third boss portion 113c through the elastic body 196. Further, a bolt 204 is made penetrate along the penetration hole 185 formed on the lower side of the actuator housing 171 through the notched portion 195a of one bracket 195 located on one side. Then, the bolt 204 is made penetrate through one stop member 197, one elastic body 196, the collar member 198, the other elastic body 196, and the other stop member 197, which are arranged inside the penetration hole 185, and thereafter, the screw portion 204b of the bolt 204 is fastened to the nut 195c fixedly attached to the other side plate 195.

As a result, in the present embodiment, the motor cylinder device 16 is supported by three points formed by the first boss portion 113a and the second boss portion 113b on the left and right sides of the actuator housing 171 and the third boss portion 113c on the lower side of the actuator housing 171.

Herein, the motor cylinder device 16 is elastically supported by the elastic body 196 attached inside the stepped hole portion 115 of the first boss portion 113a, the elastic body 196 attached inside the stepped hole portion 115 of the second boss portion 113b, and the elastic body 196 attached inside the hole portion 121 of the third boss portion 113c. Thus, vibration caused by the electric motor 72 or the like of the motor cylinder device 16 is reduced, and an external force applied to the motor cylinder device 16 is damped by the elastic forces of the elastic bodies 196 so that the displacement of the motor cylinder device 16 is reduced.

Incidentally, it is also possible to attach the motor cylinder device 16 to the fixing bracket 190 in advance, fasten the bolt 204 after making the bolt 204 penetrate through the penetration hole 185, and thereafter attach the fixing bracket 190 having the motor cylinder device 16 attached thereon to the front side frame 125.

In the present embodiment, the bolt 204 is made penetrate from one side along the penetration hole 185, which is located on the lower side of the actuator housing 171 and penetrates along a direction substantially perpendicular to the axial line CL of the cylinder main body 82, and the screw portion 204b of the bolt 204 penetrating through the penetration hole 185 is fastened to the nut 195c on the other side. Thus, the motor cylinder device 16 can be supported in a stable state. As a result, in the present embodiment, the motor cylinder device 16 is stably supported by a simple structure, and it is thereby possible to attain a reduction in the weight and improve the attachability.

Incidentally, the head portion 204c of the bolt 204 penetrating through the penetration hole 185 of the actuator housing 171 is stopped by the notched portion 195a formed through one side plate 195 of the fixing bracket 190, and the screw portion 204b of the bolt 204 is fastened to the nut 195c fixedly attached to the other side plate 195 of the fixing bracket 190.

In this case, as penetration of the bolt 204 through the penetration hole 185 of the actuator housing 171 is carried out only from the one side, it is only necessary to ensure an attachment space and a maintenance space on the one side, which make it possible to effectively carry out the attaching work and the maintenance work.

Further, in the present embodiment, as elastic bodies 196 are attached to the both end sides along the axial direction of the bolt 204 penetrating through the penetration hole 185, the motor cylinder device 16 can be elastically supported by the elastic bodies 196. Accordingly, it is possible to satisfactorily reduce vibration caused by the motor cylinder device 16 itself, and also possible to satisfactorily damp an external force applied from outside, by the elastic forces of the elastic bodies 196. As a result, in the present embodiment, the motor cylinder device 16 is stably supported by a simple structure, and thereby, the displacement of the motor cylinder device 16 can be reduced.

Still further, in the present embodiment, the motor cylinder device 16 can be stably supported by three points of the first boss portion 113a and the second boss portion 113b provided on the left and right sides of the actuator housing 171, namely at the both end portions along the axial direction of the penetration hole 185, and the third boss portion 113c on the lower portion side of the actuator housing 171.

Fifth Embodiment

A fifth embodiment according to the present invention will be described below. The same symbols will be assigned to elements common with those in the first embodiment, and structures and description in the first embodiment will be quoted.

Referring to FIGS. 33 to 36, the support structure of piping tubes connected to the motor cylinder device 16 will be describe below.

Figure 33:
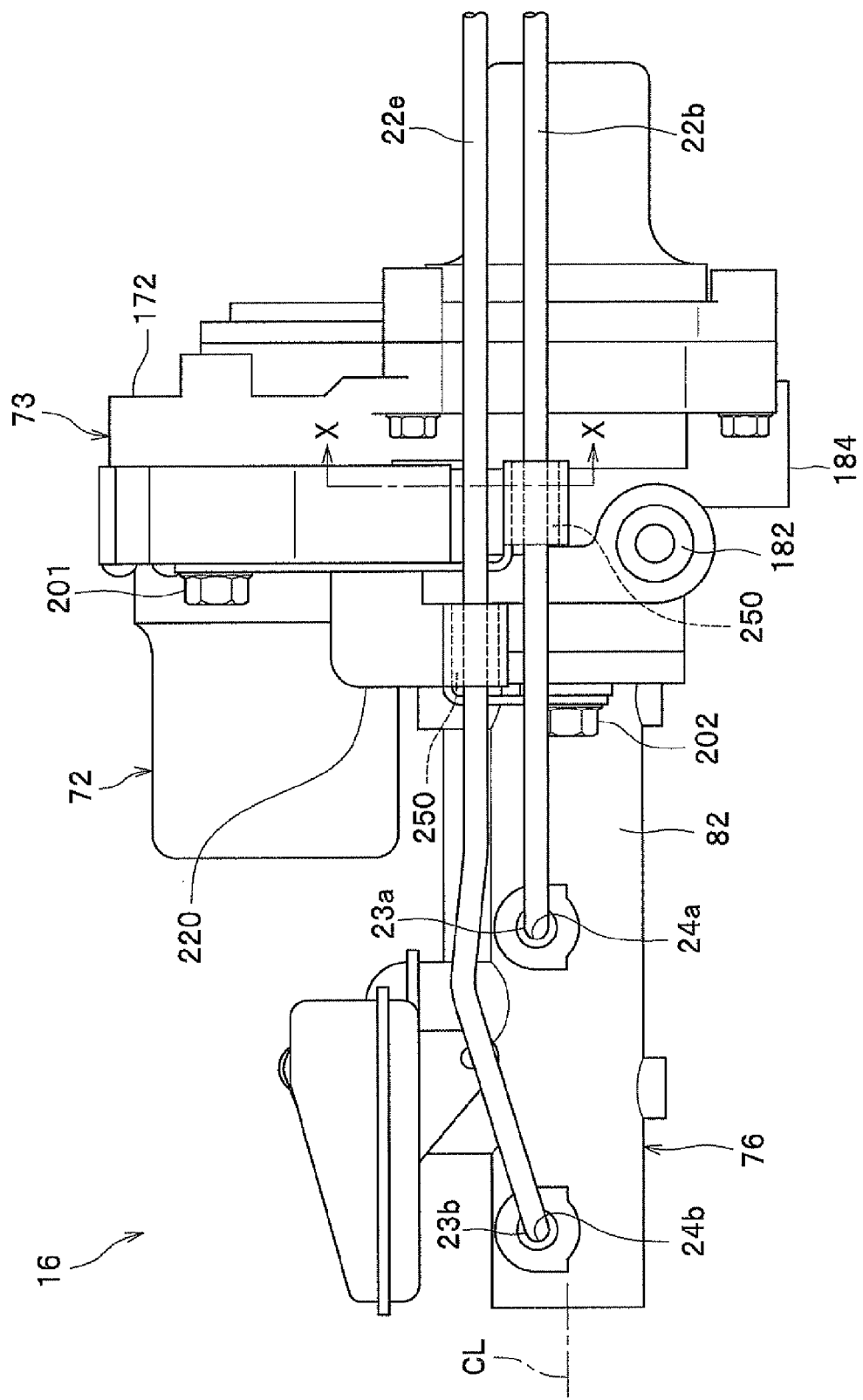
FIG. 33 is a side view showing the support structure of piping tubes in a fifth embodiment according to the invention.
Figure 34:
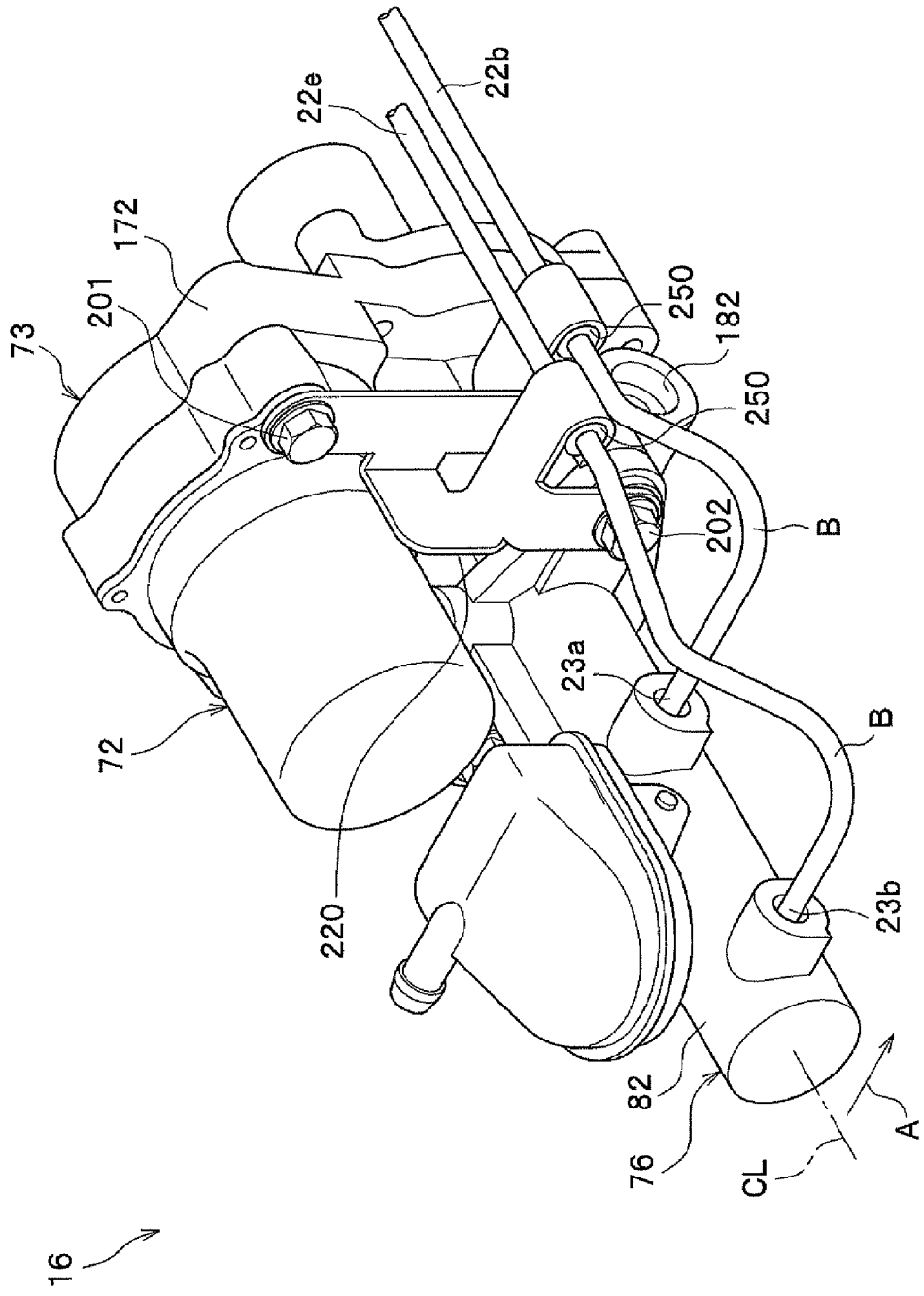
FIG. 34 is a perspective view showing the support structure of the piping tubes.
Figure 35A:
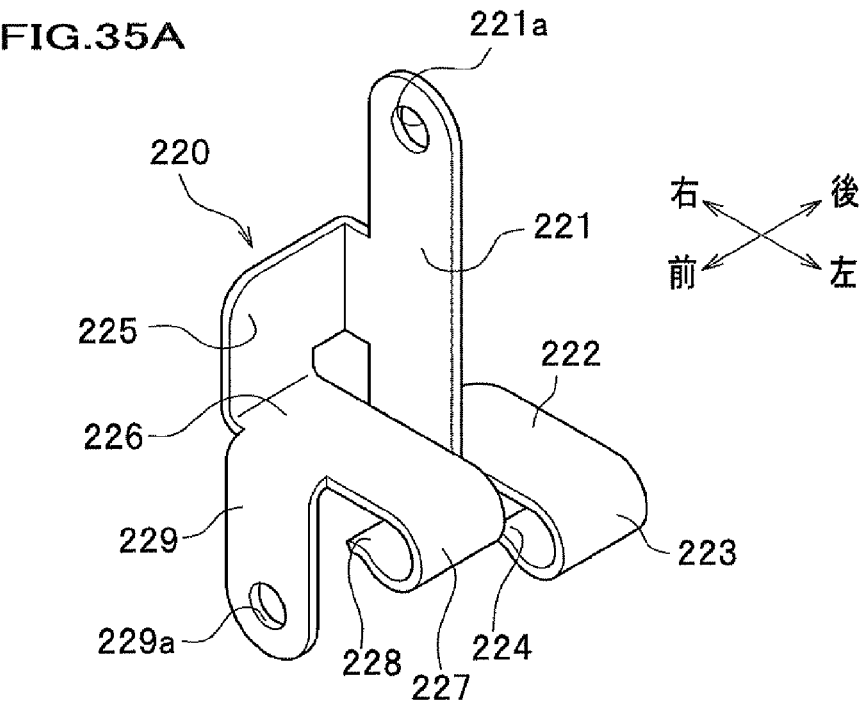
FIG. 35 diagram (a) is a perspective view of a clamp member for holding the piping tube and diagram (b) is a perspective view of the piping tubes to which a rubber bush is attached.
Figure 35B:
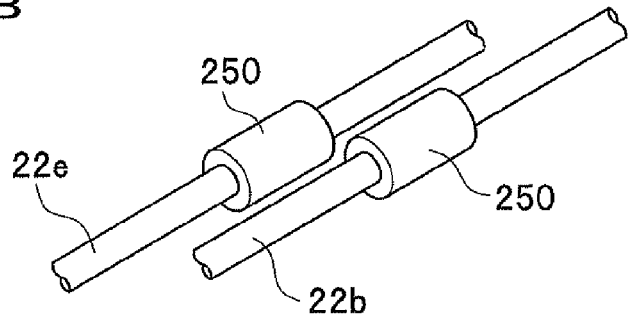
Figure 36:
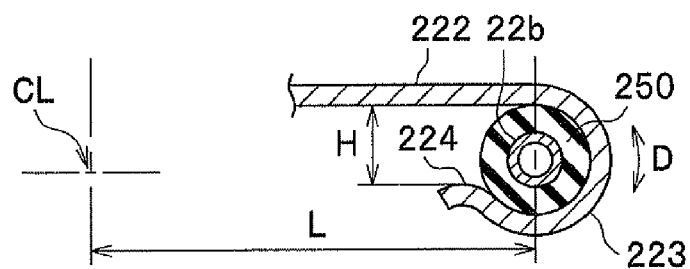
FIG. 36 is a cross-sectional view taken along line X-X in FIG. 33.

FIG. 33 is a side view showing the support structure of piping tubes in a fifth embodiment according to the invention. FIG. 34 is a perspective view showing the support structure of the piping tubes. FIG. 35 diagram (a) is a perspective view of a clamp member 220 for holding the piping tubes and diagram (b) is a perspective view of the piping tubes to which a rubber bush is attached. FIG. 36 is a cross-sectional view taken along line X-X in FIG. 33. Incidentally, in order to avoid the views from becoming complicated, members such as an attaching bracket 190 and the like will be omitted in showing in FIGS. 33 and 34.

As shown in FIGS. 33 and 34, piping tubes (pipes) 22b and 22e in which brake fluid flows are connected to output ports 24a and 24b formed on the cylinder main body 82 of a cylinder mechanism 76. The piping tubes 22b and 22e are formed by bending metal pipes such as steel pipes into a certain shape (other piping tubes also).

Herein, the cylinder mechanism 76 is a so-called tandem type cylinder mechanism that includes a first hydraulic pressure chamber 98a and a second hydraulic pressure chamber 98b formed side by side along the central axis direction CL. The output port 24a is a primary port communicating with the first hydraulic pressure chamber 98a, and the output port 24b is a secondary port communicating with the second hydraulic pressure chamber 98b.

Respective portions of the piping tubes 22b and 22e, which are located at respective positions away along the respective extending directions of the piping tubes 22b and 22e from the connection parts 23a and 23b with the output ports 24a and 24b of the piping tubes 22b and 22e, are supported and fixed by the intermediate portion of the motor cylinder device 16. The intermediate portion of the motor cylinder device 16 refers to a portion that is not the end portion of the motor cylinder device 16 along the central axis direction CL of a first and second slave pistons 88a and 88b (see FIG. 2) but is a portion near the center of the motor cylinder device 16. Incidentally, the central axis CL is also the central axis of the cylinder mechanism 76.

A structure is formed such that in case the motor cylinder device 16 is displaced by receiving a force such as vibration, a load is divided to the connecting part of the piping tube 22b, 22e with the cylinder mechanism 76 and the supported part of the piping tube 22b, 22e supported by the intermediate portion of the motor cylinder device 16. Further, as the intermediate portion of the motor cylinder device 16 is ordinarily close to a mount portion 181 for attaching the motor cylinder device 16 to the vehicle body side, displacement upon reception of a force such as vibration is small. Thus, a stress caused in the piping tube 22b or 22e by the displacement of the electric brake actuator is reduced.

Herein, a clamp member (holding member) 220 is provided to hold the piping tubes 22b and 22e, wherein the housing 172 of a driving force transmission section 73 is provided with motor attaching screw holes 174 and cylinder mechanism attaching screw holes 176 (see FIG. 4), as attaching portions for attaching the clamp member 220 to the motor cylinder device 16. Accordingly, the piping tubes 22b and 22e can be supported by the driving force transmission section 73, which is ordinarily heavy and rigid, using the clamp member 220. Thus, the piping tubes 22b and 22e can be easily and stably supported by the motor cylinder device 16. Incidentally, the motor attaching screw holes 174 and the cylinder mechanism attaching screw holes 176 also serve as attaching screw holes for attaching the clamp member 220.

Further, the piping tubes 22b and 22e are disposed side by side around the central axis CL of the cylinder mechanism 76, held by the single clamp member 220, and thus attached to the intermediate portion of the motor cylinder device 16. By such a structure, it is possible to attach the plural piping tubes 22b and 22e to the intermediate portion all at a time, the portion supporting the piping tubes 22b and 22e becomes compact, and the number of components and the man-hours can be reduced.

Further, as shown in FIG. 34, the piping tubes 22b and 22e extend along a direction perpendicular to the central axis direction CL at the connection parts 23a and 23b with the output ports 24a and 24b such as to getting far from the surface of the cylinder mechanism 76, are bent at part B, thereafter again become close to the surface of the motor cylinder device 16, and is supported at a thus close portion thereof by the motor cylinder device 16. That is, the radial distance L (see FIG. 36) from the central axis CL to the supported part of the piping tube 22b or 22e is set as small as possible. By such an arrangement, interference with other components in the periphery can be prevented. Further, displacement D (see FIG. 36) along the circumferential direction becomes small in a case that a rotational variation occurs substantially around the central axis CL of the cylinder mechanism 76 upon reception of a force such as vibration, and this is advantageous in that a stress caused by rotational variation can be reduced.

As shown in FIG. 35, the clamp member 220 is formed by punching a metal sheet with elasticity, of a spring steel for example, into a certain shape and thereafter performing a bending process. The clamp member 220 is provided with a first attaching plate portion 221 having a penetration hole 221a which a bolt 201 penetrates through, a first arm 222 that is continuously formed from the lower end of the first attaching plate portion 221, bent backward with respect to the vertical direction from this lower end, and thereafter extended to the left, a first curved portion 223 that is continuously formed from the tip end side, along the extending direction, of the first arm 222 and capable of holding therein the piping tube 22b having an attached rubber bush 250, and a first bent portion 224 that is continuously formed from the tip end side, along the extending direction, of the first curved portion 223 and is slightly bent outward from the outer circumferential surface of the first curved portion 223. Further, the clamp member 220 is provided with a connecting plate portion 225 that is continuously formed from the right end of the first attaching plate portion 221 and bent forward with respect to the vertical direction, a second arm 226 that is continuously formed from the lower end of the connecting plate portion 225, bent to the left with respect to the vertical direction, and extended, a second curved portion 227 that is continuously formed from the tip end side, along the extending direction, of the second arm 226 and capable of holding therein the piping tube 22e having an attached rubber bush 250, a second bent portion 228 that is continuously formed from the tip end side, along the extending direction, of the second curved portion 227 and is slightly bent outward from the outer circumferential surface of the second curved portion 227, and a second attaching plate portion 229 that is provided with a penetration hole 229a which a bolt 202 penetrates through, continuously formed from the front end of the second arm 226, bent downward with respect to the vertical direction, and extended.

A rubber bush 250 is an elastic member substantially in a cylindrical shape of rubber capable of absorbing vibration and shock. Incidentally, it is also possible to improve the flexibility by forming asperity, for example on the outer circumferential surface of the rubber bush 250. Further, arrangement may be made such as to form one slit along the axial direction from the side surface of the rubber bush 250 to the central hole, thus making the piping tube 22b or 22e pass through this slit from the side, and attach the rubber bush 250 to the piping tube 22b or 22e.

As shown in FIG. 36, as the tip end portion of the first bent portion 224 is bent in the direction getting far from the lower surface of the first arm 222, it is possible to insert the piping tube 22b, the rubber bush 250 being attached to the piping tube 22b, inside the first curved portion 223, while carrying out opening of the first bent portion 224 by pressing it by the side surface of the piping tube 22b. Distance H between the first arm 222 and the first bent portion 224 is set to be smaller than the outer diameter of the rubber bush 250 attached to the piping tube 22b. Further, the inner diameter of the first curved portion 223 in a free state is set to be smaller than the outer diameter of the rubber bush 250 attached to the piping tube 22b. Accordingly, the piping tube 22b to which the rubber bush 250 is attached can be firmly held without detaching from the first curved portion 223 in a state that the piping tube 22b is inserted inside the first curved portion 223. This is the same also in holding the piping tube 22e.

The piping tube 22b, 22e are connected to the motor cylinder device 16 in the following manner.

First, in assembling the motor cylinder device 16, bolts 201, 202 are made penetrate through the penetration holes 221a, 229a of the clamp member 220, and are screwed into the motor attaching screw holes 174 and the cylinder mechanism attaching screw holes 176 (see FIG. 4) as the attaching portion. Thus, the clamp member 220 is attached to the motor cylinder device 16 in advance. Then, while making the first curved portion 223 and the second curved portion 227 of the clamp member 220 respectively hold the portions of the rubber bushes 250, 250 attached in advance to the piping tubes 22b, 22e, the tip end portions of the piping tubes 22b, 22e are connected to the output ports 24a, 24b of the cylinder mechanism 76.

As described above, in the present embodiment, in the present embodiment, one portions of the respective piping tubes 22b and 22e, the portions being located at respective positions distant from the connection parts 23a, 23b of the piping tubes 22b and 22e with the cylinder mechanism 76, are supported by the intermediate portion of the motor cylinder device 16.

Thus, in the present embodiment, in case that the motor cylinder device 16 is displaced upon reception of a force such as vibration, a load is divided and applied to the connection part of the piping tube 22b, 22e with the cylinder mechanism 76 and to the supported part of the piping tube 22b, 22e supported by the intermediate portion of the motor cylinder device 16. Further, as the intermediate portion of the motor cylinder device 16 is ordinarily close to the mount portion 181 (see FIG. 6) for attaching the motor cylinder device 16 to the vehicle body side, displacement upon reception of a force such as vibration is small. Thus, a stress caused in the piping tube 22b, 22e by the displacement of the motor cylinder device 16 is reduced.

Further, in the present embodiment, the cylinder mechanism 76 includes plural output ports 24a and 24b respectively communicating with the first hydraulic pressure chamber 98a and the second hydraulic pressure chamber 98b, which are formed inside the cylinder mechanism 76 side by side along the central axis direction CL, and the plural piping tubes 22b and 22e are provided, corresponding to these plural output ports 24a and 24b. In such a manner, even in a case that plural piping tubes 22b and 22e are connected to the cylinder mechanism 76 of a so-called tandem type, stresses caused in the respective piping tubes 22b and 22e can be reduced.

Further, in the present embodiment, the cylinder mechanism 76 and the driving force transmission section 73 are arranged separable from each other (see FIG. 4). In such a manner, as the cylinder mechanism 76, which defines the position of the connection parts of the piping tubes 22b and 22e, and the driving force transmission section 73 are separately structured, these two can be produced independently from each other. For example, in a case of mounting on vehicles of plural types wherein it is necessary to change the positions of the connection parts of the piping tubes 22b and 22e, it is possible to make an arrangement by changing only the cylinder mechanism 76 while commonly using the driving force transmission section 73 as it is.

Figure 37:
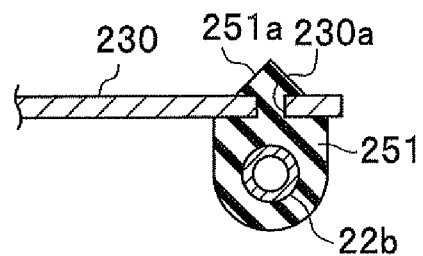
FIG. 37 is a cross sectional view showing the support structure of a piping tube in a modified example of the fifth embodiment.

FIG. 37 is a cross sectional view showing the support structure of a piping tube in a modified example of the fifth embodiment. Assuming that structures and operations which are similar to those in the fifth embodiment shown in FIGS. 8 to 36 are taken in into this first modified example, detailed description will be omitted and differences will be described (in other modified examples described later also). In this modified example, only a clamp member and a rubber bush attached to it are different from those in the fifth embodiment, and other elements are the same. FIG. 37 is corresponding to FIG. 36, wherein the first arm 222 shown in FIG. 36 is changed to a first arm 230. In the following, although supporting of a piping tube 22b will be described, supporting of s piping tube 22e is similar.

The first curved portion is not provided on the tip end side along the extending direction of the first arm 230, but a penetration hole 230a for holding the piping tube 22b having a rubber bush 251 attached to it is formed. The rubber bush 251 is substantially is a cylindrical shape, and is provided, at one end portion (the upper end portion) thereof, with an engagement portion 251a having an outer diameter slightly larger than that of the penetration hole 230a. With such a structure, by pushing the engagement portion 251a of the rubber bush 251, which has been attached in advance to the piping tube 22b, into the penetration hole 230a of the first arm 230, the piping tube 22b having the rubber bush 251 attached thereto can be made easily held by the clamp member. Incidentally, the number of penetration holes 230a and the number of engagement portions 251a to be provided are arbitrary, and can be either single or plural.

Figure 38:
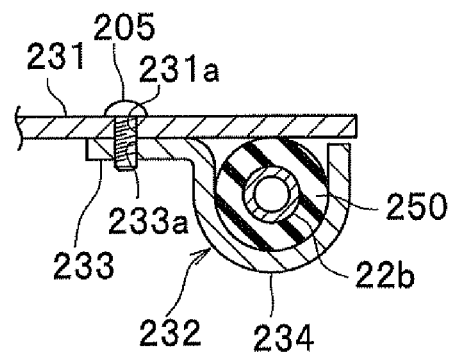
FIG. 38 is a cross-sectional view showing the support structure of a piping tube in a still another modified example.

FIG. 38 is a cross-sectional view showing the support structure of a piping tube in a still another modified example.

In this modified example, only a clamp member is different from those in the fifth embodiment shown in FIGS. 8 to 36, and other elements are the same. FIG. 38 is corresponding to FIG. 36, wherein the first arm 222 shown in FIG. 36 is changed to a first arm 231. In the following, although supporting of a piping tube 22b will be described, supporting of s piping tube 22e is similar.

The first curved portion is not provided on the tip end side along the extending direction of the first arm 231, but a penetration hole 231a is provided, wherein a male screw member 205 for screw fastening of a press member 232 is inserted through the penetration hole 231a. The press member 232 includes a fixing plate portion 233 provided with a screw hole 233a with which the male screw member 205 is screw-engaged, and a curved portion 234 capable of holding in it the piping tube 22b that is continuously formed from the tip end side along the extending direction of the fixing plate 233 and has a rubber bush 250 attached thereto. With such a structure, by inserting the male screw member 205 through the penetration hole 231a of the first arm 231 in a state that the piping tube 22b with the rubber bush 250 attached to it is housed in the curved portion 234 and screwing the male screw member 205 into the screw hole 233a, it is possible to sandwich the piping tube 22b having the rubber bush 250 attached to it between the first arm 231 and the curved portion 234 so that the piping tube 22b can be made held easily and surely. Incidentally, the number of screw fastening parts by screw members 205 is arbitrary, and can be either single or plural.

Figure 39:
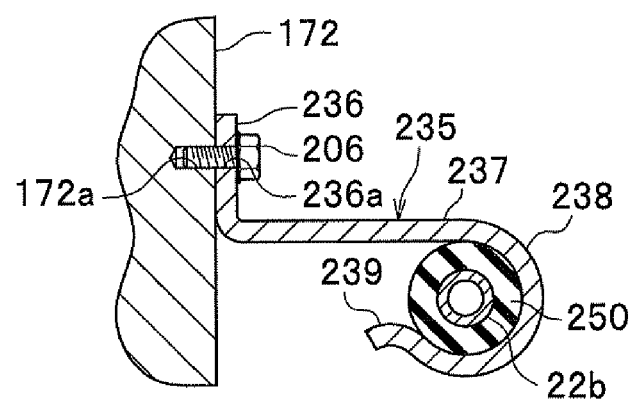
FIG. 39 is a cross-sectional view showing the support structure of a piping tube in still another modified example.

FIG. 39 is a cross-sectional view showing the support structure of a piping tube in still another modified example.

In this modified example, only the clamp member is different from that in the fifth embodiment shown in FIGS. 8 to 36, and other elements are the same. The clamp member 220 shown in FIG. 35 is changed into two clamp members 235. Supporting of a piping tube 22b will be described below, and supporting of a piping tube 22e is similar.

The each clamp member 235 includes an attaching plate 236 provided with a penetration hole 236a through which a bolt 206 is inserted, an arm 237 that is formed continuously from the lower end of the attaching plate 236, bent from the lower end laterally with respect to the vertical direction, and extended, a curved portion 238 that is continuously formed from the tip end side with respect to the extending direction of the arm 237 and is capable of holding therein the piping tube 22b having a rubber bush 250 attached to it, and a bent portion 239 that is continuously formed from the tip end side of the curved portion 238 with respect to the extending direction and is slightly bent outward from the outer circumferential surface of the curved portion 238. With such a structure, by having the portion of the rubber bush 250, which has been attached in advance to the piping tube 22b, held by the curved portion 238 of the clamp member 235 and connecting the tip end portion of the piping tube 22b to the output port 24a of the cylinder mechanism 76, it is thereafter possible to attach the clamp member 235 to the intermediate portion of the motor cylinder device 16, for example a housing 172. Thus, the workability is improved. Incidentally, the number of fastening parts by bolts 206 is arbitrary, and can be either single or plural.

The present invention has been described above based on the fifth embodiment, however, the invention is not limited to the structures described in the foregoing embodiment, and the structures can be modified and changed, as appropriate, in a scope without departing from the spirit of the invention, including appropriately combining or selecting structures described in the foregoing embodiment.

For example, in the foregoing embodiment, one port communicating with a first hydraulic pressure chamber 98a and one port communicating with a second hydraulic pressure chamber 98b are provided, one piping tube is connected to the each corresponding port, and totally two piping tubes are connected to the cylinder mechanism 76, however, the invention is not limited thereto. Arrangement may be made such that the cylinder mechanism 76 is provided with plural ports each of which communicating with either the first hydraulic pressure chamber 98a or the second hydraulic pressure chamber 98b, and plural piping tubes are provided at least corresponding to the plural ports. For example, ports communicating with the first hydraulic pressure chamber 98a and the second hydraulic pressure chamber 98b are be provided in two for each hydraulic pressure chamber, and totally four piping tubes are be connected to a cylinder mechanism. Further, arrangement may be made such that ports communicating with the first hydraulic pressure chamber 98a and the second hydraulic pressure chamber 98b are provided in one for each hydraulic pressure chamber, two piping tubes are connected through a connector to each port, and totally four piping tubes are connected to the cylinder mechanism. The present invention can be applied to a support structure of such plural piping tubes.

Further, in the foregoing embodiment, the mount portion 181 is formed by the respective left, right, and lower mount holes 182 to 184, however, the invention is not limited thereto. It is possible to change the shape, the number, the support direction, the fixing method using a screw, pin, or the like, as appropriate.

Still further, in the foregoing embodiment, the cylinder mechanism 76 and the driving force transmission section 73 are arranged separable from each other, however, the invention is not limited thereto. For example, the cylinder main body 82 and the first body 172 may be formed by integral molding.

Sixth Embodiment

A sixth embodiment according to the present invention will be described below. The same symbols will be assigned to elements common with those in the first and third embodiments, and structures and description in the first and third embodiments will be quoted.

Figure 40:
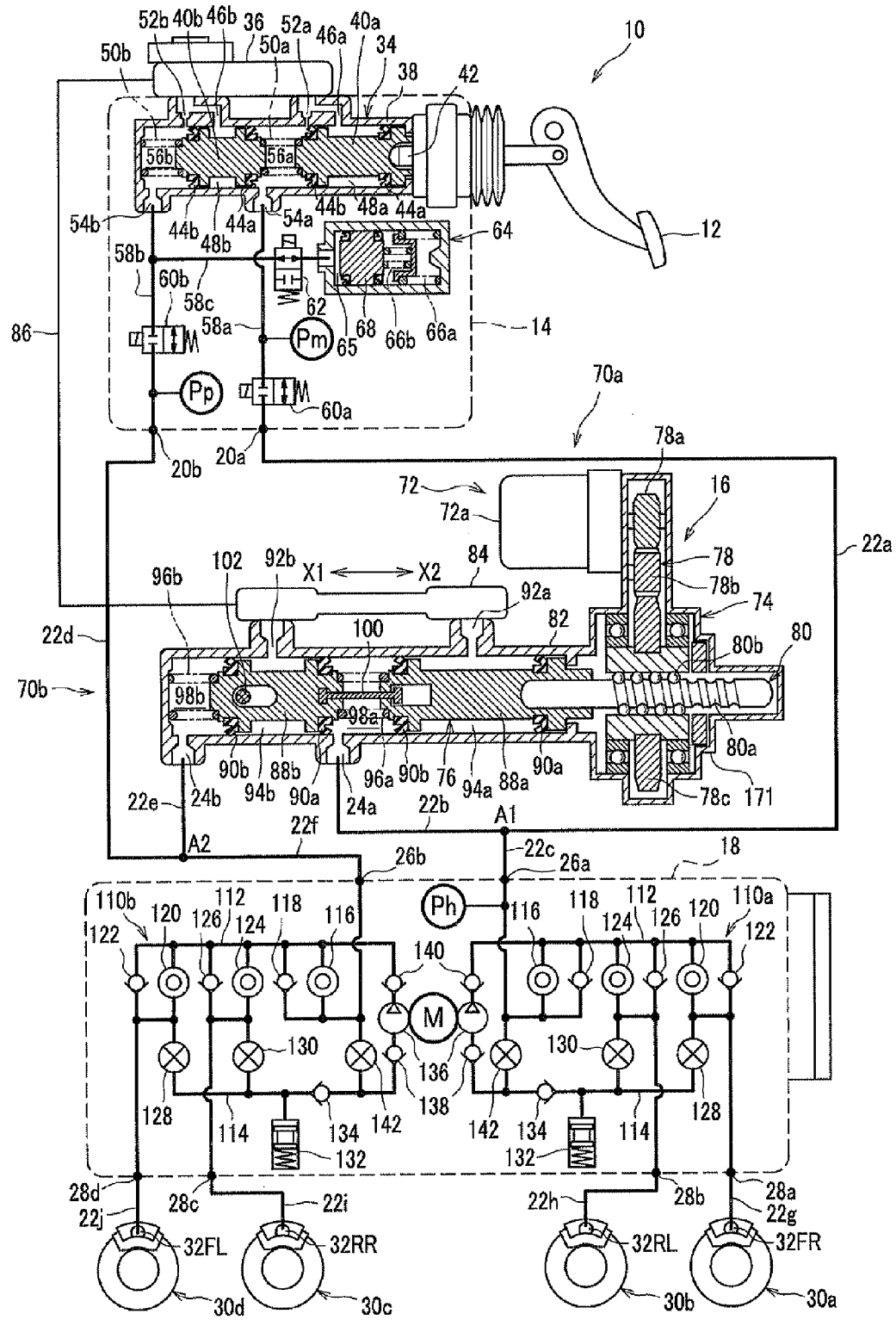
FIG. 40 shows the schematic configuration of a vehicle brake system in which a motor cylinder device in a sixth embodiment according to the present invention is built.

FIG. 40 shows the schematic configuration of a vehicle brake system in which a motor cylinder device in a sixth embodiment according to the present invention is built. As a vehicle brake system 10 shown in FIG. 40 is generally similar to those in the first and third embodiments, description thereof will be omitted, as appropriate, and different points will be mainly described below.

As shown in FIG. 40, an actuator mechanism 74 is provided on the output shaft side of an electric motor 72, and includes a gear mechanism (deceleration mechanism) 78 for transmitting the rotational driving force of the electric motor 72 by engagements between plural gears, and a ball screw assembly 80 including a ball screw shaft 80a that moves forward and backward along the axial direction by transmission thereto of the rotational driving force through the gear mechanism 78 and balls 80b.

In the present embodiment, the ball screw assembly 80 is housed in an actuator housing 171 together with the gear mechanism 78.

A cylinder mechanism 76 includes a cylinder main body 82 substantially in a cylindrical shape, and a second reservoir 84 arranged on the cylinder main body 82. The second reservoir 84 is connected by a piping tube 86 with a first reservoir 36 mounted on a master cylinder 34 of an input device 14, and is provided such that brake fluid reserved in the first reservoir 36 is supplied into the second reservoir 84 through the piping tube 86. Incidentally, the piping tube 86 may be provided with a tank for reserving brake fluid.

Further, the electric motor 72 in the present embodiment is covered by a motor casing 72a formed separately from the cylinder main body 82, and the output shaft, not shown, is disposed such as to be substantially parallel to the sliding direction (axial direction) of a first slave piston 88a and a second slave piston 88b. In other words, the electric motor 72 is disposed such that the axial direction of the output shaft is substantially parallel to the axial direction of hydraulic pressure control pistons.

The rotational driving of the output shaft, not shown, is transmitted to the ball screw assembly 80 through the gear mechanism 78.

The gear mechanism 78 is configured, for example, by a gear mechanism (pinion gear) 78a attached to the output shaft of the electric motor 72, a third gear (ring gear) 78c for rotating balls 80b around the axial direction of a ball screw shaft 80a, the balls 80b moving the ball screw shaft 80a forward and backward along the axial direction, and a second gear (idle gear) 78b for transmitting the rotation of the first gear 78a to the third gear 78c, wherein the third gear 78c rotates around the axial line of the ball screw shaft 80a. Accordingly, the rotation shaft of the third gear 78c is the ball screw shaft 80a, and is substantially parallel to the sliding direction (axial direction) of the hydraulic pressure control piston (the first slave piston 88a and the second slave piston 88b).

As described above, as the output shaft of the electric motor 72 and the axial direction of the hydraulic pressure control pistons are substantially parallel, the output shaft of the electric motor 72 and the rotation shaft of the third gear 78c are substantially parallel.

Then, by arranging the rotation shaft of the second gear 78b to be substantially parallel to the output shaft of the electric motor 72, the output shaft of the electric motor 72, the rotation shaft of the second gear 78b, and the rotation shaft of the third gear 78c are disposed substantially parallel.

Control means, not shown, computes the amount of pedaling operation of a brake pedal 12, according to a detection value by a pressure sensor Pm, and controls the motor cylinder device 16 to generate a hydraulic brake pressure, according to the amount of pedaling operation.

Then, the hydraulic brake pressure generated by the motor cylinder device 16 is supplied through inlet ports 26a and 26b to the VSA device 18. That is, the motor cylinder device 16 is a device that drives the first slave piston 88a and the second slave piston 88b by the rotational driving force of the electric motor 72, which rotationally drives by an electric signal upon operation of the brake pedal 12, generates a hydraulic brake pressure, according to the amount of operation of the brake pedal 12, and supplies the hydraulic brake pressure to the VSA device 18.

An electrical signal in the present embodiment is a control signal for controlling a power for driving the electric motor 72 or controlling the electric motor 72.

Incidentally, means by which the control means computes a pedaling amount of the brake pedal 12 from a detection value by the pressure sensor Pm is not limited, and for example, can be arranged such as to compute the amount of a pedaling operation of the brake pedal 12, corresponding to a detection value by the pressure sensor Pm, referring to a map representing the relationship between a detection value by the pressure sensor Pm and an amount of pedaling operation of the brake pedal 12. Such a map is preferably set in advance through experimental measurement or the like during designing.

Further, operation amount detecting means for detecting the amount of pedaling operation of the brake pedal 12 is not limited to the pressure sensor Pm, and may be, for example, a sensor (stroke sensor) for detecting the stroke amount of the brake pedal 12.

For example, for a hybrid vehicle or an electric vehicle having a running electric motor (running motor), a regenerative brake can be provided, wherein the regenerative brake generates a braking force by regenerative power generation by the running electric motor. Herein, in case of arrangement such that, in addition to braking forces generated by disk brake mechanisms 30a to 30d upon operation of the brake pedal 12, a braking force is generated by the regenerative brake, if wheel cylinders 32FR, 32R1, 32RR, and 32FL are operated by hydraulic brake pressures generated by a first pressure chamber 56a and a second pressure chamber 56b of a master cylinder 34, the braking force generated by the regenerative brake becomes an excessive braking force, and a braking force stronger than a braking force an operator wants to generate is generated.

In order to avoid such a state, control means, not shown, preferably controls a motor cylinder device 16 to generate a brake pressure such that an appropriate braking force is generated as a total of braking forces generated by the disk brake mechanisms 30a to 30d and a braking force generated by the regenerative brake. An appropriate braking force can be generated by providing a vehicle brake system 10 controlled by such control means on a hybrid vehicle or an electric vehicle.

Figure 41:
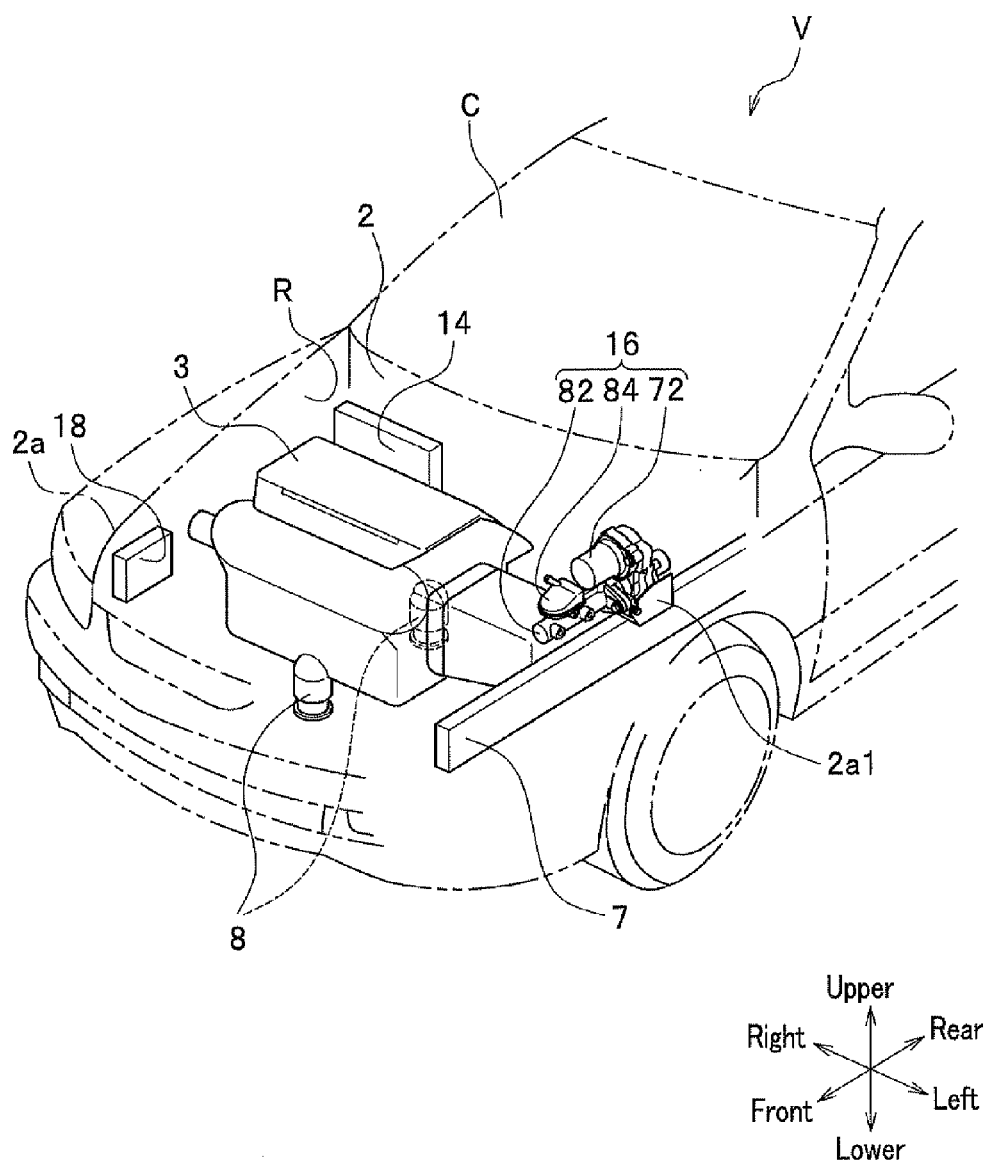
FIG. 41 is a perspective view showing a state that the motor cylinder device is attached to a front side member in a power plant housing room.
Figure 42:
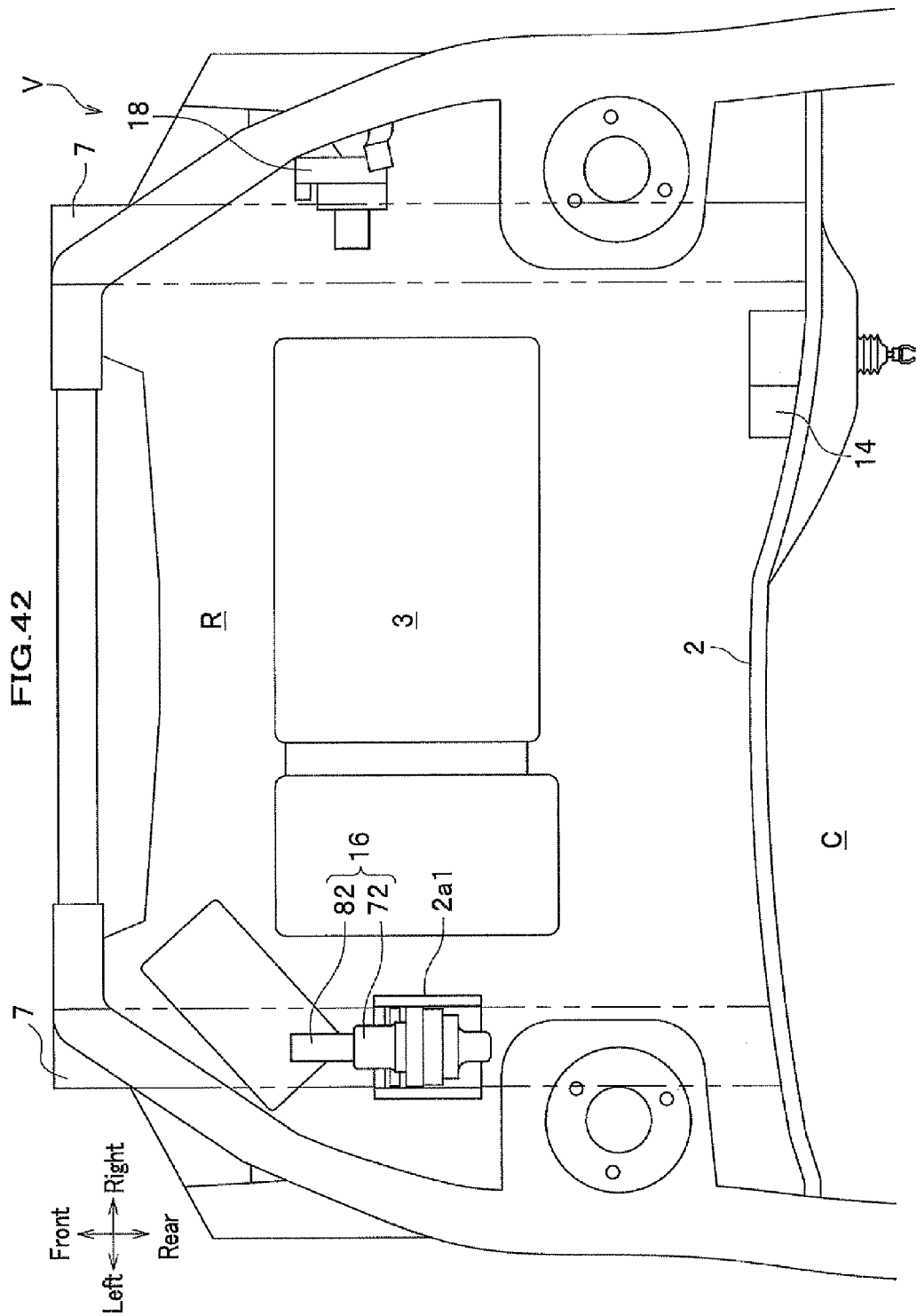
FIG. 42 is a plan view of the power plant housing room in which the motor cylinder device is attached to the front side member.

In case that the vehicle brake system 10 is mounted on a vehicle, for example, as shown in FIGS. 41 and 1, the input device 14, the motor cylinder device 16, and the VSA device 18 are formed in separate bodies, disposed in a state of being appropriately dispersed in a housing room (structure mount room) (power plant housing room R) in which the power plant (structure) 3 of a vehicle V is housed, and respectively attached. The power plant 3 is a vehicle power device that generates a power to run a vehicle V, and is an internal combustion engine, a running electric motor on en electric vehicle, an integrated unit of an internal combustion engine and a running electric motor on a hybrid vehicle, or the like.

The power plant housing room R is formed for example at the front of the vehicle V, being partitioned by a dashboard 2 from a living space (cabin C) for passengers such as an operator and the like, and houses therein the power plant 3, a vehicle brake system 10 (the input device 14, the motor cylinder device 16, the VSA device 18), and other auxiliary devices, not shown. Further, the housing room cover 2a is provided openable and closable above the power plant housing room R.

Side members (front side members 7) extend on the left and right sides of the power plant housing room R, extending along the front/rear direction on the left and right sides of the vehicle V.

Incidentally, the respective directions, namely all of front/rear/upper/lower/left/right directions respectively refer to the front/rear/upper/lower/left/right if the vehicle V. For example, the upper/lower direction (vehicle upper/lower direction) refers to the vertical direction of the vehicle V on a horizontal plane, and the left/right direction refers to the left/right direction in a view of the vehicle V from the rear toward the front.

The power plant 3 is disposed between the left and right side members 7 inside the power plant housing room R, and supported by an anti-vibration support device 8 fixed to a sub frame, not shown, wherein spaces are formed on the left side and the right side between the left and right front side members 7 and the power plant 3 on the left and right sides.

As shown in FIGS. 41 and 3, the input device 14, the motor cylinder device 16, and the VSA device 18 are formed in separate bodies, and housed in the power plant housing room R. For example, the motor cylinder device 16 is attached to a front side member 7 through a bracket 2a1.

Figure 43:
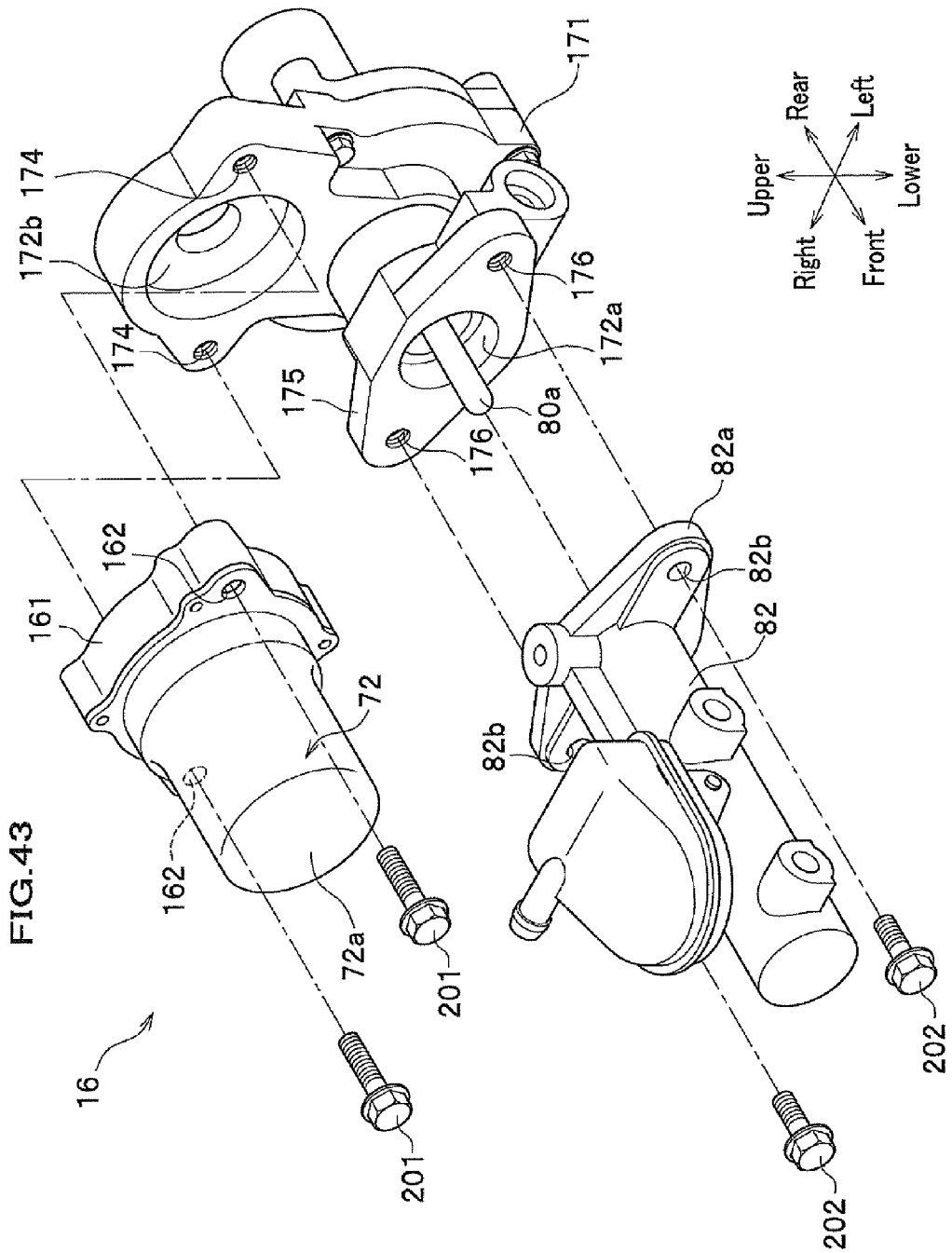
FIG. 43 is an exploded perspective view of the motor cylinder device.

As shown in FIG. 43, the actuator housing 171 housing the gear mechanism 78 (see FIG. 40) and the ball screw assembly 80 (see FIG. 40), and the cylinder main body 82, are arranged dividable from each other, with a plane perpendicular to the axial line of the cylinder main body 82 as the dividing plane. The motor cylinder device 16 is configured by connecting the cylinder main body 82 to the actuator housing 171 and further attaching the electric motor 72.

The cylinder main body 82 is connected anterior to the actuator housing 171. Concretely, the actuator housing 171 is provided with an opening portion 172a opening forward from which the ball screw shaft 80a protrudes forward. The cylinder main body 82 is connected with the front of the actuator housing 171 such that a hollowed portion (not shown), in which the first slave piston 88a (see FIG. 40) and the second slave piston 88b (see FIG. 40) slide, communicate with the opening portion 172a.

For example, the actuator housing 171 is provided with a flange portion 175 expanding in the left/right direction from the periphery of the opening portion 172a, and the flange portion 175 is provided with, for example, two screw holes 176.

On the other hand, the end portion, on the actuator housing 171 side, of the cylinder main body 82 is also provided with a flange portion 82a expanding in the left/right direction, wherein the flange portion 82a is provided with cylinder attaching holes (penetration holes) 82b opening at positions corresponding to the screw holes 176 of the actuator housing 171.

The flange portion 82a of the cylinder main body 82 and the flange portion 175 of the actuator housing 171 are disposed facing each other, and fastening members 202 such as bolts are screwed into the screw holes 176 through the penetration holes 82b from the cylinder main body 82 side so that the cylinder main body 82 is fastened and fixed to the actuator housing 171.

In such a manner, the cylinder main body 82 is connected to the front of the actuator housing 171, and the ball screw shaft 80a protruding from the opening portion 172a contacts with the first slave piston 88a (see FIG. 40) inside the cylinder main body 82.

Further, above the cylinder main body 82, the electric motor 72 is attached to the actuator housing 171 such that the axial direction of the output shaft, not shown, is parallel to the axial direction of the first slave piston 88a (see FIG. 40) and the second slave piston 88b (see FIG. 40), in other words, parallel to the axial direction of the cylinder main body 82.

For example, the second gear 78b (see FIG. 40) is disposed higher than the third gear 78c (see FIG. 40), and the actuator housing 171 is extending upward so as to house the third gear 78c and the second gear 78b. Further, the actuator housing 171 includes a first gear room 172b for housing the first gear 78a such that the first gear 78a can engage with the second gear 78b, wherein the first gear room 172b is disposed higher than the second gear 78b and in a state of being open at the front thereof.

The electric motor 72 is attached to front of the actuator housing 171 such that the first gear 78a (see FIG. 40) attached to the output shaft, not shown, is housed in the first gear room 172b and engages with the second gear 78b.

The structure in which the electric motor 72 is housed in the actuator housing 171 is not limited.

For example, the motor casing 72a is provided with a flange portion (base portion) 161 by expansion of the end portion thereof on the actuator housing 171 side, and this flange portion 161 is provided with motor attaching holes 162 through which fastening members 201 such as bolts penetrate.

The actuator housing 171 is provided with screw holes 174 at positions corresponding to the motor attaching holes (penetration holes) 162.

The electric motor 72 is attached to the front (the same side as the cylinder main body 82 is connected) of the actuator housing 171 in the following manner. That is, the output shaft, to which the first gear 78a (see FIG. 40) is attached, is substantially parallel to the axial direction of the cylinder main body 82, and the first gear 78a is housed in the first gear room 172b to engage with the second gear 78b (see FIG. 40). Further, the fastening members 201 are screwed into the screw holes 174 through the motor attaching holes 162 from the electric motor 72 side, and thus the motor casing 72a is fastened and fixed to the actuator housing 171.

With such an arrangement, the cylinder main body 82 and the electric motor 72 are disposed on the same side of the actuator housing 171.

In such a manner, the motor cylinder device 16 in the present embodiment is arranged such that the cylinder main body 82 is connected to the actuator housing 171, and the electric motor 72 is attached, being disposed higher than the cylinder main body 82.

Figure 44:
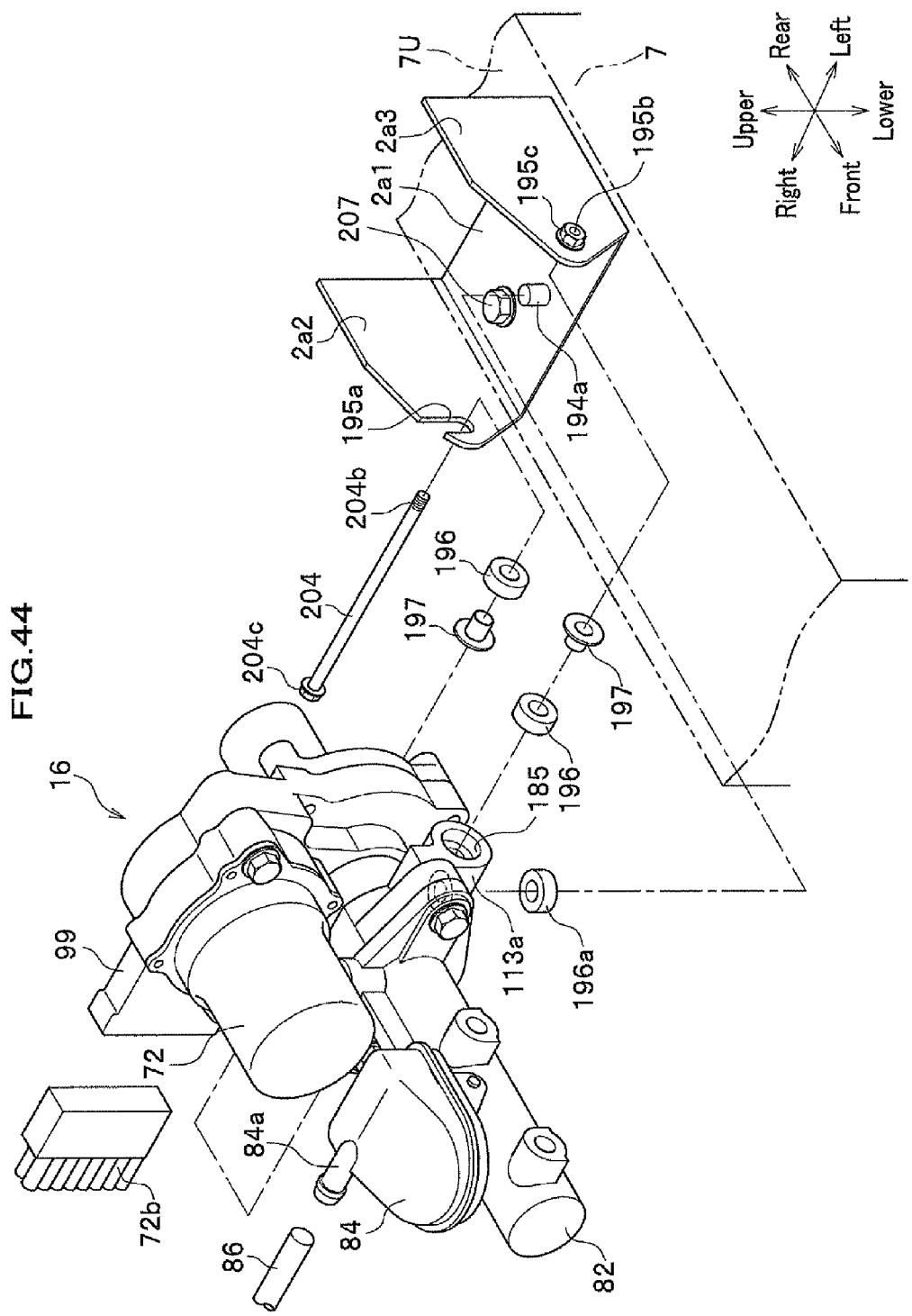
FIG. 44 shows an example of a structure in which the motor cylinder device is attached to a bracket.

The motor cylinder device 16 arranged in such a manner is attached, for example, to the front side member 7 through the bracket 2a1, as shown in FIG. 44.

The bracket 2a1 for attaching the motor cylinder device 16 can be arranged in such a manner that the bracket 2a1 is fixed to the upper portion of the front side member 7 by fastening with a fastening member 207, welding, or the like, and the motor cylinder device 16 is attached to this bracket 2a1.

Incidentally, in the present embodiment, the upper portion of the front side member 7 refers to a portion facing upward with respect to the vehicle V (see FIG. 41), and refers to the top surface 7U forming the upper portion in case of the front side member 7 with a cross-sectional shape of a rectangle.

Accordingly, the bracket 2a1 in the present embodiment is assumed to be attached to the top surface 7U of the front side member 7.

For example, an arrangement is made such that a fixing boss 113a protruding in the left/right direction is formed on the motor cylinder device 16, and a penetration hole 185 that penetrates along the left/right direction through the fixing boss 113a is formed.

Further, the bracket 2a1 is substantially in a C-shape that is open upward in a front view, and is arranged such as to sandwich the fixing boss 113a from the left and right directions by wall portions 2a2 and 2a3. Further, a notched portion 195a and a fixing hole 195b are formed at positions corresponding to the penetration hole 185 of the first boss portion 113a.

For example, in case that a nipple 84a, which is formed on the second reservoir 84 as the introduction port for brake fluid, is extended toward the right side, and a piping tube 86 is connected to the nipple 84a from the right side to the nipple 84a, the notched portion 195a opening upward is formed at the wall portion 2a2 on the right side of the bracket 2a1, and the fixing hole 195b is formed through the wall portion 2a3 on the left side. Further, a nut member 195c is fixedly attached to the wall portion 2a3 on the left side and the bolt member 204 penetrating through the fixing hole 195b is screwed into the nut member 195c such that the fixing hole 195b and a screw hole communicate with each other.

In a state that the wall portions 2a2 and 2a3 sandwich the fixing boss 113a from the left and the right, the bolt member 204 penetrates through the notched portion 195a, the penetration hole 185, and the fixing hole 195b from the right side. Further, arrangement can be made, for example, such that the screw portion 204b formed at the tip end portion of the bolt member 204 is screwed into the nut member 195c, and the head portion 204c of the bolt member 204 is stopped by the notched portion 195a so that the motor cylinder device 16 is fixed to the bracket 2a1.

Briefly, the bolt member 204 is fastened from the right side for the arrangement.

Such a bolt member 204 is a fastening member for fixing the motor cylinder device 16 to the bracket 2a1 that is fixed to the front side member 7 of the vehicle V (see FIG. 41), and accordingly a fastening member for fixing the motor cylinder device 16 to the vehicle V.

Further, in a preferable structure, a connector 99, to which an electric cable 72b for supplying an electrical signal to the electric motor 72 is connected, is attached facing the right side, and the electric cable 72b is connected to the connector 99 from the right side.

The number of fixing bosses 113a is not limited, and more than one first boss portion 113a may be arranged.

Incidentally, reference symbol 197 represents a spacer member disposed between the bracket 2a1 and the fixing boss 113a, and reference symbol 196 represents a buffer member, which are preferably arranged, as necessary.

Reference symbol 194a represents a protrusion portion for defining the position of the motor cylinder device 16, and is arranged such as to engage with an engagement hole (not shown) formed on the motor cylinder device 16 through the buffer member 196b.

The motor cylinder device 16 attached to the front side member 7 in such a manner is, for example, as shown in FIGS. 41 and 3, attached such that the longitudinal direction of the cylinder main body 82 faces forward, and the cylinder main body 82 is disposed such as to be along the extending direction of the front side member 7.

Further, as described above, the output shaft, not shown, of the electric motor 72 is substantially parallel to the axial direction of the first slave piston 88a (see FIG. 40) and the second slave piston 88b (see FIG. 40), and is substantially parallel to the longitudinal direction of the cylinder main body 82. By this, the motor cylinder device 16 is attached such that the output shaft, not shown, of the electric motor 72 is along the extending direction of the front side member 7.

Figure 45:
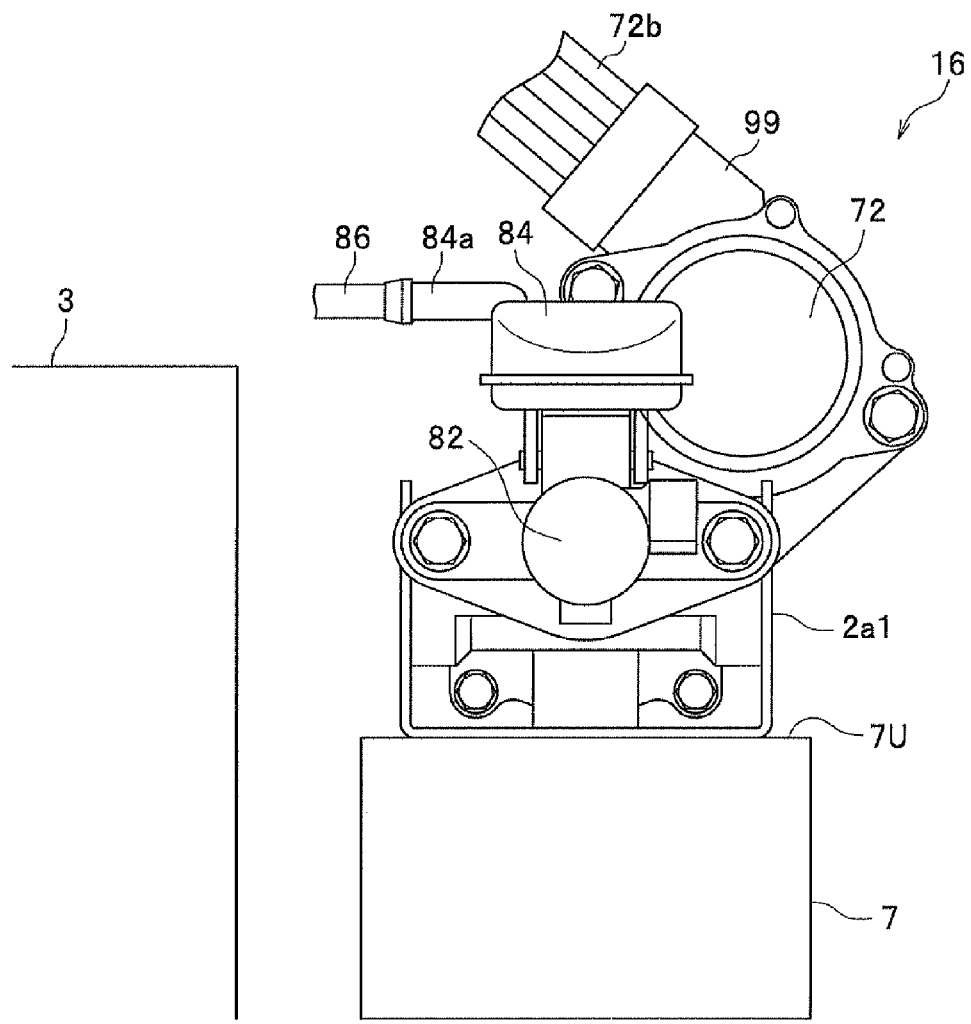
FIG. 45 is a front view from of the motor cylinder device attached to the top surface of a front side member.

Incidentally, in FIG. 44, although a state that the electric motor 72 is disposed on the upper side of the cylinder main body 82 is shown, the position of disposing the electric motor 72 is not limited, and for example, as shown in FIG. 45, the electric motor 72 may be disposed at a position rotated in a direction getting away from the power plant 3, with the axial line of the cylinder main body 82 as the center. Or, the electric motor 72 may be disposed on the loser side of the cylinder main body 82.

Also in this case, a structure where the electric cable 72b is connected to the connector 99 from the right side and the piping tube 86 is connected to the nipple 84a from the right side is preferable.

In such a manner, in case of such a structure where the piping tube 86 is connected to the nipple 84a from the right side and further the electric cable 72b is connected to the connector 99 from the right side, a structure where the bolt member 204 for fixing the motor cylinder device 16 is fastened from the right side, in other words, a structure where the fastening direction of the bolt member 204 is from the right side is preferable.

In other words, preferable is a structure where the direction along which the piping tube 86 is connected to the second reservoir 84 and the direction along which the electric cable 72*b* is connected to the connector 99 for the motor cylinder device 16 are the same direction, and further, the bolt member 204 for fastening the motor cylinder device 16 is fastened to the bracket 2*a*1 from the same direction.

With this structure, for example, a worker who attaches the motor cylinder device 16 to the vehicle V (see FIG. 41) can carry out fastening of the bolt member 204 for fastening the motor cylinder device 16 to the bracket 2*a*1, connecting the piping tube 86 to the second reservoir 84, and connecting the electric cable 72*b* to the connector 99, all from one side, namely the right side. This enables improvement in the work efficiency and reduction in the load on the worker.

Further, a work space can be ensured by just widening the side (right side) for fastening the bolt member 204 to the bracket 2*a*1, and it is unnecessary to ensure a work space in the periphery but the right side of the motor cylinder device 16. This enables disposition of the power plant 3 (see FIG. 41) and auxiliary devices, not shown, in the periphery but the right side of the motor cylinder device 16, enabling effective use of the space of the power plant housing room R.

Still further, the front side member 7 (see FIG. 41) is a firm frame member, having a strength to surely and stably support the heavy motor cylinder device 16. Accordingly, by attaching the motor cylinder device 16 to the top surface U (see FIG. 45) of the front side member 7, the motor cylinder device 16 can be surely fixed to a firm part.

Further, in case that the motor cylinder device 16 is attached to the top surface (see FIG. 45) of the front side member 7, even in the event that a foreign object or matter such as a pebble or gravel that is bounced up into the power plant housing room R from below mainly from a road surface by running of the vehicle V (see FIG. 4), or water splashes into the power plant housing room R from below when the vehicle 1 runs on a puddle, it is prevented by the front side member 7 that the foreign object or matter such as a pebble, gravel, water splash or the like reaches the electric motor 72, and the electric motor 72 can be thereby protected.

Incidentally, an under-guard in a plate shape, not shown, may be attached under the motor cylinder device 16 so that a foreign object or matter such as a pebble, gravel, water splash or the like, which is bounced up by running of the vehicle V into the power plant housing room R, does not hit the cylinder main body 82. Such an under-guard can be attached, for example, to the front side member 7 (see FIG. 41), a cross member, not shown, or the like.

Figure 46A:
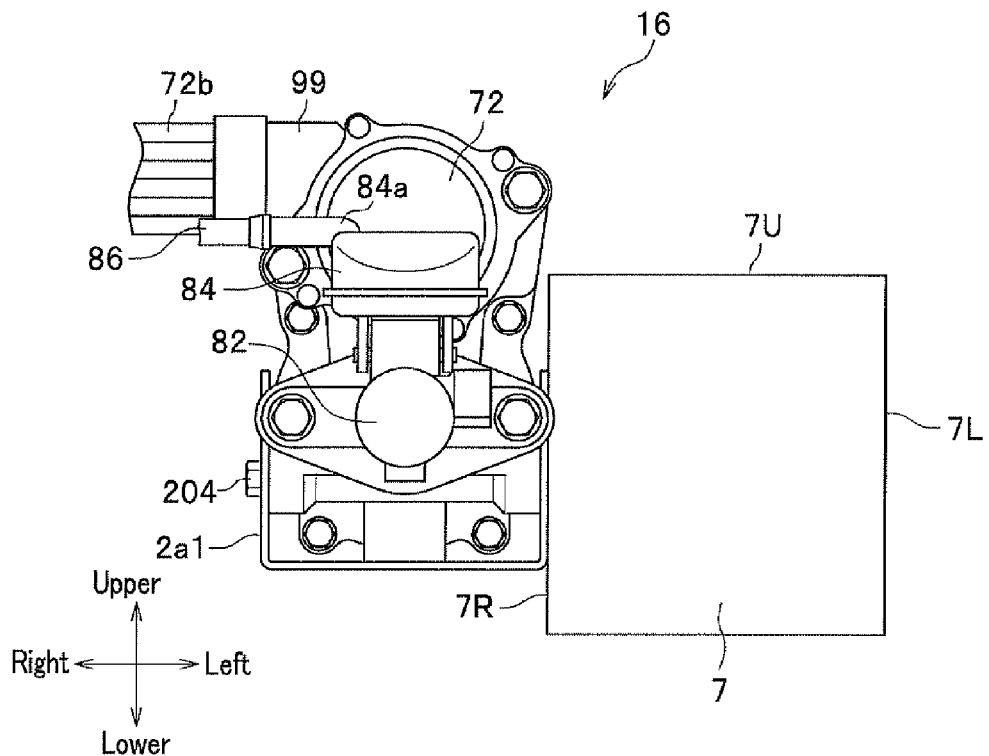
FIG. 46 diagram (a) is a front view of the motor cylinder device attached from above to the right side surface of a front side member, and diagram (b) is a front view of the motor cylinder device attached from the right to the right side surface of the front side member.
Figure 46B:
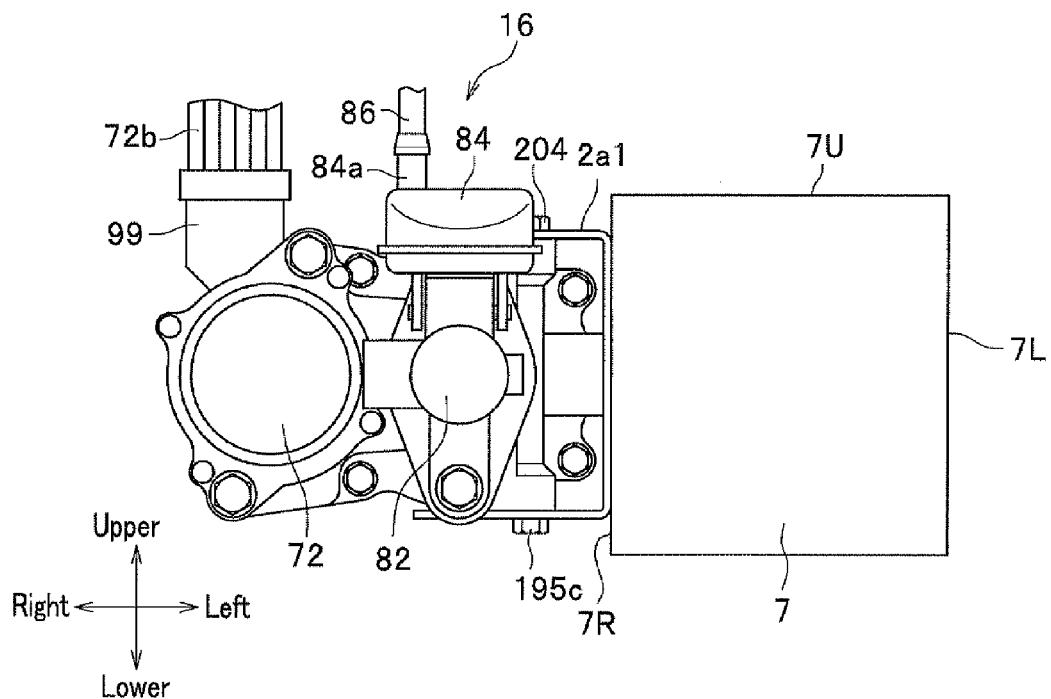

Further, in FIG. 44, shown is a state that the bracket 2*a*1 is attached to the top surface U of the front side member 7. For example, in case a space can be ensured along the left/right direction between the power plant 3 (see FIG. 41) and the front side member 7, an arrangement may be made such that for example, as shown in FIG. 46(*a*), the bracket 2*a*1 substantially in a C-shape opening upward in front view is attached to the side portion (right side surface 7R), on the right side, of the front side member 7, and the motor cylinder device 16 is attached from above.

Also in this case, an arrangement is preferably made such that the side from which the piping tube 86 is connected to the nipple 84*a* of the second reservoir 84 and the side from which the electric cable 72*b* is connected to the connector 99 are all the same, namely from the right side, and further, the bolt member 204 fixing the motor cylinder device 16 is fastened to the bracket 2*a*1 from the same side (right side).

Incidentally, in the present embodiment, the side portions of the front side member 7 refer to the portions (surfaces) respectively facing the left and right directions with respect to the vehicle V (see FIG. 41), and the side portions refer to the right side surface 7R and the left side surface 7L forming the right and left sides in a case of a front side member 7 with a rectangular cross-sectional shape.

With such a structure, for example, a worker who attaches the motor cylinder device 16 to the vehicle V (see FIG. 41) can carry out fastening the bolt member 204 to the bracket 2*a*1, connecting the piping tube 86 to the nipple 84*a*, and connecting the electric cable 72*b* to the connector 99, all from one side, namely the right side of the vehicle V, enabling improvement in the work efficiency and reduction in the load on the worker.

Further, a work space can be ensured by just widening the right side of the vehicle V (see FIG. 41), which is the side of fastening the bolt member 204, and it is unnecessary to ensure a work space in the periphery but the right side of the motor cylinder device 16. This enables disposition of the power plant 3 (see FIG. 41) and auxiliary devices, not shown, in the periphery but the right side of the motor cylinder device 16, enabling effective use of the space of the power plant housing room R.

Herein, it is also possible to make an arrangement such as to attach the motor cylinder device 16 to the left side surface 7L of the front side member 7 from the left side of the vehicle V (see FIG. 41). Also in this case, similarly to the case of attaching the motor cylinder device 16 to the right side surface 7R of the front side member 7, the side from which the bolt member 204 is fastened, the side from which the piping tube 86 is connected to the nipple 84*a* of the second reservoir 84, and the side from which the electric cable 72*b* is connected to the connector 99 are all the same, namely from the left side.

Further, as shown in FIG. 46(*b*), for example, in case that the nipple 84*a* of the second reservoir 84 is extended upward, an arrangement may be made such as to attach a bracket 2*a*1 substantially in a C-shape opening on the right side (left side in a front view) of the vehicle V (see FIG. 41), attach the motor cylinder device 16 to the bracket 2*a*1 from the right side of the vehicle V, and fasten the bolt member 204 from above. In this case, an arrangement can be made such that, for example, the cylinder main body 82 is provided with a first boss portion 113*a* (See FIG. 44) such that the first boss portion 113*a* protrudes along the upper/lower direction of the vehicle, and fasten the bolt member 204 to the bracket 2*a*1 from above such that the bracket 2*a*1 sandwiches the first boss portion 113*a* from the upper and lower sides of the vehicle.

Further, an arrangement is preferably made such that the connecter 99 is attached, facing upward, and the electric cable 72*b* is connected to the connector 99 from above.

In this arrangement, the side from which the piping tube 86 is connected to the nipple 84*a* and the side from which the electric cable 72*b* is connected to the connector 99 are all on the upper side of the vehicle V, and further, the bolt member 204 is fastened to the bracket 2*a*1 from the same side (the upper side of the vehicle V).

As has been described above, the vehicle body 1 (see FIG. 40) in the present embodiment is disposed in the power plant housing room R (see FIG. 41), and the motor cylinder device 16 (see FIG. 41) is attached to the front side member 7 (see FIG. 41).

The front side member 7 is a firm frame member, and the motor cylinder device 16 can accordingly be attached to the firm part.

Further, the side from which the piping tube 86 (see FIG. 44) is connected to the nipple 84*a* (see FIG. 44) of the second reservoir 84, and the side from which the electric cable 72*b* (see FIG. 44) is connected to the connector 99 (see FIG. 44), are all the same side, and further, the bolt member 204 (see FIG. 44) for fixing the motor cylinder device 16 is fastened to the bracket 2a1 (see FIG. 44) from the same side. By this arrangement, the work efficiency in attaching the motor cylinder device 16 to the vehicle V (see FIG. 41) is improved and the load on the worker is reduced.

It is unnecessary to ensure a work space but on the side where the bolt member 204 is attached to the bracket 2a1, and accordingly the space of the power plant housing room R (see FIG. 41) can be effectively used.

Incidentally, in the present embodiment, the motor cylinder device 16 (see FIG. 41) is housed in the power plant housing room R and thus attached to the front side member 7. On the other hand, in case of disposing the motor cylinder device 16 to a part other than the power plant housing room R, by an arrangement such as to attach the motor cylinder device 16 to a side member (not shown) other than the front side member 7, the motor cylinder device 16 can be attached to a firm part, similarly to the present embodiment.

Seventh Embodiment

A seventh embodiment according to the present invention will be described below. The same symbols will be assigned to elements common with those in the first and third embodiments, and structures and description in the first and third embodiments will be quoted.

A motor cylinder device 16 in the seventh embodiment will be described in detail.

Figure 49:
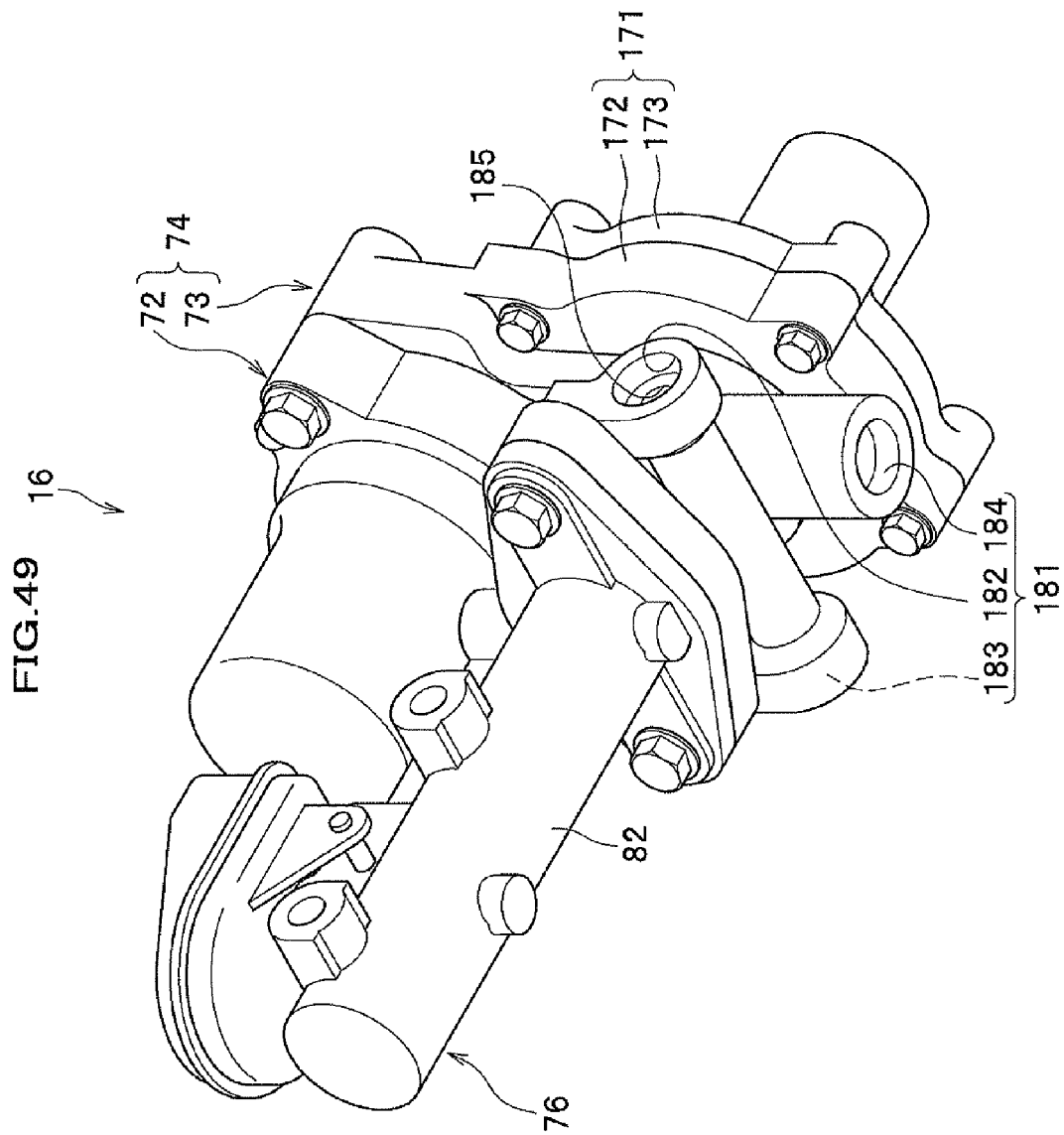
FIG. 49 is a perspective view of the motor cylinder device in a view from oblique below.
Figure 50:
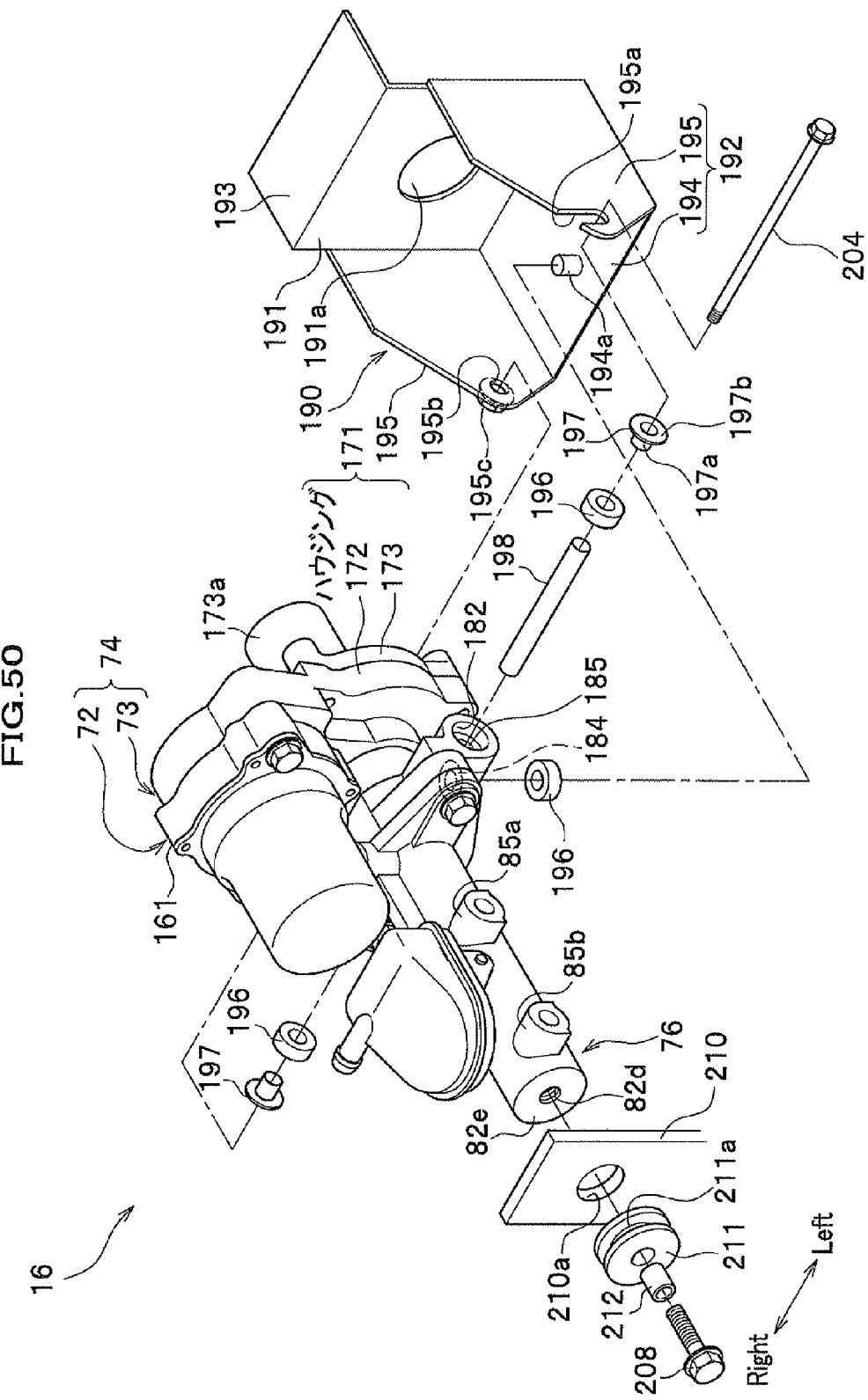
FIG. 50 is an exploded perspective view for illustration of a method of attaching the motor cylinder device to a vehicle body.
Figure 51:
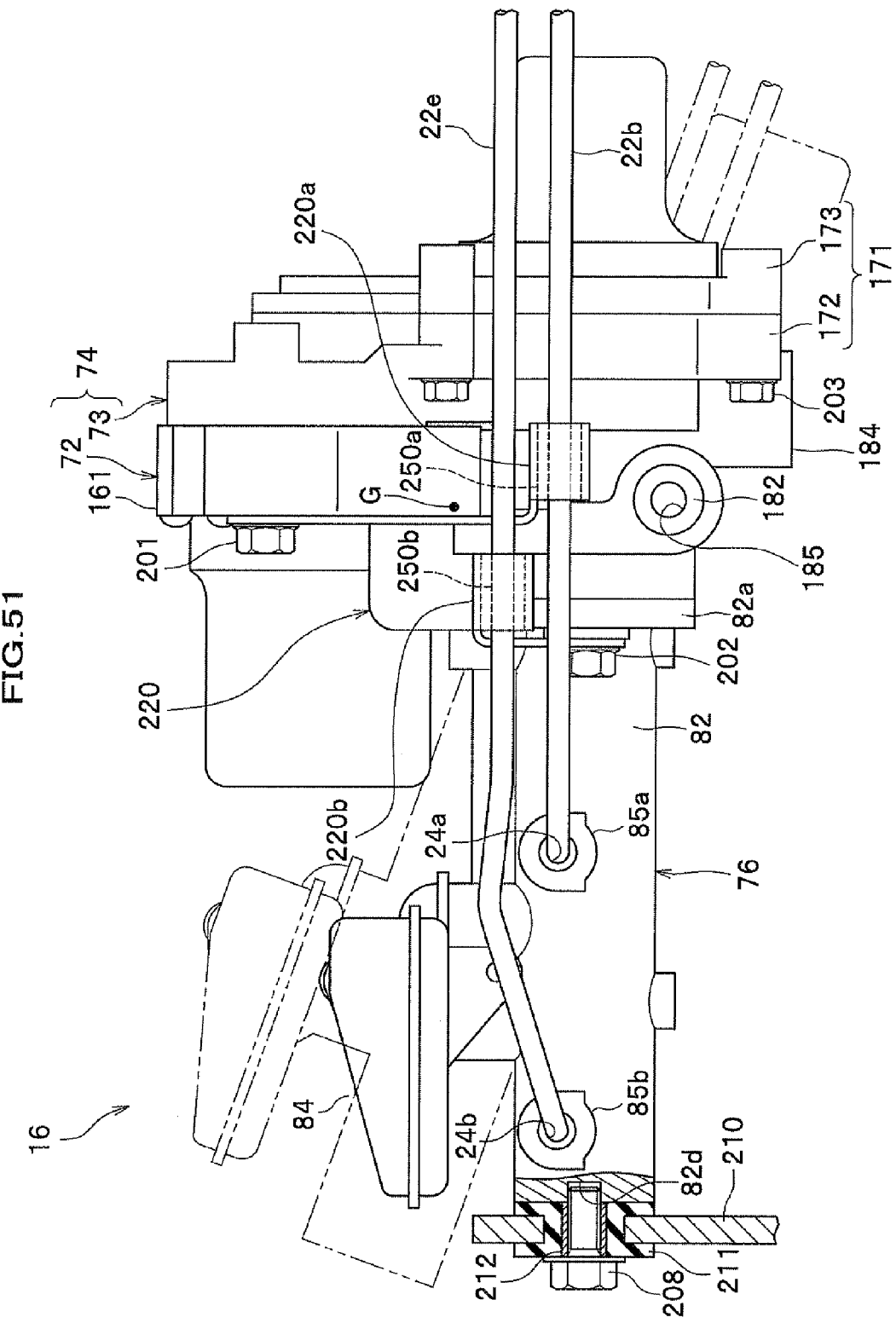
FIG. 51 is a side view of the motor cylinder device.

FIG. 47 is an exploded perspective view of a motor cylinder device in a seventh embodiment according to the invention. FIG. 48 is an exploded perspective view of a driving force transmission section. FIG. 49 is a perspective view of the motor cylinder device in a view from oblique below. FIG. 50 is an exploded perspective view for illustration of a method of attaching the motor cylinder device to a vehicle body. FIG. 51 is a side view of the motor cylinder device.

As shown in FIG. 47, the motor cylinder device 16 includes an electric motor 72 that drives, based on an electrical signal from control means, not shown, a driving force transmission section 73 for transmitting the driving force of the electric motor 72, and a cylinder mechanism 76 for applying a pressure to brake fluid by moving the first slave pistons 88a and 88b (see FIG. 2) along the axial direction by the driving force transmitted from the driving force transmission section 73. Incidentally, the electric motor 72 and the driving force transmission section 73 configure the actuator mechanism 74.

The electric motor 72, the driving force transmission section 73, and the cylinder mechanism 76 are configured separable from each other. The electric motor 72 includes a base portion 161 to which a harness, not shown, is connected, and the base portion 161 is provided with plural penetration holes 162 which a bolt 201 penetrates through. The end portion, on the driving force transmission section 73 side, of the cylinder main body 82 of the cylinder mechanism 76 is provided with a flange portion 82a, and the flange portion 82a is provided with plural penetration holes 82b which a bolt 202 penetrates through.

The driving force transmission section 73 includes an actuator housing 171 for housing in it a gear mechanism, a ball screw assembly, and other driving transmitting mechanical elements (not shown). The actuator housing 171 is provided with a housing 172 disposed on the cylinder mechanism 76 side, and a cover 173 for covering the opening end, on the side opposite to the cylinder mechanism 76, of the housing 172. The first body 172 and the cover 173 of the driving force transmission section 73 are formed from a metal such as an aluminum alloy (the cylinder main body 82 of the cylinder mechanism 76 also).

The housing 172 of the driving force transmission section 73 is provided with motor attaching screw holes 174 for attaching the electric motor 72 to the driving force transmission section 73, at positions corresponding to the penetration holes 162. At the end portion, on the cylinder mechanism 76 side, of the housing 172 is provided with a flange portion 175, and the flange portion 175 is provided with cylinder mechanism attaching screw holes 176 for attaching the cylinder mechanism 76 to the driving force transmission section 73, at positions corresponding to the penetration holes 82b.

Further, the housing 172 of the driving force transmission section 73 is provided with a motor attaching surface 172c facing the axial direction of the cylinder mechanism 76, wherein the base portion 161 of the electric motor 72 is attached to the motor attaching surface 172c. Still further, the flange portion 175 of the housing 172 is provided with a cylinder mechanism attaching surface 172d facing the axial direction of the cylinder mechanism, wherein the flange portion 82a of the cylinder mechanism 76 is attached to the cylinder mechanism attaching surface 172d. The cylinder mechanism attaching surface 172d is formed protruding to the cylinder mechanism 76 side, compared with the motor attaching surface 172c. The motor attaching surface 172c is disposed higher than the cylinder mechanism attaching surface 172d, and the electric motor 72 is located higher than the cylinder mechanism 76.

The cylinder mechanism 76 includes the cylinder main body 82 substantially in a cylindrical shape, wherein the base end of the cylinder main body 82 is provided with a flange portion 82a and a screw hole 82d as a second mount portion is provided at the center of a tip end surface 82e facing the axial direction of the tip end.

Further, the cylinder mechanism 76 is provided, on the circumferential surface of the cylinder main body 82, with bosses 85a and 85b having output ports 24a and 24b. Still further, a second reservoir 84 is provided on the top of or above the cylinder mechanism 76.

By making bolts 201 penetrate through the penetration holes 162 and screwing the bolts 201 into the motor attaching screw holes 174, the electric motor 72 is attached and fixed to the driving force transmission section 73. By making the bolts 202 penetrate through the insertion holes 82b and screwing the bolts 202 into the cylinder mechanism attaching screw holes 176, the cylinder mechanism 76 is attached and fixed to the driving force transmission section 73.

As shown in FIG. 48, the gear mechanism 78 and the ball screw assembly 80 are housed inside the actuator housing 171 (see FIG. 47). The gear mechanism 78 includes a pinion gear 78a (see FIG. 2) fixed to the output shaft of the electric motor 72, an idle gear 78b engaged with the pinion gear 78a, and a ring gear 78c engaged with the idle gear 78b. Further, the ball screw assembly 80 includes a ball screw shaft 80a in contact with a first slave piston 88a at the tip end side, balls 80b (see FIG. 2) disposed in a screw groove on the ball screw shaft 80a, and a nut portion 80c screw-engaged with the ball screw shaft 80a through the balls 80b.

The nut portion 80c is fixed, by pressure fitting for example, to the inner circumferential surface of the ring gear 78c, and thereby, the rotational driving force transmitted from the gear mechanism 78 is input to the nut portion 80c and thereafter converted into a linear driving force by the ball screw assembly ball screw assembly 80 to enable the ball screw shaft 80a to move forward and backward along the axial direction.

The housing 172 and the cover 173 of the actuator housing 171 are arranged separable from each other. The housing 172 is provided with a plurality of penetration holes 177 which the bolts 203 penetrate, wherein the penetration holes 177 are disposed around the central axis CL (see FIG. 47) of the first and second slave pistons 88a and 88b (see FIG. 2). A plurality of housing attaching screw holes 178 are formed at positions, of the cover 173, corresponding to the penetration holes 177. By making the bolts 203 penetrate the penetration holes 177 and thereby screwing the bolts 203 into the housing attaching screw holes 178, the housing 172 and the cover 173 are joined with each other. Incidentally, the reference symbol 179 in FIG. 48 represents a bearing for rotatably supporting the tip end of the output shaft of the electric motor 72, and the bearing 179 is insertion-fitted to a hole portion 180 formed on the cover 173.

As shown in FIG. 49, the motor cylinder device 16 is provided with a first mount portion 181 to attach the motor cylinder device 16 to a vehicle body 1 (see FIG. 1), for example, at a side frame. In a view from the cover 173 side with respect to the central axis CL (see FIG. 47) direction, the first mount portion 181 includes a left mount hole 182 located on the left side, a right mount hole 183 located on the right side, and a lower mount hole 184 arranged downward. The left, right, and lower mount holes 182-184 are respectively formed with a cylindrical recession. Further, the first mount portion 181 has a penetration hole 185 with an axial center perpendicular to the central axis CL (see FIG. 47), wherein the penetration hole 185 is formed along the axial center common to the left mount hole 182 and the right mount hole 183.

The first mount portion 181 is provided in the vicinity of the center of gravity G (see FIG. 51) of the motor cylinder device 16. Concretely, the first mount portion 181 is provided at the part where the position of the center of gravity of the motor cylinder device 16 is present (or the part closest to the position of the center of gravity) out of the electric motor 72, the driving force transmission section 73, and the cylinder mechanism 76, that is the driving force transmission section 73 in this case. In more detail, the first mount portion 181 is provided on the housing 172 of the driving force transmission section 73 provided with motor attaching screw holes 174 (see FIG. 48).

Incidentally, the position for disposing the first mount portion 181 is not limited to the vicinity of the center of gravity G of the motor cylinder device 16, and may be a position far from the vicinity of the center of gravity G, for example, a position on side of the cover 173 of the driving force transmission section 73 or the side of the electric motor 72.

As shown in FIG. 50, the motor cylinder device 16 is attached to the vehicle body 1 (see FIG. 1) such as a side frame through the attaching bracket 190 at the first mount portion 181 ((see FIG. 49). Further, the motor cylinder device 16 is attached to the vehicle body 1 (see FIG. 1), such as the side frame, through the attaching bracket 210 at the second mount portion (screw hole 82d).

The attaching bracket 190 is provided with a support plate 192 formed by: a pair of side plates 195, 195 for supporting the motor cylinder device 16 from the left and right directions by screw fastening by the use of a bolt (male screw member) 204; and a substantially horizontal bottom plate 194 that is formed continuously from the both bottom sides of the pair of side plates 195, 195 and supports the intermediate portion (central portion) of the motor cylinder device 16. Further, the attaching bracket 190 is provided with a back plate 191 that is formed continuously from the side plates 195, 195 and the bottom plate 194 and is substantially along the vertical direction, and a fixing plate 193 that is formed continuously from the back plate 191 to fix to the vehicle body side. An opening 191a, thorough which the protrusion portion (cylindrical portion) 173a of the cover 173 penetrates, is formed around the center of the back plate 191.

One side plate 195 is provided with a notch 195a substantially in a U-shape through which a bolt 204 can penetrate, and the other side plate 195 is provided with a penetration hole 195b through which the bolt 204 penetrates. A nut 195c, which can be screw-engaged with the bolt 204, is fixed and attached to the outside of the penetration hole 195b of the side plate 195 for example by welding. Further, a pin 194a is provided, being standing at the center of the upper surface of the bottom plate 194.

In attaching the motor cylinder device 16 to the attaching bracket 190, used are a first collar 198 in a long cylindrical shape, a rubber bush 196, a second collar 197 having a cylindrical portion 197a and a flange 197b formed at the end of the cylindrical portion 197a, and the bolt 204. The rubber bush 196 is an elastic member of rubber substantially in a cylindrical shape, and is capable of absorbing vibration and shock. Incidentally, it is also possible to improve the flexibility of the rubber bush 196 for example by forming asperity on the outer circumferential surface of the rubber bush 196.

First, the first collar 198 is inserted inside the penetration hole 185 of the motor cylinder device 16. Then, each of the second collars 197 having the cylindrical portion 197a insertion-fitted to the inside of the central hole of the rubber bush 196 is insertion-fitted and attached to the inside of the left mount hole 182 or the right mount hole 183. Further, the rubber bush 196 is insertion-fitted into the lower mount hole 184 and thus attached. Then, the pin 194a is insertion fitted to the central hole of the rubber bush 196 attached to the lower mount hole 184 so that the motor cylinder device 16 is installed on the bottom plate 194 of the attaching bracket 190. Thus, the middle portion of the motor cylinder device 16 is supported from below by the lower mount hole 184. Herein, it is also possible to form a female screw hole at the bottom surface of the lower mount hole 184, insert a cylindrical collar instead of the pin 194a into the central hole of the rubber bush 196, and insert a male screw member such as a bolt from below the penetration hole formed through the bottom plate 194.

When the motor cylinder device 16 is installed on the bottom plate 194, the rubber bushes 196 and the second collars 197 attached respectively to the left mount hole 182 and the right mount hole 183 of the motor cylinder device 16 are respectively at the notch 195a and the penetration hole 195b of the side plates 195. The bolt 204 penetrates through the notch 195a, the second collar 197, the rubber bush 196, the first collar 198, the rubber bush 196, and the second collar 197 in this order, and thus can be screwed into the nut 195c. At this moment, the bolt 204 comes to penetrate through the penetration hole 185. Thus, by the left mount hole 182 and the right mount hole 183, the motor cylinder device 16 is supported such as to be sandwiched by the pair of side plates 195, 195 from the left and right directions.

Then, the fixing plate 193 of the attaching bracket 190 is fixed by screw fastening or welding to the vehicle body 1 (see FIG. 1) such as a side frame or the like, directly or through another connecting member not shown.

As described above, by using the mount portion 181, it is possible to attach the motor cylinder device 16 to the vehicle body side, supporting three portions, namely the left, right, and bottom portions of the motor cylinder device 16. Further, as the mount portion 181 of the motor cylinder device 16 is floating-supported (elastically supported) on the vehicle body side through the rubber bush 196, vibration and shock can be absorbed.

On the other hand, the attaching bracket 210 is formed from a steel plate, being provided with a penetration hole 210a. In attaching the motor cylinder device 16 to the attaching bracket 210, a rubber bush 211, a third collar 212 in a cylindrical shape, and a bolt 208 are used. The rubber bush 211 is a buffer member substantially in a cylindrical shape of rubber capable of absorbing vibration and shock, wherein the outer circumferential surface of the rubber bush 211 is provided with a recessed groove 211a to be fitted to the penetration hole 210a. The recessed groove 211a has a shape enabling fitting and attaching of the rubber bush 211 to the penetration hole 210a of the attaching bracket 210. Further, the rubber bush 211 is formed such as to have a diameter that is surface-contactable with the entire tip-end surface 82c of the cylinder mechanism 76.

First, the rubber bush 211 is fitted to the penetration hole 210a of the attaching bracket 210, and thereafter, the third collar 212 is fitted into the central hole of the rubber bush 211. Then, the bolt 208 is penetrated through the third collar 212, and the tip end of the bolt 208 is screwed into the screw hole 82d. Thus, the attaching bracket 210 is fixed to the tip end of the cylinder mechanism 76. Though not shown, the attaching bracket 210 is formed extending to the vehicle body 1 (see FIG. 1), such as the side frame for example, and is fixed by screw fastening, welding, or the like to the vehicle body 1 directly or through a different connecting member, not shown.

Incidentally, arrangement of supporting the attaching bracket 210 at the tip end of the cylinder mechanism 76 is not limited to supporting the tip end surface 82e of the cylinder mechanism 76 at one position, and for example, the tip end of the cylinder mechanism 76 may be floating-supported at plural points through rubber bushes from a side direction and/or from above (or below) in the vertical direction.

Thus, the motor cylinder device 16 is floating-supported by the vehicle body 1 at the tip end of the cylinder mechanism 76. Accordingly, by having the first mount portion 181 and also the second point portion, the motor cylinder device 16 can effectively absorb vibration and shock.

As shown in FIG. 51, the motor cylinder device 16 is arranged such that the second piping tube 22b and the fifth piping tube 22e (hereinafter abbreviated as piping tube), in which brake fluid flows, are connected to output ports 24a and 24b formed on the cylinder main body 82 of the cylinder mechanism 76. The piping tubes 22b and 22e are formed by bending metal pipes such as steel pipes into a certain shape (other piping tubes also).

Herein, the cylinder mechanism 76 is a so-called tandem type cylinder mechanism provided with a first hydraulic pressure chamber 98a and a second hydraulic pressure chamber 98b (see FIG. 2) side by side along the central axis CL (see FIG. 47). The output port 24a is the primary port communicating with the first hydraulic pressure chamber 98a, and the output port 24b is the secondary port communicating with the second hydraulic pressure chamber 98b.

The piping tubes 22b and 22e extending from the output ports 24a and 24b along the direction perpendicular to the central axis CL (the direction perpendicular to the sheet face) are bent toward the base end side of the of the cylinder mechanism 76, and arranged thereafter along the axial direction (the central axis direction CL) of the cylinder mechanism 76 such as to be directed to the motor cylinder device 16 side. Respective one parts of the piping tubes 22b and 22e, the parts being located at a position away from the respective parts connected with the output ports 24a and 24b, are supported by the intermediate portion of the motor cylinder device 16 through the clamp member 220.

The clamp member 220 is formed by punching a metal sheet with elasticity, of a spring steel for example, into a certain shape and thereafter performing a bending process. The clamp member 220 is formed, extending respectively to the piping tubes 22b and 22e, and is provided at the respective tip ends a holding portion (first curved portion) 220a for holding the piping tube 22b and a holding portion (second curved portion) 220b for holding the piping tube 22e. The holding portions 229a and 229b are arranged such as to support the piping tube 22b and 22e through rubber bushes 250a and 250b. The clamp member 220 is fixed to the motor cylinder device 16 by the bolt 201 in attaching the electric motor 72 to the driving force transmission section 73 and the bolt 202 in attaching the cylinder mechanism 76 to the driving force transmission section 73.

As has been described above, in the vehicle body attachment structure of the motor cylinder device 16 of the vehicle brake system 10 in the present embodiment, there are provided the first mount portion 181 for supporting the motor cylinder device 16 by the vehicle body 1, and the second mount portion (screw hole 82d) for supporting the tip end side of the cylinder mechanism 76 by the vehicle body 1, the second mount portion being different from the first mount portion 181, and it is thereby possible to effectively reduce the displacement of the tip end side of the cylinder mechanism 76.

That is, in case of supporting the motor cylinder device 16 by the vehicle body 1 through the first mount portion 181, when the motor cylinder device 16 receives a force such as vibration, the displacement of the tip end of the cylinder mechanism 76, which is elongated along the axial direction (central axis CL), is amplified compared with the first mount portion 181 by the rotational movement around the first mount portion 181 of the motor cylinder device 16 as the pivot point, and stresses in the piping tubes 22b and 22e connected to the tip end side of the cylinder mechanism 76 are increased. In this situation, in the present embodiment, by adding the second mount portion to the first mount portion 181 to support the motor cylinder device 16 by the vehicle body 1, it is possible to effectively reduce the displacement on the tip end side of the cylinder mechanism 76. As a result, stressed caused in the piping tubes 22b and 22e connected the motor cylinder device 16 can be reduced.

Further, in the present embodiment, as the actuator mechanism 74 (the electric motor 72 and the driving force transmission section 73) and the cylinder mechanism 76 are formed in separate bodies, the two can be produced independently from each other. In case it is necessary to change the position and the shape of the first mount portion 181, for example, in a case of mounting on vehicles in plural types, it is possible to make an arrangement by changing only the portion of the actuator mechanism 74 where the mount portion 181 is provided while commonly using the cylinder mechanism 76 as it is. Regarding the second mount portion (screw hole 82d), it is only necessary to change the shape of the attaching bracket 210, corresponding to the vehicle type or the like, the cylinder mechanism 76 can be commonly used as described above. Even in cast that the vehicle type or the like is changed and accordingly the structure of the vehicle body 1 or the disposition of the motor cylinder device 16 is changed, it is easy to respond to the change.

Further, in the present embodiment, the first mount portion 181 is provided in the vicinity of the center of gravity of the motor cylinder device 16, and the second mount portion is provided at the tip end of the cylinder mechanism 76 so that the motor cylinder device 16 is supported by the vehicle body at two points, namely the vicinity of the above-described center of gravity and the above-described tip end. In such a manner, by providing the first mount portion 181 in the vicinity of center of gravity G of the motor cylinder device 16, swinging of the motor cylinder device 16 can be further reduced even in case that the motor cylinder device 16 receives a force such as vibration. As a result, stresses caused in the piping tubes 22b and 22e connected to the cylinder mechanism 76 can be further reduced.

Incidentally, air may mix in when the piping tubes 22b and 22e to be connected to the cylinder mechanism 76 of the motor cylinder device 16 are fitted or replaced, and if the air is left remaining as it is mixing in the cylinder mechanism 76, generation of hydraulic pressure will be disturbed. In this situation, as represented by alternate long and two short dashes lines in FIG. 51, by mounting the motor cylinder device 16 with inclination on the vehicle body 1 so that the tip end of the cylinder mechanism 76 faces upward, even in case that air has mixed in during a time of fitting the piping tubes 22b and 22e or the like, the air can be easily evacuated from the cylinder mechanism 76.

Figure 52:
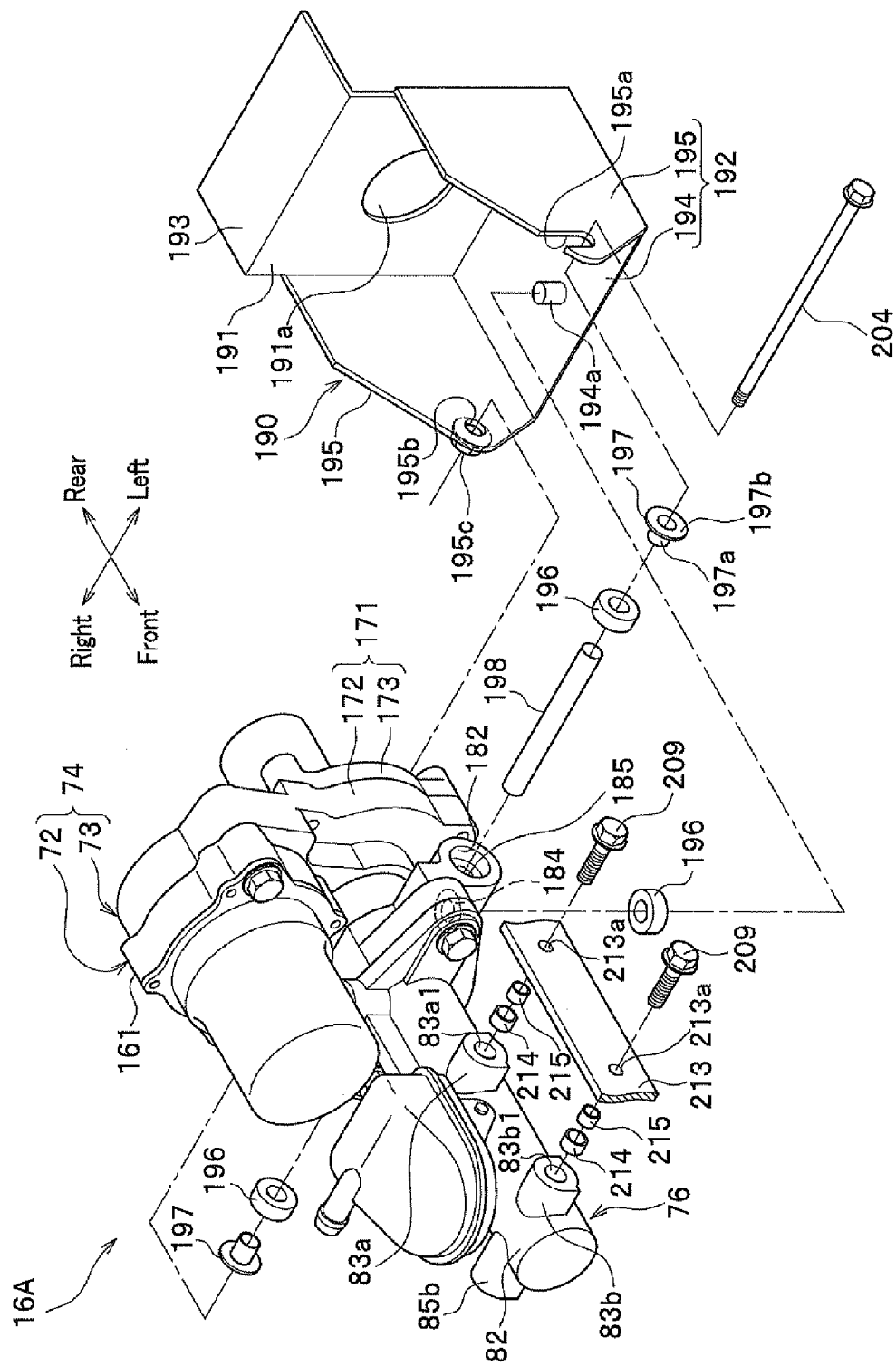
FIG. 52 is an exploded perspective view for illustration of another method of attaching the motor cylinder device to a vehicle body.
Figure 53:
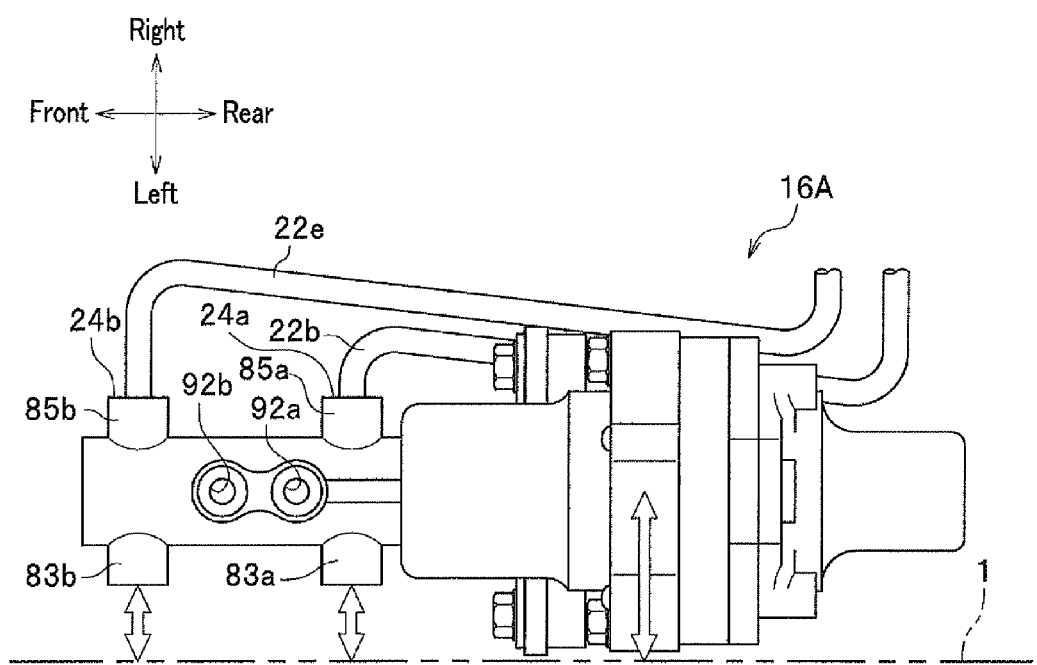
FIG. 53 shows the disposition structure of the motor cylinder device shown in FIG. 52 in the vehicle body.

FIG. 52 is an exploded perspective view for illustration of another method of attaching the motor cylinder device to a vehicle body. FIG. 53 shows the disposition structure of the motor cylinder device shown in FIG. 52 in the vehicle body. The same reference symbols will be assigned to the same elements as those in the foregoing embodiment, and overlapping description will be omitted.

As shown in FIG. 52, the cylinder mechanism 76 of a motor cylinder device 16A includes a cylinder main body 82, wherein bosses 83a, 83b, 85a (see FIG. 53), and 85b are formed protruding from the tip end side of the cylinder main body 82, with distances therebetween along the axial direction (the central axis CL, see FIG. 47). The bosses 83a and 83b are formed outward (leftward) with respect to the vehicle transverse direction, and the bosses 85a and 85b are formed inward (rightward) with respect to the vehicle transverse direction.

The bosses 83a and 83b are processed for the second mount (for mount) and formed substantially in a cylindrical shape. The bosses 83a and 83b are provided with circular mount holes 83a1 and 83b1 from the tip end surfaces thereof toward the cylinder main body 82. Though not shown, each of the mount holes 83a1 and 83b1 has, at the bottom surface thereof (the surface on the deep side of the hole), a screw hole into which a bolt 209 is screwed. Further, the depth of each of the mount holes 83a1 and 83b1 is set such as not to communicate with the first hydraulic pressure chamber 98a nor the second hydraulic pressure chamber 98b.

On the other hand, the bosses 85a and 85b are processed for ports and formed substantially in a cylindrical shape. The boss 85a is provided with an output port 24a (see FIG. 53) such as to communicate with the first hydraulic pressure chamber 98a (see FIG. 2) in the cylinder main body 82. The boss 85b is provided with an output port 24b (see FIG. 53) such as to communicate with the first hydraulic pressure chamber 98b (see FIG. 2) in the cylinder main body 82.

An attaching bracket 213 is formed from a steel plate or the like and is provided, at positions corresponding to the mount holes 83a1 and 83b1 of the bosses 83a and 83b, with penetration holes 213a through which fastening bolts 209 can penetrate.

In attaching the motor cylinder device 16 to the attaching bracket 213, rubber bushes 214, cylindrical collars 215, and bolts 209 are used. The rubber bushes 214 are buffer members of rubber substantially in a cylindrical shape capable of absorbing vibration and shock, and formed to be able to be fitted into the mount holes 83a1 and 83b1.

First, the collars 215 are fitted into the central holes of the rubber bushes 214, and then the rubber bushes 214 are pushed and fitted into the mount holes 83a1 and 83b1. Then, the bolts 209 are inserted through the penetration holes 213a of the attaching bracket 213 and the collars 215, the bolts 209 are screwed into screw holes (not shown) formed in the mount holes 83a1 and 83b1, and the motor cylinder device 16A is thereby supported by the attaching bracket 213. Thus, the motor cylinder device 16A is floating-supported by the attaching bracket 213.

As shown in FIG. 53, the motor cylinder device 16A is fixed in a state of being disposed, as shown by the hollow arrow, at the side of the vehicle body 1 (see FIG. 1), which is for example the side frame extending along the front/rear direction, through the attaching bracket 213 (see FIG. 52). Concretely, the attaching bracket 213 extends up to the vehicle body 1, and is fixed to the vehicle body 1 by screw fastening, welding, or the like directly or through another connecting member, not shown.

According to such a vehicle body attachment structure for the motor cylinder device 16A, the cylinder mechanism 76 (the cylinder main body 82) is: provided with plural bosses 83a, 83b, 85a, and 85b; the bosses 85a and 85b on one side (the inner side along the vehicle transverse direction) are subjected to processing for a port to become ports; and the bosses 83a and 83b (stub boss side) on the other side (the outer side along the vehicle transverse direction) is subjected to processing for a mount to become the second mount portion. Thus, it is unnecessary to provide an additional mount portion to the electric brake actuator. Further, as it is only necessary to provide, for example the mount holes 83a1 and 83b1 having a screw hole for fastening by a bolt on the side of the bosses 83a and 83b (stub bosses), processing of a mount portion is easy.

Further, on the motor cylinder device 16, as bosses 85a and 85b for a port are disposed on the inner side along the vehicle transverse direction of the cylinder main body 82, the work of replacing pipes or the like during maintenance thereby becomes easy. Further, assuming a right-hand drive vehicle, the motor cylinder device 16A has been described, taking an example of a case of disposing the input device 14 on the right side and the motor cylinder device 16 on the left side in the engine room R, however, in case of disposing the input device 14 on the left side and the motor cylinder device 16 on the right side in the engine room R, corresponding to a left-hand drive vehicle, by performing processing, in reverse of the above, of the bosses 83a and 83b for a port and the bosses 85a and 85b for a mount, the cylinder mechanism 76 can be commonly used even in a case of mounting on vehicles of plural types.

Incidentally, although description has been made, taking an example of a case of making the two bosses 83a and 83b to be for a mount, without being limited thereto, for example, processing of the mount hole 83b1 may be performed, making only the boss 83b on the tip end side be for a mount.

Further, disposition of the bosses 83a and 83b for a mount and the bosses 85a and 85b for a port is not limited to the two sides, namely the left and right sides, along the vehicle transverse direction, and the disposition may be made on the two sides, namely the upper side and the lower side, along the vertical direction, wherein one of the rest of bosses is connected to the input device 14 and the other one of the rest of bosses is connected to the VSA device 18, thus a motor cylinder device having these four ports being arranged.

Further, the direction of attaching the motor cylinder device 16 or 16A is not limited to an arrangement in which the axial direction (CL) of the cylinder mechanism 76 is along the front/rear direction, and may be an arrangement in which the axial direction of the cylinder mechanism 76 is along the vehicle transverse direction. Further, the motor cylinder device 16 is not limited to an arrangement in which the motor cylinder device 16 is attached to the side surface of the side frame, and the motor cylinder device 16 may be attached to the top surface side, the bottom surface side of the side frame, or a place other than the side frame.

DESCRIPTION OF REFERENCE SYMBOLS

1 . . . side frame (vehicle body)
10 . . . vehicle brake system
14 . . . input device
16, 16a . . . motor cylinder device (electric brake actuator)
18 . . . VSA device (vehicle-behavior stabilizer)
72 . . . electric motor
73 . . . driving force transmission section
74 . . . actuator mechanism
76 . . . cylinder mechanism
88a . . . first slave piston (piston)
88b . . . second slave piston (piston)
172 . . . housing
174 . . . motor attaching screw hole (motor attachment portion)
181 . . . mount portion
182 . . . left mount hole (mount portion)
183 . . . right mount hole (mount portion)
184 . . . lower mount hole (mount portion)
185 . . . penetration hole
190 . . . attaching bracket
204 . . . bolt (male screw member)
CL . . . central axis
V . . . vehicle

The invention claimed is:

1. A vehicle body attachment structure for an electric brake actuator for a vehicle brake system including an input device to which braking operation by an operator is input and an electric brake actuator for generating a hydraulic brake pressure, based on at least an electric signal according to the braking operation,
wherein the electric brake actuator includes:
an electric motor that drives, based on the electric signal;
a driving force transmission section for transmitting a driving force of the electric motor; and
a cylinder mechanism for applying a pressure to brake fluid by moving a piston along an axial direction by the driving force transmitted from the driving force transmission section,
wherein a mount portion for attaching the electric brake actuator to a vehicle body is provided in a vicinity of a center of gravity of the electric brake actuator;
wherein:
the electric brake actuator is provided with a penetration hole penetrating along a direction substantially perpendicular to an axial line of the cylinder mechanism,
the electric brake actuator is supported by a fixing member penetrating through the penetration hole;
a first boss portion is provided at one end portion along an axial direction of the penetration hole;
a second boss portion is provided at another end portion along the axial direction of the penetration hole; and
a third boss portion is provided along a vertical downward direction perpendicular to the axial line of the penetration hole,
and wherein the electric brake actuator is supported at three points formed by the first to third boss portions.

2. The vehicle body attachment structure, for an electric brake actuator, according to claim 1, wherein the mount portion is provided at a portion that is arranged separable from the cylinder mechanism of the electric brake actuator.

3. The vehicle body attachment structure, for said electric brake actuator, according to claim 2,
wherein the driving force transmission section includes a housing provided with a motor attachment portion for attaching the electric motor to the driving force transmission section,
and wherein the mount portion is provided in the housing.

4. The vehicle body attachment structure, for said electric brake actuator, according to claim 1,
wherein the electric motor is disposed lower than the cylinder mechanism,
and wherein the mount portion is disposed at an upper portion of the electric brake actuator.

5. The vehicle body attachment structure, for an electric brake actuator, according to claim 1, comprising:
a load transmission section that is formed between the electric brake actuator and the vehicle body to transmit a load from the electric brake actuator to the vehicle body,
wherein the load transmission section is provided independently from the mount portion.

6. The vehicle body attachment structure, for said electric brake actuator, according to claim 1, comprising:
an electric-brake-actuator fixing bracket for fixing said electric brake actuator provided with a cylinder for generating said hydraulic brake pressure, based on said electric signal according to the braking operation,
wherein the electric-brake-actuator fixing bracket includes:
a penetration portion through which the electric brake actuator penetrates along an axial direction of the cylinder, wherein the penetration portion restricts displacement of a portion, of the electric brake actuator, having passed through;
a support portion for supporting a substantially central portion of the electric brake actuator in a state of penetrating through along the axial direction of the cylinder mechanism; and
a fixing portion to be fixed by being attached to the vehicle body.

7. A vehicle body attachment structure for an electric brake actuator for a vehicle brake system including an input device to which braking operation by an operator is input and an electric brake actuator for generating a hydraulic brake pressure, based on at least an electric signal according to the braking operation,
wherein the electric brake actuator includes:
an electric motor that drives, based on the electric signal;
a driving force transmission section for transmitting a driving force of the electric motor; and
a cylinder mechanism for applying a pressure to brake fluid by moving a piston along an axial direction by the driving force transmitted from the driving force transmission section,
wherein a mount portion for attaching the electric brake actuator to a vehicle body is provided in a vicinity of a center of gravity of the electric brake actuator;

wherein the driving force transmission section includes an actuator housing provided with a motor attachment portion for attaching the electric motor to the driving force transmission section,
and wherein a connector is disposed on a side surface side of the actuator housing and is electrically connected with the electric motor,
wherein the electric brake actuator is attached to a side member extending along a front/rear direction on a left side and a right side of the vehicle.

8. The vehicle body attachment structure, for said electric brake actuator, according to claim 7, wherein the connector is provided such as to extend along a direction substantially perpendicular to an axial line of a motor shaft of the electric motor.

9. The vehicle body attachment structure, for said electric brake actuator, according to claim 7,
wherein the cylinder mechanism is provided with a reservoir for reserving brake fluid,
and wherein the reservoir is provided such that a direction in which brake fluid is introduced to the reservoir and a direction of attaching and detaching the connector agree with each other.

10. A vehicle body attachment structure for an electric brake actuator for a vehicle brake system including an input device to which braking operation by an operator is input and an electric brake actuator for generating a hydraulic brake pressure, based on at least an electric signal according to the braking operation,
wherein the electric brake actuator includes:
an electric motor that drives, based on the electric signal;
a driving force transmission section for transmitting a driving force of the electric motor; and
a cylinder mechanism for applying a pressure to brake fluid by moving a piston along an axial direction by the driving force transmitted from the driving force transmission section,
and wherein a mount portion for attaching the electric brake actuator to a vehicle body is provided in a vicinity of a center of gravity of the electric brake actuator;
wherein a pipe connected to the electric brake actuator, brake fluid flowing through the pipe, is connected to the cylinder mechanism,
and wherein a portion of the pipe, the portion being located at a position away from a connection part of the pipe with the cylinder mechanism, is supported by an intermediate portion of the electric brake actuator,
wherein the pipe extends along a direction perpendicular to the axial direction at the connection part with the cylinder mechanism such as to get away from a surface of the electric brake actuator, thereafter again gets close to the surface of the electric brake actuator, and is supported at a thus close portion thereof by the electric brake actuator.

11. A vehicle body attachment structure for an electric brake actuator for a vehicle brake system including an input device to which braking operation by an operator is input and an electric brake actuator for generating a hydraulic brake pressure, based on at least an electric signal according to the braking operation,
wherein the electric brake actuator includes:
an electric motor that drives, based on the electric signal;
a driving force transmission section for transmitting a driving force of the electric motor; and
a cylinder mechanism for applying a pressure to brake fluid by moving a piston along an axial direction by the driving force transmitted from the driving force transmission section,
and wherein a mount portion for attaching the electric brake actuator to a vehicle body is provided in a vicinity of a center of gravity of the electric brake actuator,
wherein a pipe connected to the electric brake actuator, brake fluid flowing through the pipe, is connected to the cylinder mechanism,
wherein a portion of the pipe, the portion being located at a position away from a connection part of the pipe with the cylinder mechanism, is supported by an intermediate portion of the electric brake actuator,
wherein the cylinder mechanism is provided with plural ports each of which communicating respectively with either a first hydraulic pressure chamber or a second hydraulic pressure chamber that are formed side by side along the axial direction inside the cylinder mechanism,
and wherein the pipe is provided in a plural number, at least corresponding to the plural ports.

12. A vehicle body attachment structure; for an electric brake actuator for a vehicle brake system including an input device to which braking operation by an operator is input and an electric brake actuator for generating a hydraulic brake pressure, based on at least an electric signal according to the braking operation,
wherein the electric brake actuator includes:
an electric motor that drives, based on the electric signal;
a driving force transmission section for transmitting a driving force of the electric motor; and
a cylinder mechanism for applying a pressure to brake fluid by moving a piston along an axial direction by the driving force transmitted from the driving force transmission section,
and wherein a first mount portion for attaching the electric brake actuator to a vehicle body is provided in a vicinity of a center of gravity of the electric brake actuator, said first mount portion supporting the electric brake actuator on the vehicle body; and
a second mount portion that is different from the first mount portion and supports a tip end side of the cylinder mechanism on the vehicle body; wherein
the first mount portion is provided in the vicinity of the center of gravity of the electric brake actuator,
wherein the cylinder mechanism is provided in advance with plural unprocessed bosses,
wherein one of the bosses is formed for the second mount portion for attaching the electric brake actuator to the vehicle body,
and wherein the rest of the bosses are formed for a port or ports communicating with the cylinder mechanism.

13. The vehicle body attachment structure, for an electric brake actuator, according to claim 12,
wherein the second mount portion is provided at the tip end of the cylinder mechanism,
and wherein the electric brake actuator is supported by two points in the vicinity of the center of gravity and at the tip end.

* * * * *